(12) United States Patent
Lys

(10) Patent No.: US 7,737,643 B2
(45) Date of Patent: *Jun. 15, 2010

(54) LED POWER CONTROL METHODS AND APPARATUS

(75) Inventor: Ihor A. Lys, Milton, MA (US)

(73) Assignee: Philips Solid-State Lighting Solutions, Inc., Burlington, MA (US)

(*) Notice: Subject to any disclaimer, the term of this patent is extended or adjusted under 35 U.S.C. 154(b) by 390 days.

This patent is subject to a terminal disclaimer.

(21) Appl. No.: 11/780,574

(22) Filed: Jul. 20, 2007

(65) Prior Publication Data

US 2008/0012502 A1  Jan. 17, 2008

Related U.S. Application Data

(63) Continuation of application No. 11/079,450, filed on Mar. 14, 2005, now Pat. No. 7,256,554.

(60) Provisional application No. 60/553,318, filed on Mar. 15, 2004.

(51) Int. Cl.
*H05B 37/02* (2006.01)

(52) U.S. Cl. .................. 315/291; 315/224; 315/247; 315/307

(58) Field of Classification Search ............ 315/209 R, 315/224, 291, 307, 308, 362; 345/82–83; 362/227, 230–231, 611, 612, 800

See application file for complete search history.

(56) References Cited

U.S. PATENT DOCUMENTS 4,144,478 A   3/1979 Nuver (Continued)

FOREIGN PATENT DOCUMENTS

WO    WO 03/069958    8/2003

(Continued)

OTHER PUBLICATIONS

Office Action dated May 30, 2007 from co-pending U.S. Appl. No. 11/079,904.

(Continued)

*Primary Examiner*—Douglas W Owens
*Assistant Examiner*—Tung X Le

(57) ABSTRACT

Methods and apparatus for providing and controlling power to loads including one or more LEDs. In one example, a controlled predetermined power is provided to a load without requiring any feedback information from the load (i.e., without monitoring a load voltage and/or load current). In another example, a "feed-forward" power driver for an LED-based light source combines the functionality of a DC-DC converter and a light source controller, and is configured to control the intensity of light generated by the light source based on modulating the average power delivered to the light source in a given time period, without monitoring and/or regulating the voltage or current provided to the light source. In various examples, significantly streamlined circuits having fewer components, higher overall power efficiencies, and smaller space requirements are realized. Based on various power driver configurations, lighting apparatus incorporating one or more power drivers for one or more LED-based loads may be implemented, and multiple such lighting apparatus may be coupled together to form a lighting network in which operating power is efficiently provided throughout the network.

37 Claims, 47 Drawing Sheets

U.S. PATENT DOCUMENTS

| | | | |
|---|---|---|---|
| 5,245,253 A | 9/1993 | Quazi | |
| 5,640,061 A | 6/1997 | Bornhorst et al. | |
| 5,661,645 A | 8/1997 | Hochstein | |
| 5,786,992 A | 7/1998 | Vinciarelli et al. | |
| 6,016,038 A | 1/2000 | Mueller et al. | |
| 6,072,280 A | 6/2000 | Allen | |
| 6,091,614 A | 7/2000 | Malenfant | |
| 6,097,367 A * | 8/2000 | Kuriwaki et al. | 345/589 |
| 6,118,259 A | 9/2000 | Bucks et al. | |
| 6,147,458 A | 11/2000 | Bucks et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,285,139 B1 | 9/2001 | Ghanem | |
| 6,292,901 B1 | 9/2001 | Lys et al. | |
| 6,304,464 B1 | 10/2001 | Jacobs et al. | |
| 6,320,330 B1 | 11/2001 | Haavisto et al. | |
| 6,340,868 B1 | 1/2002 | Lys et al. | |
| 6,369,525 B1 | 4/2002 | Chang et al. | |
| 6,441,558 B1 | 8/2002 | Muthu et al. | |
| 6,459,919 B1 | 10/2002 | Lys et al. | |
| 6,461,019 B1 | 10/2002 | Allen | |
| 6,495,964 B1 | 12/2002 | Muthu et al. | |
| 6,510,995 B2 | 1/2003 | Muthu et al. | |
| 6,528,954 B1 | 3/2003 | Lys et al. | |
| 6,548,967 B1 | 4/2003 | Dowling et al. | |
| 6,577,080 B2 | 6/2003 | Lys et al. | |
| 6,586,890 B2 | 7/2003 | Min et al. | |
| 6,608,453 B2 | 8/2003 | Morgan et al. | |
| 6,618,031 B1 | 9/2003 | Bohn, Jr. et al. | |
| 6,624,597 B2 | 9/2003 | Dowling et al. | |
| 6,639,198 B2 | 10/2003 | Riess et al. | |
| 6,667,583 B2 * | 12/2003 | Kerenyi | 315/219 |
| 6,717,376 B2 | 4/2004 | Lys et al. | |
| 6,720,745 B2 | 4/2004 | Mueller et al. | |
| 6,734,639 B2 | 5/2004 | Chang et al. | |
| 6,768,047 B2 | 7/2004 | Chang et al. | |
| 6,774,584 B2 | 8/2004 | Lys et al. | |
| 6,777,891 B2 | 8/2004 | Lys et al. | |
| 6,781,329 B2 | 8/2004 | Morgan et al. | |
| 6,788,011 B2 | 9/2004 | Mueller et al. | |
| 6,801,003 B2 | 10/2004 | Schanberger et al. | |
| 6,806,659 B1 | 10/2004 | Mueller et al. | |
| 6,836,081 B2 | 12/2004 | Swanson et al. | |
| 6,853,150 B2 | 2/2005 | Clauberg et al. | |
| 6,869,204 B2 | 3/2005 | Morgan et al. | |
| 6,883,929 B2 | 4/2005 | Dowling | |
| 6,888,322 B2 | 5/2005 | Dowling et al. | |
| 6,888,383 B1 | 5/2005 | Fairbanks | |
| 6,888,529 B2 | 5/2005 | Bruning et al. | |
| 6,897,624 B2 | 5/2005 | Ducharme et al. | |
| 6,922,022 B2 | 7/2005 | Bucks et al. | |
| 6,930,452 B2 | 8/2005 | De Krijger et al. | |
| 6,930,893 B2 | 8/2005 | Vinciarelli | |
| 6,933,767 B2 | 8/2005 | Bucks et al. | |
| 6,936,978 B2 | 8/2005 | Morgan et al. | |
| 6,943,504 B1 | 9/2005 | York | |
| 6,965,205 B2 | 11/2005 | Piepgras et al. | |
| 6,967,448 B2 | 11/2005 | Morgan et al. | |
| 6,969,954 B2 | 11/2005 | Lys | |
| 6,975,079 B2 | 12/2005 | Lys et al. | |
| 7,009,348 B2 | 3/2006 | Mogilner et al. | |
| 7,015,654 B1 | 3/2006 | Kuhlmann et al. | |
| 7,030,572 B2 | 4/2006 | Nijhof et al. | |
| 7,071,630 B1 | 7/2006 | York | |
| 7,202,608 B2 | 4/2007 | Robinson et al. | |
| 7,215,086 B2 | 5/2007 | Maxik | |
| 7,479,741 B2 * | 1/2009 | Haener et al. | 315/291 |
| 7,567,040 B2 * | 7/2009 | Pong et al. | 315/276 |
| 2002/0038157 A1 | 3/2002 | Dowling et al. | |
| 2002/0044066 A1 | 4/2002 | Dowling et al. | |
| 2002/0048169 A1 | 4/2002 | Dowling et al. | |
| 2002/0070688 A1 | 6/2002 | Dowling et al. | |
| 2002/0074559 A1 | 6/2002 | Dowling et al. | |
| 2002/0078221 A1 | 6/2002 | Blackwell et al. | |
| 2002/0126503 A1 * | 9/2002 | Reed | 362/555 |
| 2002/0130627 A1 | 9/2002 | Dowling et al. | |
| 2002/0145394 A1 | 10/2002 | Morgan et al. | |
| 2002/0145869 A1 | 10/2002 | Dowling | |
| 2002/0152045 A1 | 10/2002 | Dowling et al. | |
| 2002/0154525 A1 | 10/2002 | Duerbaum | |
| 2002/0158583 A1 | 10/2002 | Lys et al. | |
| 2002/0176259 A1 | 11/2002 | Ducharme | |
| 2003/0011538 A1 | 1/2003 | Lys et al. | |
| 2003/0028260 A1 | 2/2003 | Blackwell | |
| 2003/0057884 A1 | 3/2003 | Dowling et al. | |
| 2003/0057887 A1 | 3/2003 | Dowling et al. | |
| 2003/0057888 A1 | 3/2003 | Archenhold et al. | |
| 2003/0076281 A1 | 4/2003 | Morgan et al. | |
| 2003/0085749 A1 | 5/2003 | Xu et al. | |
| 2003/0100837 A1 | 5/2003 | Lys et al. | |
| 2003/0107887 A1 | 6/2003 | Eberl | |
| 2003/0133292 A1 | 7/2003 | Mueller et al. | |
| 2003/0161169 A1 | 8/2003 | Kwon | |
| 2003/0189412 A1 | 10/2003 | Cunningham | |
| 2003/0222587 A1 | 12/2003 | Dowling et al. | |
| 2003/0222603 A1 | 12/2003 | Mogilner et al. | |
| 2004/0036006 A1 | 2/2004 | Dowling | |
| 2004/0052076 A1 | 3/2004 | Mueller et al. | |
| 2004/0090191 A1 | 5/2004 | Mueller et al. | |
| 2004/0090787 A1 | 5/2004 | Dowling et al. | |
| 2004/0095185 A1 | 5/2004 | Bucks et al. | |
| 2004/0105261 A1 | 6/2004 | Ducharme et al. | |
| 2004/0113568 A1 | 6/2004 | Dowling et al. | |
| 2004/0116039 A1 | 6/2004 | Mueller et al. | |
| 2004/0130909 A1 | 7/2004 | Mueller et al. | |
| 2004/0145320 A1 | 7/2004 | Nijhof et al. | |
| 2004/0155844 A1 | 8/2004 | Stopa | |
| 2004/0178751 A1 | 9/2004 | Mueller et al. | |
| 2004/0212320 A1 | 10/2004 | Dowling et al. | |
| 2004/0212321 A1 | 10/2004 | Lys et al. | |
| 2004/0212993 A1 | 10/2004 | Morgan et al. | |
| 2004/0264193 A1 * | 12/2004 | Okumura | 362/276 |
| 2005/0029527 A1 | 2/2005 | Yamamoto et al. | |
| 2005/0099824 A1 | 5/2005 | Dowling et al. | |
| 2005/0116667 A1 | 6/2005 | Mueller et al. | |
| 2005/0151489 A1 | 7/2005 | Lys et al. | |
| 2005/0122065 A1 | 9/2005 | Young | |
| 2005/0213352 A1 | 9/2005 | Lys et al. | |
| 2005/0213353 A1 | 9/2005 | Lys | |
| 2005/0218838 A1 | 10/2005 | Lys | |
| 2005/0218870 A1 | 10/2005 | Lys | |
| 2005/0219872 A1 | 10/2005 | Lys | |
| 2005/0231133 A1 | 10/2005 | Lys | |
| 2005/0236029 A1 | 10/2005 | Dowling | |
| 2005/0236998 A1 | 10/2005 | Mueller | |
| 2005/0253533 A1 | 11/2005 | Lys et al. | |
| 2005/0275626 A1 | 12/2005 | Mueller | |
| 2005/0276053 A1 | 12/2005 | Nortrup | |
| 2006/0002110 A1 | 1/2006 | Dowling | |
| 2006/0087298 A1 | 4/2006 | Turchi | |

FOREIGN PATENT DOCUMENTS

| | | |
|---|---|---|
| WO | WO 2004/057924 | 7/2004 |
| WO | WO 2004/100612 | 11/2004 |
| WO | WO 2004/100614 | 11/2004 |
| WO | WO 2005/009086 | 1/2005 |

OTHER PUBLICATIONS

Office Action dated Oct. 2, 2006 from co-pending U.S. Appl. No. 11/079,904.

Notice of Allowance dated Jun. 22, 2007 from co-pending U.S. Appl. No. 11/079,450.

Claims as Allowed from co-pending U.S. Appl. No. 11/079,450.
Office Action dated May 31, 2007 from co-pending U.S. Appl. No. 11/079,450.
Office Action dated Sep. 27, 2006 from co-pending U.S. Appl. No. 11/079,450.
Notice of Allowance dated Feb. 8, 2007 from co-pending U.S. Appl. No. 11/079,928.
Claims as Allowed from co-pending U.S. Appl. No. 11/079,928.
Office Action dated Oct. 16, 2006 from co-pending U.S. Appl. No. 11/079,928.
Office Action dated Jun. 29, 2007 from co-pending U.S. Appl. No. 11/079,905.
Office Action mailed Oct. 31, 2007 from co-pending U.S. Appl. No. 11/079,904.
Office Action mailed Dec. 14, 2007 from co-pending U.S. Appl. No. 11/079,461.
Notice of Allowance mailed Dec. 14, 2007 from co-pending U.S. Appl. No. 11/079,905.
Claims as Allowed from co-pending U.S. Appl. No. 11/079,905.
Office Action mailed Apr. 3, 2008 from co-pending U.S. Appl. No. 11/079,904.
Office Action mailed Apr. 7, 2008 from co-pending U.S. Appl. No. 11/079,448.

* cited by examiner

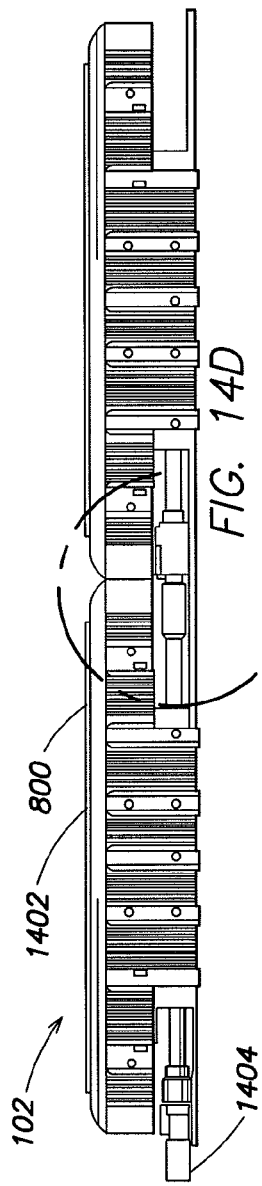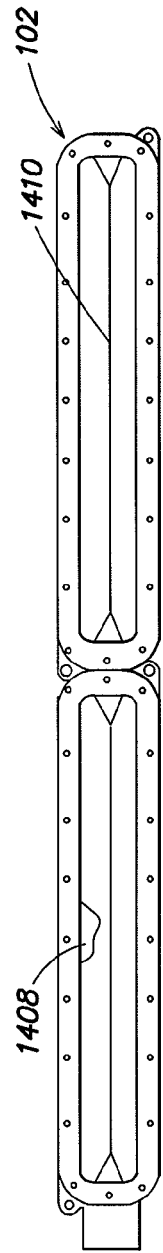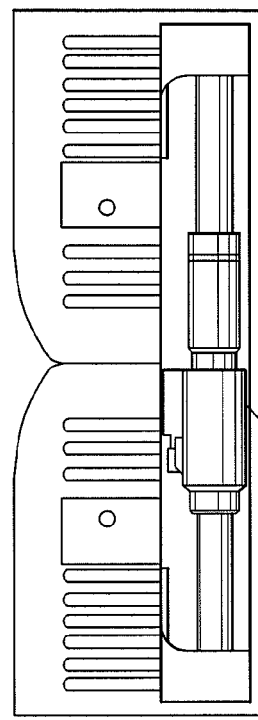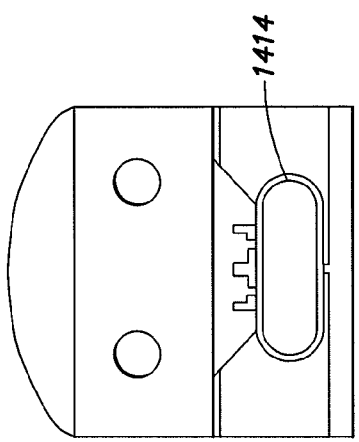

| Fig. 30A | Fig. 30B |

| Fig. 33A | Fig. 33B |
|---|---|

LED POWER CONTROL METHODS AND APPARATUS

CROSS-REFERENCE TO RELATED APPLICATIONS

This application claims the benefit under 35 U.S.C. §120 as a continuation (CON) of U.S. non-provisional application Ser. No. 11/079,450, filed Mar. 14, 2005, entitled "Led Power Control Methods and Apparatus." Application Ser. No. 11/079,450 claims the benefit, under 35 U.S.C. §119(e), of U.S. provisional application Ser. No. 60/553,318, filed Mar. 15, 2004, entitled "Power Control Methods and Apparatus." Each of the foregoing applications is hereby incorporated herein by reference.

FIELD OF THE DISCLOSURE

The present disclosure relates generally to controlling power delivered to a load. In some examples, a controlled predetermined power is provided to a load without requiring any feedback from the load (e.g., without monitoring load voltage and current) and/or regulation of load voltage or load current.

BACKGROUND

A DC-DC converter is a well-known electrical device that accepts a DC input voltage and provides a DC output voltage. DC-DC converters generally are configured to provide a regulated DC output voltage to a load based on an unregulated DC input voltage which in some cases is different from the regulated output voltage. For example, in many automotive applications in which a battery provides a DC power source having an unregulated voltage of approximately 12 Volts, a DC-DC converter may be employed to receive the unregulated 12 Volts DC as an input and provide a regulated DC output voltage to drive various electronic circuitry in a vehicle (instrumentation, accessories, engine control, lighting, radio/stereo, etc.). The regulated DC output voltage may be lower, higher or the same as the input voltage from the battery.

More generally, a DC-DC converter may be employed to transform an unregulated voltage provided by any of a variety of DC power sources such as batteries to a more appropriate regulated voltage for driving a given load. In some cases, the unregulated DC input voltage may be derived from an AC power source, such as a 120 Vrms/60 Hz AC line voltage which is rectified and filtered by a bridge rectifier/filter circuit arrangement. In this case, as discussed further below, protective isolation components generally are employed in the DC-DC converter to ensure safe operation, given the potentially dangerous voltages involved.

FIG. 1 illustrates a circuit diagram of a conventional step-down DC-DC converter 50 configured to provide a regulated DC output voltage 32 ($V_{out}$) to a load 40, based on a higher unregulated DC input voltage 30 ($V_{in}$). The step-down converter of FIG. 1 also is commonly referred to as a "buck" converter. From a functional standpoint, the buck converter of FIG. 1 generally is representative of other types of DC-DC converters, some examples of which are discussed in turn below.

DC-DC converters like the buck converter of FIG. 1 employ a transistor or equivalent device that is configured to operate as a saturated switch which selectively allows energy to be stored in an energy storage device (e.g., refer to the transistor switch 20 and the inductor 22 in FIG. 1). Although FIG. 1 illustrates such a transistor switch as a bipolar junction transistor (BJT), field effect transistors (FETs) also may be employed as switches in various DC-DC converter implementations. By virtue of employing such a transistor switch, DC-DC converters also are commonly referred to as "switching regulators" due to their general functionality.

In particular, the transistor switch 20 in the circuit of FIG. 1 is operated to periodically apply the unregulated DC input voltage 30 ($V_{in}$) across an inductor 22 (L) for relatively short time intervals (in FIG. 1 and the subsequent figures, unless otherwise indicated, a single inductor is depicted to schematically represent one or more actual inductors arranged in any of a variety of serial/parallel configurations to provide a desired inductance). During the intervals in which the transistor switch is "on" or closed (i.e., passing the input voltage $V_{in}$ to the inductor), current flows through the inductor based on the applied voltage and the inductor stores energy in its magnetic field. When the switch is turned "off" or opened (i.e., the DC input voltage is removed from the inductor), the energy stored in the inductor is transferred to a filter capacitor 34 which functions to provide a relatively smooth DC output voltage $V_{out}$ to the load 40 (i.e., the capacitor provides essentially continuous energy to the load between inductor energy storage cycles).

More specifically, in FIG. 1, when the transistor switch 20 is on, a voltage $V_L = V_{out} - V_{in}$ is applied across the inductor 22. This applied voltage causes a linearly increasing current $I_L$ to flow through the inductor (and to the load and the capacitor) based on the relationship $V_L = L \cdot dI_L/dt$. When the transistor switch 20 is turned off, the current $I_L$ through the inductor continues to flow in the same direction, with the diode 24 (D1) now conducting to complete the circuit. As long as current is flowing through the diode, the voltage $V_L$ across the inductor is fixed at $V_{out} - V_{diode}$, causing the inductor current $I_L$ to decrease linearly as energy is provided from the inductor's magnetic field to the capacitor and the load. FIG. 2 is a diagram illustrating various signal waveforms for the circuit of FIG. 1 during the switching operations described immediately above.

Conventional DC-DC converters may be configured to operate in different modes, commonly referred to as "continuous" mode and "discontinuous" mode. In continuous mode operation, the inductor current $I_L$ remains above zero during successive switching cycles of the transistor switch, whereas in discontinuous mode, the inductor current starts at zero at the beginning of a given switching cycle and returns to zero before the end of the switching cycle. To provide a somewhat simplified yet informative analysis of the circuit of FIG. 1, the discussion below considers continuous mode operation, and assumes for the moment that there are no voltage drops across the transistor switch when the switch is on (i.e., conducting) and that there is a negligible voltage drop across the diode D1 while the diode is conducting current. With the foregoing in mind, the changes in inductor current over successive switching cycles may be examined with the aid of FIG. 3.

FIG. 3 is a graph on which is superimposed the voltage at the point $V_X$ shown in FIG. 1 (again, ignoring any voltage drop across the diode D1) based on the operation of the transistor switch 20, and the current through the inductor $I_L$ for two consecutive switching cycles. In FIG. 3, the horizontal axis represents time t and a complete switching cycle is represented by the time period T, wherein the transistor switch "on" time is indicated as $t_{on}$ and the switch "off" time is indicated as $t_{off}$ (i.e., $T = t_{on} + t_{off}$).

For steady state operation, it should be appreciated that the inductor current $I_L$ at the start and end of a switching cycle is essentially the same, as can be observed in FIG. 3 by the indication $I_o$. Accordingly, from the relation $V_L = L \cdot dI_L/dt$, the change of current $dI_L$ over one switching cycle is zero, and may be given by:

$$dI_L = 0 = \frac{1}{L}\left(\int_0^{t_{on}} (V_{in} - V_{out}) dt + \int_{t_{on}}^T (-V_{out}) dt\right)$$

which simplifies to $$(V_{in} - V_{out})t_{on} - (V_{out})(T - t_{on}) = 0$$

or $$\frac{V_{out}}{V_{in}} = \frac{t_{on}}{T} = D,$$

where D is defined as the "duty cycle" of the transistor switch, or the proportion of time per switching cycle that the switch is on and allowing energy to be stored in the inductor. From the foregoing, it can be seen that the ratio of the output voltage to the input voltage is proportional to D; namely, by varying the duty cycle D of the switch in the circuit of FIG. 1, the output voltage $V_{out}$ may be varied with respect to the input voltage $V_{in}$ but cannot exceed the input voltage, as the maximum duty cycle D is 1.

Hence, as mentioned earlier, the conventional buck converter of FIG. 1 is particularly configured to provide to the load 40 a regulated output voltage $V_{out}$ that is lower than the input voltage $V_{in}$. To ensure stability of the output voltage $V_{out}$, as shown in FIG. 1, the buck converter employs a feedback control loop 46 to control the operation of the transistor switch 20. Generally, as indicated in FIG. 1 by connection 47, power for various components of the feedback control loop 46 may be derived from the DC input voltage $V_{in}$ or alternatively another independent source of power.

In the feedback control loop 46 of FIG. 1, a scaled sample voltage $V_{sample}$ of the DC output voltage $V_{out}$ is provided as an input to the feedback control loop 46 (e.g., via the resistors $R_2$ and $R_3$) and compared by an error amplifier 28 to a reference voltage $V_{ref}$. The reference voltage $V_{ref}$ is a stable scaled representation of the desired regulated output voltage $V_{out}$. The error amplifier 28 generates an error signal 38 (in this example, a positive voltage signal over some predetermined range) based on the comparison of $V_{sample}$ and $V_{ref}$ and the magnitude of this error signal ultimately controls the operation of the transistor switch 20, which in turn adjusts the output voltage $V_{out}$ via adjustments to the switch's duty cycle. In this manner, the feedback control loop maintains a stable regulated output voltage $V_{out}$.

More specifically, the error signal 38 serves as a control voltage for a pulse width modulator 36 which also receives a pulse stream 42 having a frequency $f=1/T$ provided by an oscillator 26. In conventional DC-DC converters, exemplary frequencies f for the pulse stream 42 include, but are not limited to, a range from approximately 50 kHz to 100 kHz. The pulse width modulator 36 is configured to use both the pulse stream 42 and the error signal 38 to provide an on/off control signal 44 that controls the duty cycle of the transistor switch 20. In essence, a pulse of the pulse stream 42 acts as a "trigger" to cause the pulse width modulator to turn the transistor switch 20 on, and the error signal 38 determines how long the transistor switch stays on (i.e., the length of the time period $t_{on}$ and hence the duty cycle D).

For example, if the error signal 38 indicates that the sampled output voltage $V_{sample}$ is higher than $V_{ref}$ (i.e., the error signal 38 has a relatively lower value), the pulse width modulator 36 is configured to provide a control signal 44 with relatively shorter duration "on" pulses or a lower duty cycle, thereby providing relatively less energy to the inductor while the transistor switch 20 is on. In contrast, if the error signal 38 indicates that $V_{sample}$ is lower than $V_{ref}$ (i.e., the error signal has a relatively higher value), the pulse width modulator is configured to provide a control signal with relatively longer duration "on" pulses or a higher duty cycle, thereby providing relatively more energy to the inductor while the transistor switch 20 is on. Accordingly, by modulating the duration of the "on" pulses of the control signal 44 via the error signal 38, the output voltage $V_{out}$ is regulated by the feedback control loop 46 to approximate a desired output voltage represented by $V_{ref}$.

Other types of conventional DC-DC converters in addition to the buck converter discussed above in connection with FIG. 1 include, for example, a step-up or "boost" converter which provides a regulated DC output voltage that is higher than the input voltage, an inverting or "buck-boost" converter that may be configured to provide a regulated DC output voltage that is either lower or higher than the input voltage and has a polarity opposite to that of the input voltage, and a "CUK" converter that is based on capacitive energy transfer principals. Like the buck converter, in each of these other types of converters the duty cycle D of the transistor switch determines the ratio of the output voltage $V_{out}$ to the input voltage $V_{in}$.

FIG. 4 illustrates a conventional boost converter 52 and FIG. 5 illustrates a conventional buck-boost converter or inverting regulator 54. Both of these converters may be analyzed similarly to the buck converter of FIG. 1 to determine how the duty cycle D affects the ratio $V_{out}/V_{in}$. FIG. 6 illustrates an example of a "CUK" converter 56, which employs capacitive rather than primarily inductive energy transfer to a load based on current balance in a capacitor. The circuit of FIG. 6 is derived from a duality principle based on the buck-boost converter of FIG. 5 (i.e., the relationship between the duty cycle D and the ratio $V_{out}/V_{in}$ in the CUK converter is identical to that of the buck-boost converter). One noteworthy characteristic of the CUK converter is that the input and output inductors $L_1$ and $L_2$ shown in FIG. 6 create a substantially smooth current at both the input and the output of the converter, while the buck, boost, and buck-boost converters have a pulsed input current (e.g., see FIG. 2, second diagram from top).

For all of the converters shown in FIGS. 4-6, the details of the voltage regulation feedback control loop have been omitted for simplicity; however, it should be appreciated that like the buck converter shown in FIG. 1, each of the converters shown in FIGS. 4-6 would include a feedback control loop to provide output voltage regulation, as discussed above in connection with FIG. 1.

In some conventional DC-DC converter configurations, an input current sensing and limiting technique also may be employed to facilitate improved operation of the converter, especially in continuous mode. Such converters commonly are referred to as "current-mode" regulators. One of the issues addressed by current-mode regulators is that of potentially unpredictable energy build-up in the inductor during successive switching cycles.

For example, with reference again to FIG. 3, since the inductor current $I_L$ remains above zero in continuous mode, the energy stored in the inductor's magnetic field at any given time may depend not only on energy stored during the most recent switching cycle, but also on residual energy that was stored during one or more previous switching cycles. This situation generally results in a somewhat unpredictable amount of energy being transferred via the inductor (or other energy transfer element) in any given switching cycle. Averaged over time, however, the smoothing function of the output capacitor 34 in the circuits discussed above, together with the voltage regulation function provided by the feedback control loop, facilitate a substantially controlled delivery of power to the load based on the regulated output voltage $V_{out}$.

The feedback control loop in the circuits discussed above, however, generally has a limited response time, and there may be some changes in input conditions (e.g., $V_{in}$) and/or output power requirements of the DC-DC converter that could compromise the stability of the feedback control loop. In view of the foregoing, current-mode regulators generally are configured to limit the peak current $I_p$ through the inductor when the transistor switch is on (e.g., refer to FIG. 3). This input current-limiting feature also helps to prevent excessive inductor currents in the event of significant changes in input conditions and/or significant changes in load requirements which call for (via the voltage regulation feedback control loop) a duty cycle that results in an inductor current which may adversely affect the stability of the feedback loop, and/or be potentially damaging to the circuit.

FIG. 7 is a circuit diagram illustrating an example of a current-mode regulator 58 based on the buck-boost converter configuration shown in FIG. 5. In the diagram of FIG. 7, additional details of the voltage regulation feedback control loop 46 are shown to facilitate the discussion of input current limiting. It should be appreciated that the concepts discussed below in connection with the input current sensing and limiting features of the circuit of FIG. 7 may be similarly applied to the other types of conventional DC-DC converters discussed herein.

The feedback control loop 46 which controls the operation of the transistor switch 20 in the current-mode circuit of FIG. 7 differs from that shown in FIG. 1 in that the circuit of FIG. 7 additionally includes an input current sensing device 60 (i.e., the resistor $R_{sense}$) and a comparator 62. Also, the pulse width modulator 36 used in the feedback control loop in the example of FIG. 7 is a D-type flip-flop with set and reset control. As shown in FIG. 7, the flip-flop pulse width modulator is arranged such that its "D" and "Clk" inputs are tied to ground, the oscillator 26 provides the pulse stream 42 to the "Set" input of the flip-flop (low activated, $\overline{S}$), the comparator 62 provides a signal 64 to the "Reset" input of the flip-flop (low activated, $\overline{R}$), and the flip-flop's "Q" output provides the pulse width modulated control signal 44.

In this arrangement, when the transistor switch 20 is off or open, there is no current through the resistor $R_{sense}$; hence, the voltage at the inverting input of the comparator 62 is zero. Recall also from FIG. 1 that the error signal 38 in this example is a positive voltage over some predetermined range that indicates the difference between the sampled output voltage $V_{sample}$ and $V_{ref}$. Thus, when the transistor switch 20 is open, the signal 64 output by the comparator is a logic high signal (i.e., the reset input $\overline{R}$ of the flip-flop is not activated).

With the flip-flop in this state, the next low-going pulse of the pulse stream 42 activates the flip-flop's set input $\overline{S}$, thereby driving the flip-flop's Q output to a logic high state and turning the transistor switch 20 on. As discussed above, this causes the inductor current $I_L$ to increase, and with the switch closed this inductor current ($I_{L(on)}$) also passes through the resistor $R_{sense}$, thereby developing a voltage $V_{sense}$ across this resistor. When the voltage $V_{sense}$ exceeds the error signal 38, the signal 64 output by the comparator 62 switches to a logic low state, thereby activating the flip-flop's reset input $\overline{R}$ and causing the Q output to go low (and the transistor switch 20 to turn off). When the transistor is turned off, the voltage $V_{sense}$ returns to zero and the signal 64 returns to a logic high state, thereby deactivating the flip flop's reset input. At this point, the next occurrence of a low-going pulse of the pulse stream 42 activates the flip flop's set input $\overline{S}$ to start the cycle over again.

Accordingly, in the circuit of FIG. 7, the relationship between $V_{sense}$ and the error signal 38 determines the duty cycle D of the transistor switch 20; specifically, if the voltage $V_{sense}$ exceeds the error signal 38, the switch opens. Based on the foregoing, the peak current $I_p$ through the inductor (see FIG. 3) may be predetermined by selecting an appropriate value for the resistor $R_{sense}$, given the expected range of the error signal 38. The action of the comparator 62 ensures that even in situations where changes in load requirements cause $V_{sample}$ to be substantially below $V_{ref}$ (resulting in a relatively higher magnitude error signal and a potentially greater duty cycle), the current $I_{L(on)}$ through the inductor ultimately may limit the duty cycle so that the inductor current does not exceed a predetermined peak current. Again, this type of "current-mode" operation generally enhances the stability of the feedback control loop and reduces potentially damaging conditions in the DC-DC converter circuitry.

For many electronics applications, power supplies may be configured to provide a regulated DC output voltage from an input AC line voltage (e.g., 120 $V_{rms}$, 60 Hz). For example, conventional "linear" power supplies typically employ a substantial (relatively large and heavy) 60 Hz power transformer to reduce the input AC line voltage at approximately 120 $V_{rms}$ to some lower (and less dangerous) secondary AC voltage. This lower secondary AC voltage then is rectified (e.g., by a diode bridge rectifier) and filtered to provide an unregulated DC voltage. Often, a linear regulator is then employed to provide a predetermined regulated DC voltage output based on the unregulated DC voltage.

By utilizing the unique switching action of a DC-DC converter, however, it is possible to design a power supply that does not require the substantial 60 Hz power transformer at the input stage typical of linear power supplies, thereby in many cases significantly reducing the size and weight and increasing the efficiency of the power supply. For example, power supplies based on linear regulators generally have power conversion efficiencies on the order of approximately 50% or lower, whereas power supplies based on switching regulators have efficiencies on the order of approximately 80% or higher.

In some power supplies based on switching regulators, an unregulated DC voltage may be provided as an input to a DC-DC converter directly from a rectified and filtered AC line voltage. Such an arrangement implies that there is no protective isolation between the AC line voltage and the DC input voltage to the DC-DC converter. Also, the unregulated DC input voltage to the converter may be approximately 160 Volts DC (based on a rectified 120 $V_{rms}$ line voltage) or higher (up to approximately 400 Volts if power factor correction is employed, as discussed below in connection with FIGS. 9A and 9B), which is potentially quite dangerous. In view of the foregoing, DC-DC converters for such power supply arrangements typically are configured with isolation features to address these issues so as to generally comport with appropriate safety standards.

FIG. 8 is a circuit diagram illustrating an example of such a power supply 66 incorporating a DC-DC converter or switching regulator. As discussed above, the power supply 66 receives as an input an AC line voltage 67 which is rectified by a bridge rectifier 68 and filtered by a capacitor 35 ($C_{filter}$) to provide an unregulated DC voltage as an input $V_{in}$ to the DC-DC converter portion 69. The DC-DC converter portion 69 is based on the inverting regulator (buck-boost) arrangement shown in FIG. 5; however, in FIG. 8, the energy-storage inductor has been replaced with a high frequency transformer 72 to provide isolation between the unregulated high DC input voltage $V_{in}$ and the DC output voltage $V_{out}$. Such a DC-DC converter arrangement incorporating a transformer rather than an inductor commonly is referred to as a "flyback" converter.

In the circuit of FIG. 8, the "secondary side" of the converter portion 69 (i.e., the diode D1 and the capacitor C) is arranged such that the converter provides a DC output voltage having the same polarity as the DC input voltage (note the opposing "dot" convention for the windings of the transformer 72, indicating that the primary transformer winding is wound in the opposite direction of the secondary transformer winding). The DC-DC converter portion 69 also includes an isolation element 70 (e.g., a second high-frequency transformer or optoisolator) in the voltage regulation feedback control loop to link the error signal from the error amplifier 28 to the modulator 36 (the error signal input to and output from the isolation element 70 is indicated by the reference numerals 38A and 38B).

In view of the various isolation features in the circuit of FIG. 8, although not shown explicitly in the figure, it should be appreciated that power for the oscillator/modulation circuitry generally may be derived from the primary side unregulated higher DC input voltage $V_{in}$, whereas power for other elements of the feedback control loop (e.g., the reference voltage $V_{ref}$, the error amplifier 28) may be derived from the secondary side regulated DC output voltage $V_{out}$. Alternatively, as mentioned above, power for the components of the feedback loop may in some cases be provided by an independent power source.

FIG. 9 is a circuit diagram illustrating yet another example of a power supply 74 incorporating a different type of DC-DC converter that provides input-output isolation. The DC-DC converter portion 75 of the power supply 74 shown in FIG. 9 commonly is referred to as a "forward" converter, and is based on the step-down or "buck" converter discussed above in connection with FIG. 1. In particular, the converter portion 75 again includes a transformer 72 like the circuit of FIG. 8, but also includes a secondary side inductor 76 and additional diode 77 (D2) not present in the flyback converter shown in FIG. 8 (note that the diode D2, the inductor 76 and the capacitor 34 resemble the buck converter configuration illustrated in FIG. 1). In the forward converter, the diode D1 ensures that only positive transformer secondary voltages are applied to the output circuit while diode D2 provides a circulating path for current in the inductor 76 when the transformer voltage is zero or negative.

Other well-known modifications may be made to the forward converter shown in FIG. 9 to facilitate "full-wave" conduction in the secondary circuit. Also, while not indicated explicitly in the figures, both of the exemplary power supplies shown in FIGS. 8 and 9 may be modified to incorporate current-mode features as discussed above in connection with FIG. 7 (i.e., to limit the current in the primary winding of the transformer 72).

Although the circuits of FIGS. 8 and 9 include two isolation elements (e.g., the transformer 72 and the isolation element 70) as opposed to a single 60 Hz power transformer as in a linear power supply, the difference in size and weight between a switching power supply and a linear power supply is significant; the size of a transformer generally is determined by the core size, which decreases dramatically at the higher switching frequencies of the switching supply (on the order of 50 kHz to 100 kHz) as opposed to the line frequency (60 Hz). Also, switching supplies operate at significantly cooler temperatures as a result of their increased efficiency and lower heat dissipation as compared to linear supplies. As a result, switching power supplies are commonly utilized for many consumer electronics applications (e.g., computers and other electronic instruments and devices).

Examples of commercial switching power supply packages include small modular units, wall plug-ins, open-framed units, or enclosed units. Small modular units generally are used in moderately low-power applications from approximately 10 to 25 Watts. Wall plug-in supplies typically provide even less power, while open-framed or enclosed units may be configured to supply substantially more power (e.g., 500 to 1000 Watts or more). Examples of common regulated DC output voltages from commercially available switching power supplies include +5V, ±12V, ±15V, and 24V.

Because of the switching nature of DC-DC converters, these apparatus generally draw current from a power source in short pulses (e.g., see $I_{in}$ FIG. 2). This condition may have some generally undesirable effects when DC-DC converters draw power from an AC power source (e.g., as in the arrangements of FIGS. 8 and 9).

In particular, for maximum power efficiency from an AC power source, the input current ultimately drawn from the AC line voltage ideally should have a sinusoidal wave shape and be in phase with the AC line voltage. This situation commonly is referred to as "unity power factor," and generally results with purely resistive loads. The switching nature of the DC-DC converter and resulting pulsed current draw (i.e., significantly non-sinusoidal current draw), however, causes these apparatus to have less than unity power factor, and thus less than optimum power efficiency (notwithstanding their improved efficiency over conventional linear supplies).

More specifically, the "apparent power" drawn from an AC power source by a load that is not a purely resistive load (i.e., a switching power supply drawing power from an AC line voltage) is given by multiplying the RMS voltage applied to the load and the RMS current drawn by the load. This apparent power reflects how much power the device appears to be drawings from the source. However, the actual power drawn by the load may be less than the apparent power, and the ratio of actual to apparent power is referred to as the load's "power factor" (the power factor traditionally is given by the cosine of the phase angle between applied voltage and current drawn). For example, a device that draws an apparent power of 100 Volt-amps and has a 0.5 power factor actually consumes 50 Watts of power, not 100 Watts; stated differently, in this example, a device with a 0.5 power factor appears to require twice as much power from the source than it actually consumes.

As mentioned above, conventional DC-DC converters characteristically have significantly less than unity power factor due to their switching nature and pulsed current draw. Additionally, if the DC-DC converter were to draw current from the AC line voltage with only intervening rectification and filtering, the pulsed non-sinusoidal current drawn by the DC-DC converter would place unusual stresses and introduce generally undesirable noise and harmonics on the AC line voltage (which may adversely affect the operation of other devices drawing power from the AC line voltage).

In view of the foregoing, some conventional switching power supplies are equipped with, or used in conjunction with, power factor correction apparatus that are configured to address the issues noted above and provide for a more efficient provision of power from an AC power source. In particular, such power factor correction apparatus generally operate to "smooth out" the pulsed current drawn by a DC-DC converter, thereby lowering its RMS value, reducing undesirable harmonics, improving the power factor, and reducing the chances of an AC mains circuit breaker tripping due to peak currents.

In some conventional arrangements, a power factor correction apparatus is itself a type of switched power converter device, similar in construction to the various DC-DC converters discussed above, and disposed for example between an AC bridge rectifier and a DC-DC converter that ultimately provides power to a load. This type of power factor correction apparatus acts to precisely control its input current on an instantaneous basis so as to substantially match the waveform and phase of its input voltage (i.e., a rectified AC line voltage). In particular, the power factor correction apparatus may be configured to monitor a rectified AC line voltage and utilize switching cycles to vary the amplitude of the input current waveform to bring it closer into phase with the rectified line voltage.

FIG. 9A is a circuit diagram generally illustrating such a conventional power factor correction apparatus 520. As discussed above, the power factor correction apparatus is configured so as to receive as an input 65 the rectified AC line voltage $V_{AC}$ from the bridge rectifier 68, and provide as an output the voltage $V_{in}$ that is then applied to a DC-DC converter portion of a power supply (e.g., with reference to FIGS. 8 and 9, the power factor correction apparatus 520 would be disposed between the bridge rectifier 68 and the DC-DC converter portions 69 and 75, respectively). As can be seen in FIG. 9A, a common example of a power factor correction apparatus 520 is based on a boost converter topology (see FIG. 4 for an example of a DC-DC converter boost configuration) that includes an inductor $L_{PFC}$, a switch $SW_{PFC}$, a diode $D_{PFC}$, and the filter capacitor 35 across which the voltage $V_{in}$ is generated.

The power factor correction apparatus 520 of FIG. 9A also includes a power factor correction (PFC) controller 522 that monitors the rectified voltage $V_{AC}$, the generated voltage $V_{in}$ provided as an output to the DC-DC converter portion, and a signal 71 ($I_{samp}$) representing the current $I_{AC}$ drawn by the apparatus 520. As illustrated in FIG. 9A, the signal $I_{samp}$ may be derived from a current sensing element 526 (e.g., a voltage across a resistor) in the path of the current $I_{AC}$ drawn by the apparatus. Based on these monitored signals, the PFC controller 522 is configured to output a control signal 73 to control the switch 75 ($SW_{PFC}$) such that the current $I_{AC}$ has a waveform that substantially matches, and is in phase with, the rectified voltage $V_{AC}$.

FIG. 9B is a diagram that conceptually illustrates the functionality of the PFC controller 522. Recall that, generally speaking, the function of the power factor correction apparatus 520 as a whole is to make itself look essentially like a resistance to an AC power source; in this manner, the voltage provided by the power source and the current drawn from the power source by the "simulated resistance" of the power factor correction apparatus have essentially the same waveform and are in phase, resulting in substantially unity power factor. Accordingly, a quantity $R_{PFC}$ may be considered as representing a conceptual simulated resistance of the power factor correction apparatus, such that, according to Ohm's law, $$V_{AC} = I_{AC} R_{PFC}$$

or $$G_{PFC} V_{AC} = I_{AC},$$

where $G_{PFC} = 1/R_{PFC}$ and represents an effective conductance of the power factor correction apparatus 520.

With the foregoing in mind, the PFC controller 522 shown in FIG. 9B implements a control strategy based on two feedback loops, namely a voltage feedback loop and a current feedback loop. These feedback loops work together to manipulate the instantaneous current $I_{AC}$ drawn by the power factor correction apparatus based on a derived effective conductance $G_{PFC}$ for the power factor correction apparatus. To this end, a voltage feedback loop 524 is implemented by comparing the voltage $V_{in}$ (provided as an output across the filter capacitor 35) to a reference voltage $V_{refPFC}$ representing a desired regulated value for the voltage $V_{in}$. The comparison of these values generates an error voltage signal $V_e$ which is applied to an integrator/low pass filter having a cutoff frequency of approximately 10-20 Hz. This integrator/low pass filter imposes a relatively slow response time for the overall power factor control loop, which facilitates a higher power factor; namely, because the error voltage signal $V_e$ changes slowly compared to the line frequency (which is 50 or 60 Hz), adjustments to $I_{AC}$ due to changes in the voltage $V_{in}$ (e.g., caused by sudden and/or significant load demands) occur over multiple cycles of the line voltage rather than abruptly during any given cycle.

In the controller shown in FIG. 9B, a DC component of the slowly varying output of the integrator/low pass filter essentially represents the effective conductance $G_{PFC}$ of the power factor correction apparatus; hence, the output of the voltage feedback loop 524 provides a signal representing the effective conductance $G_{PFC}$. Accordingly, based on the relationship given above, the PFC controller 522 is configured to multiply this effective conductance by the monitored rectified line voltage $V_{AC}$ to generate a reference current signal $I^*_{AC}$ representing the desired current to be drawn from the line voltage, based on the simulated resistive load of the apparatus 520. This signal $I^*_{AC}$ thus provides a reference or "set-point" input to the current control loop 528.

In particular, as shown in FIG. 9B, in the current control loop 528, the signal $I^*_{AC}$ is compared to the signal $I_{samp}$ which represents the actual current $I_{AC}$ being drawn by the apparatus 520. The comparison of these values generates a current error signal $I_e$ that serves as a control signal for a pulse width modulated (PWM) switch controller (e.g., similar to that discussed above in connection with FIG. 7). The PWM switch controller in turn outputs a signal 73 to control the switch $SW_{PFC}$ so as to manipulate the actual current $I_{AC}$ being drawn (refer again to FIG. 9A). Exemplary frequencies commonly used for the control signal 73 output by the PWM switch controller (and hence for the switch $SW_{PFC}$) are on the order of approximately 100 kHz. With the foregoing in mind, it should be appreciated that it is the resulting average value of a rapidly varying $I_{AC}$ that resembles a sinusoidal waveform, with an approximately 100 kHz ripple resulting from the switching operations. Generally, the current feedback loop and the switch control elements have to have enough bandwidth to follow a full wave rectified waveform, and hence a bandwidth of at least a few kHz is sufficient.

It should be appreciated that the foregoing discussion in connection with FIGS. 9A and 9B is primarily conceptual in nature to provide a general understanding of the power factor correction functionality. Presently, integrated circuit power factor correction controllers that may be employed as the PFC controller 522 shown in FIGS. 9A and 9B are available from various manufacturers (e.g., the Fairchild Semiconductor ML4821 PFC controller, the Linear Technology LT1248 or LT1249 PFC controllers, the ST Microelectronics L6561 PFC controller, etc.). Such controllers generally may be configured to operate the power factor correction apparatus 520 in either continuous or discontinuous switching modes (or around a boundary between continuous and discontinuous modes). Circuit particulars and further details of the theory of operation of such conventional integrated circuit power factor correction controllers are discussed, for example, in Fairchild Semiconductor Application Note 42030, "Theory and Application of the ML4821 Average Current Mode PFC Controller," August 1997, revised Oct. 25, 2000 (available at http://www.fairchildsemi.com), Linear Technology datasheets for the LT1248/LT1249 controllers (available at http://www.linear-tech.com), and ST Microlectronics Application Note AN966, "L6561 Enhanced Transition Mode Power Factor Corrector," by Claudio Adragna, March 2003 (available at http://www.st.com), each of which documents is hereby incorporated herein by reference.

Thus, in the conventional power factor correction schemes outlined in connection with FIGS. 9A and 9B, the power factor correction apparatus 520 provides as an output the regulated voltage $V_{in}$ across the capacitor 35, from which current may be drawn as needed by a load coupled to $V_{in}$ (e.g., by a subsequent DC-DC converter portion of a power supply). For sudden and/or excessive changes in load power requirements, the instantaneous value of the voltage $V_{in}$ may change dramatically; for example, in instances of sudden high load power requirements, energy reserves in the capacitor are drawn upon and $V_{in}$ may suddenly fall below the reference $V_{refPFC}$. As a result, the voltage feedback loop 524, with a relatively slow response time, attempts to adjust $V_{in}$ by causing the power factor correction apparatus to draw more current from the line voltage. Due to the relatively slow response time, though, this action may in turn cause an over-voltage condition for $V_{in}$, particularly if the sudden/excessive demand from the load no longer exists by the time an adjustment to $V_{in}$ is made. The apparatus then tries to compensate for the over-voltage condition, again subject to the slow response time of the voltage feedback loop 524, leading to some degree of potential instability. Similar sudden changes (either under- or over-voltage conditions) to $V_{in}$ may result from sudden/excessive perturbations on the line voltage 67, to which the apparatus 520 attempts to respond in the manner described above. From the foregoing, it should be appreciated that the slow response time that on the one hand facilitates power factor correction at the same time may result in a less than optimum input/output transient response capability. Accordingly, the voltage feedback loop response time/bandwidth in conventional power factor correction apparatus generally is selected to provide a practical balance between reasonable (but less than optimal) power factor correction and reasonable (but less than optimal) transient response.

It should be appreciated that in some switching power supply applications, a power factor correction apparatus may not be required or even significantly effective. For example, for small loads that draw relatively low power from a power source, the power factor of the switching power supply conventionally is considered to be not as important as in higher power applications; presumably, the power drawn by a small load comprises a relatively insignificant portion of the overall power available on a particular AC power circuit. In contrast, power factor correction may be important for larger loads consuming relatively higher power, in which the input current to the switching power supply may approach the maximum available from the AC power source.

SUMMARY

Various embodiments of the present disclosure are directed generally to methods and apparatus for providing and controlling power to at least some types of loads, wherein overall power efficiency typically is improved and functional redundancy of components is significantly reduced as compared to conventional arrangements. In different aspects, implementations of methods and apparatus according to various embodiments of the disclosure generally involve significantly streamlined circuits having fewer components, higher overall power efficiencies, and smaller space requirements.

In some embodiments, a controlled predetermined power is provided to a load without requiring any feedback information from the load (i.e., without monitoring load voltage and/or current). Furthermore, in one aspect of these embodiments, no regulation of load voltage and/or load current is required. In another aspect of such embodiments in which feedback is not required, isolation components typically employed between a DC output voltage of a DC-DC converter (e.g., the load supply voltage) and a source of power derived from an AC line voltage (e.g., a high DC voltage input to the DC-DC converter) in some cases may be eliminated, thereby reducing the number of required circuit components. In yet another aspect, eliminating the need for a feedback loop generally increases circuit speed and avoids potentially challenging issues relating to feedback circuit stability.

Based on the foregoing concepts, one embodiment of the present disclosure is directed to a "feed-forward" driver for an LED-based light source. Such a feed-forward driver (also referred to herein as a "power control apparatus") utilizes information known in advance regarding a desired power to be provided to the light source, and combines the functionality of a DC-DC converter and a light source controller to control the intensity of radiation generated by the light source based on modulating the average power delivered to the light source in a given time period, without monitoring or regulating the voltage or current provided to the light source. In one aspect of this embodiment, the feed-forward driver is configured to store energy to, and release energy from, one or more energy transfer elements using a "discontinuous mode" switching operation. This type of switching operation facilitates the transfer of a predictable quantum of energy per switching cycle, and hence a predictable controlled power delivery to the light source. The discontinuous mode switching operation employed in this embodiment may be similarly used in various feed-forward implementations for providing power to loads other than LED-based light sources (e.g., motors, actuators, relays, heating elements, etc.)

In another embodiment, the concept of "feeding-forward" known information about desired load conditions is utilized to facilitate power factor correction. For example, in one embodiment, a modified power factor correction apparatus according to the present disclosure is based on a DC-DC converter switching architecture (e.g., a boost converter), wherein control of the apparatus' switching operation is based on a predetermined desired load power and, more particularly, a total anticipated power draw from an AC power source. By knowing in advance the desired load power and determining the total anticipated power draw, the overall control loop response of the power factor correction apparatus may be significantly improved, particularly in situations in which the load power traverses a wide range in a short time period (e.g., load full off to load full on, or vice versa). Hence, a more stable power factor correction may be realized, in which smaller circuit components may be employed based on more predictable expectations for signal values, thereby reducing the cost and/or size of the implemented circuits.

In another embodiment, a power factor correction apparatus as described immediately above may be used in combination with one or more feed-forward drivers to efficiently provide power from an AC power source to one or more of a variety of loads, including LED-based light sources.

In yet another embodiment, multiple apparatus each including one or more loads, one or more power control apparatus (i.e., feed-forward drivers), and an optional conventional or modified power factor control apparatus, may be coupled to a distributed source of power (e.g., a distributed DC voltage or AC line voltage) in a network configuration. In one aspect of this embodiment, the multiple apparatus coupled to the distributed voltage may be configured as addressable devices so as to facilitate appropriate communication of load control information throughout the network. In another aspect of this embodiment, the load control information may be formatted for communication throughout the network in any of a variety of conventional communication protocols including, but not limited to, a DMX protocol.

In sum, exemplary embodiments pursuant to the present disclosure include, but are not limited to, the following:

One embodiment is directed to an apparatus, comprising at least one first LED, and at least one first power controller to provide a first controllably variable predetermined power to the at least one first LED without requiring any feedback information associated with the at least one first LED.

Another embodiment is directed to a method, comprising an act of providing a first controllably variable predetermined power to at least one first LED without requiring any feedback information associated with the at least one first LED.

Another embodiment is directed to an apparatus, comprising at least one first LED, and at least one first power controller configured to provide a first controllably variable predetermined power to the at least one first LED. In various aspects of this embodiment, the at least one first power controller includes a first single switch, a DC supply voltage provides a power source to the apparatus, the at least one first power controller is configured to apply a first converted DC voltage across the at least one first LED, and the at least one first power controller is further configured to control the first single switch to facilitate a first conversion of the DC supply voltage to the first converted DC voltage and concurrently provide the first controllably variable predetermined power to the at least one first LED.

Another embodiment is directed to a method, comprising an act of providing a first controllably variable predetermined power to at least one first LED, wherein a DC supply voltage provides a power source, wherein a first converted DC voltage is applied across the at least one first LED. The act of providing a first controllably variable predetermined power further includes an act of controlling a first single switch to facilitate a first conversion of the DC supply voltage to the first converted DC voltage and concurrently provide the first controllably variable predetermined power to the at least one first LED.

Another embodiment is directed to an apparatus, comprising at least one first LED configured to generate first radiation having a first spectrum, and a first feed-forward driver coupled to the at least one first LED and configured to controllably vary a first intensity of the first radiation without monitoring or regulating a first voltage or a first current provided to the at least one first LED.

Another embodiment is directed to a method, comprising acts of generating first radiation having a first spectrum from at least one first LED, and controllably varying a first intensity of the first radiation without monitoring or regulating a first voltage or a first current provided to the at least one first LED.

Another embodiment is directed to a network, comprising a distributed DC voltage to provide a power source to the network, and at least first and second apparatus coupled to the distributed DC voltage. Each of the first and second apparatus includes at least one first LED configured to generate first radiation having a first spectrum, and a first feed-forward driver coupled to the at least one first LED and configured to control a first intensity of the first radiation without monitoring or regulating a first voltage or a first current provided to the at least one first LED. The network further comprises at least one network controller, coupled to each of the first and second apparatus, to generate at least one radiation control signal that includes information representing the first intensity of the first radiation generated by each of the first and second apparatus.

Another embodiment is directed to a method, comprising acts of: distributing a DC supply voltage to at least first and second apparatus to provide a power source; in each of the first and second apparatus, generating first radiation having a first spectrum from at least one first LED; transmitting to both the first and second apparatus at least one radiation control signal that includes information representing a first intensity of the first radiation generated by each of the first and second apparatus; and in each of the first and second apparatus, controlling the first intensity of the first radiation, in response to the at least one radiation control signal, without monitoring or regulating a first voltage or a first current provided to the at least one first LED.

Another embodiment is directed to a network, comprising a distributed AC line voltage and at least first and second apparatus coupled to the distributed AC line voltage. Each of the first and second apparatus includes at least one first LED configured to generate first radiation having a first spectrum, and a first feed-forward driver coupled to the at least one first LED and configured to control a first intensity of the first radiation without monitoring or regulating a first voltage or a first current provided to the at least one first LED. The network further comprises at least one network controller, coupled to each of the first and second apparatus, to generate at least one radiation control signal that includes information representing the first intensity of the first radiation generated by each of the first and second apparatus.

Another embodiment is directed to a method, comprising acts of: distributing an AC line voltage to at least first and second apparatus; in each of the first and second apparatus, generating first radiation having a first spectrum from at least one first LED;

Transmitting to both the first and second apparatus at least one radiation control signal that includes information representing a first intensity of the first radiation generated by each of the first and second apparatus; and in each of the first and second apparatus, controlling the first intensity of the first radiation, in response to the at least one radiation control signal, without monitoring or regulating a first voltage or a first current provided to the at least one first LED.

Another embodiment is directed to an apparatus, comprising at least one energy transfer element to store input energy derived from a power source and to provide output energy to a load, at least one switch coupled to the at least one energy transfer element to control at least the input energy stored to the at least one energy transfer element, and at least one switch controller configured to receive at least one control signal representing a desired load power and control the at least one switch in response to the at least one control signal, wherein the at least one switch controller does not receive any feedback information relating to the load to control the at least one switch.

Another embodiment is directed to a method, comprising acts of: storing input energy derived from a power source to at least one energy transfer element; providing output energy from the at least one energy transfer element to a load; controlling at least the input energy stored to the at least one energy transfer element via at least one switch coupled to the at least one energy transfer element; receiving at least one control signal representing a desired load power; and controlling the at least one switch in response to the at least one control signal without receiving any feedback information relating to the load.

Another embodiment is directed to an apparatus, comprising at least one energy transfer element to store input energy derived from a power source and to provide output energy to a load, at least one switch coupled to the at least one energy transfer element to control at least the input energy stored to the at least one energy transfer element, and at least one switch controller configured to control the at least one switch, wherein the at least one switch controller is configured to control at least one of a frequency and a duty cycle of multiple switching operations of the at least one switch so as to provide a controllably variable predetermined power to the load.

Another embodiment is directed to a method, comprising acts of: storing input energy derived from a power source to at least one energy transfer element; providing output energy from the at least one energy transfer element to a load; controlling at least the input energy stored to the at least one energy transfer element via at least one switch coupled to the at least one energy transfer element; and controlling at least one of a frequency and a duty cycle of multiple switching operations of the at least one switch so as to provide a controllably predetermined variable power to the load.

Another embodiment is directed to an apparatus, comprising at least one energy transfer element to store input energy derived from a power source and to provide output energy to a load, at least one switch coupled to the at least one energy transfer element to control at least the input energy stored to the at least one energy transfer element, and at least one switch controller configured to control the at least one switch, wherein the at least one switch controller is configured to control the at least one switch based on at least one of a voltage output by the power source and a current drawn from the power source, and at least one control signal representing a desired load power, so as to provide a controllably variable predetermined power to the load.

Another embodiment is directed to a method, comprising acts of: storing input energy derived from a power source to at least one energy transfer element; providing output energy from the at least one energy transfer element to a load; controlling at least the input energy stored to the at least one energy transfer element via at least one switch coupled to the at least one energy transfer element; and controlling the at least one switch based on at least one of a voltage output by the power source and a current drawn from the power source, and at least one control signal representing a desired load power, so as to provide a controllably predetermined variable power to the load.

Another embodiment is directed to an apparatus, comprising at least one energy transfer element to store input energy derived from a power source and to provide output energy to a load, at least one switch coupled to the at least one energy transfer element to control at least the input energy stored to the at least one energy transfer element, and at least one switch controller configured to control the at least one switch to perform multiple switching operations in at least one time period, each switching operation transferring a predetermined quantum of the input energy to the at least one energy transfer element. The at least one switch controller is configured to control the multiple switching operations so as to vary at least one of the predetermined quantum of the input energy for at least two switching operations in the at least one time period and a number of the multiple switching operations in the at least one time period, so as to provide a controllably variable power to the load.

Another embodiment is directed to a method, comprising acts of: storing input energy derived from a power source to at least one energy transfer element; providing output energy from the at least one energy transfer element to a load; controlling at least the input energy stored to the at least one energy transfer element via at least one switch coupled to the at least one energy transfer element; and controlling the at least one switch to perform multiple switching operations in at least one time period, each switching operation transferring a controllably variable predetermined quantum of the input energy to the at least one energy transfer element. The act of controlling the at least one switch further comprises an act of controlling the multiple switching operations so as to vary at least one of the predetermined quantum of the input energy for at least two switching operations in the at least one time period and a number of the multiple switching operations in the at least one time period, so as to provide a controllably variable power to the load.

Another embodiment is directed to a power factor correction apparatus, comprising at least one first switch, and at least one switch controller to control the at least one first switch based at least on a predetermined desired power to be provided to a load coupled to the power factor correction apparatus.

Another embodiment is directed to a power factor correction method, comprising an act of controlling a current drawn from an AC power source based at least on a predetermined desired power to be provided to a load from the AC power source, so as to improve a power factor associated with the provision of actual power to the load.

Another embodiment is directed to an apparatus, comprising at least one power factor correction switch, at least one power control switch, and at least one switch controller to control both the at least one power factor correction switch and the at least one power control switch based at least on a predetermined desired power to be provided to a load coupled to the apparatus.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit radiation in response to current, light emitting polymers, electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

A given light source, including an LED, may be configured to generate electromagnetic radiation within the visible spectrum, outside the visible spectrum, or a combination of both. Hence, the terms "light" and "radiation" are used interchangeably herein. The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

In various implementations discussed herein, one or more light sources, including LED-based light sources, may be configured such that the radiation generated by the sources may be directly viewed by an observer (e.g., display), indirectly viewed (e.g., illumination), or used for other applications in which the radiation is not necessarily viewed by an observer (e.g., machine vision).

The term "controller" is used herein to describe various apparatus relating to the operation of one or more other devices. A controller can be implemented in numerous ways, such as with dedicated hardware including various analog and/or digital circuitry, by employing one or more microprocessors or other programmable devices configured to execute predetermined algorithms (e.g., programmed using software or microcode) to perform the various functions discussed herein, or as a combination of dedicated hardware to perform some functions and programmed microprocessors and associated circuitry to perform other functions. The term "processor" generally refers to a controller that includes one or more microprocessors or other programmable devices.

In various implementations, a controller or processor may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors/controllers, perform at least some of the functions discussed herein. Various storage media may be fixed within a processor/controller or may be transportable, such that the one or more programs stored thereon can be loaded into a processor/controller so as to implement various aspects of the present disclosure discussed herein. The terms "program" or "computer program" are used herein in a generic sense to refer to any type of computer code (e.g., software or microcode) that can be employed to program one or more processors/controllers.

The term "addressable" is used herein to refer to a device (e.g., a controller or processor that may be associated with one or more loads such as a lighting apparatus) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

FIGS. 24A and 24B are diagrams illustrating various views of housing configurations for the lighting apparatus of FIG. 22, according to one embodiment of the disclosure;

DETAILED DESCRIPTION

Figure 1:
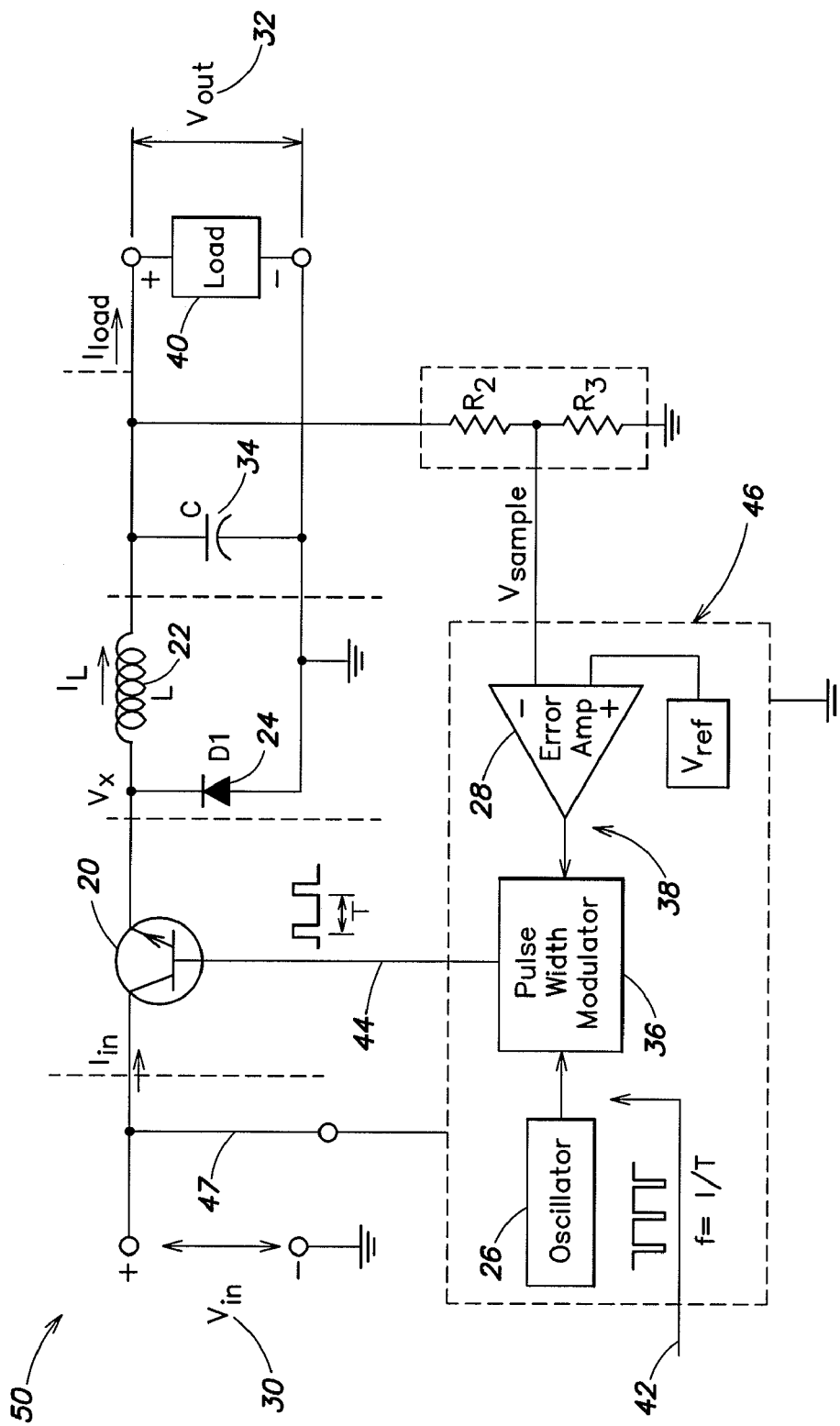
FIG. 1 is a circuit diagram of a conventional step-down or "buck" type DC-DC converter.

Applicants have recognized and appreciated that for some power supply applications and some types of loads, commercially available conventional switching power supplies based on DC-DC converters may not be best configured to facilitate a flexible and/or efficient provision of power to a load. For example, although the power conversion efficiency of many conventional switching supplies is on the order of approximately 80% (from A.C. line voltage to a regulated DC voltage output), particular configurations and/or control requirements of different loads may significantly reduce the overall power conversion efficiency of a system that includes a DC-DC converter and a load, wherein the load itself may include various control circuitry.

Additionally, Applicants have recognized and appreciated that for some applications and for some types of loads, the functions of providing appropriate power to the load and controlling some functionality associated with the load may be significantly streamlined, resulting in circuit implementations that have fewer components, higher overall power efficiencies, and smaller space requirements.

In view of the foregoing, the present disclosure is directed generally to various improved methods and apparatus for providing and controlling power to at least some types of loads. In some embodiments discussed further below, a controlled predetermined power is provided to a load without requiring any feedback information from the load (e.g., without monitoring and/or regulation of load voltage and current), thereby significantly reducing circuit complexity, number of components, size and efficiency.

In different embodiments disclosed herein, of particular interest are loads in which one or more functional components of the load are controlled by modulating power to the functional components. Examples of such functional components may include, but are not limited to, motors or other actuators and motorized/movable components (e.g., relays, solenoids), temperature control components (e.g. heating/cooling elements) and at least some types of light sources. Examples of power modulation control techniques that may be employed in the load to control the functional components include, but are not limited to, pulse frequency modulation, pulse width modulation, and pulse number modulation (e.g., one-bit D/A conversion).

More specifically, one type of load of interest for a streamlined power supply/control configuration according to various embodiments of the present disclosure is a lighting apparatus including one or more light-emitting diode (LED) light sources whose perceived brightness may be varied based on modulated pulsed power delivery. To facilitate a discussion of improved power control methods and apparatus according to various embodiments of the present disclosure using an LED-based lighting apparatus as an exemplary load, it is instructive to first discuss one conventional arrangement in which a switching power supply including a DC-DC converter provides power via a regulated DC output voltage to an LED-based lighting apparatus.

Figure 10:
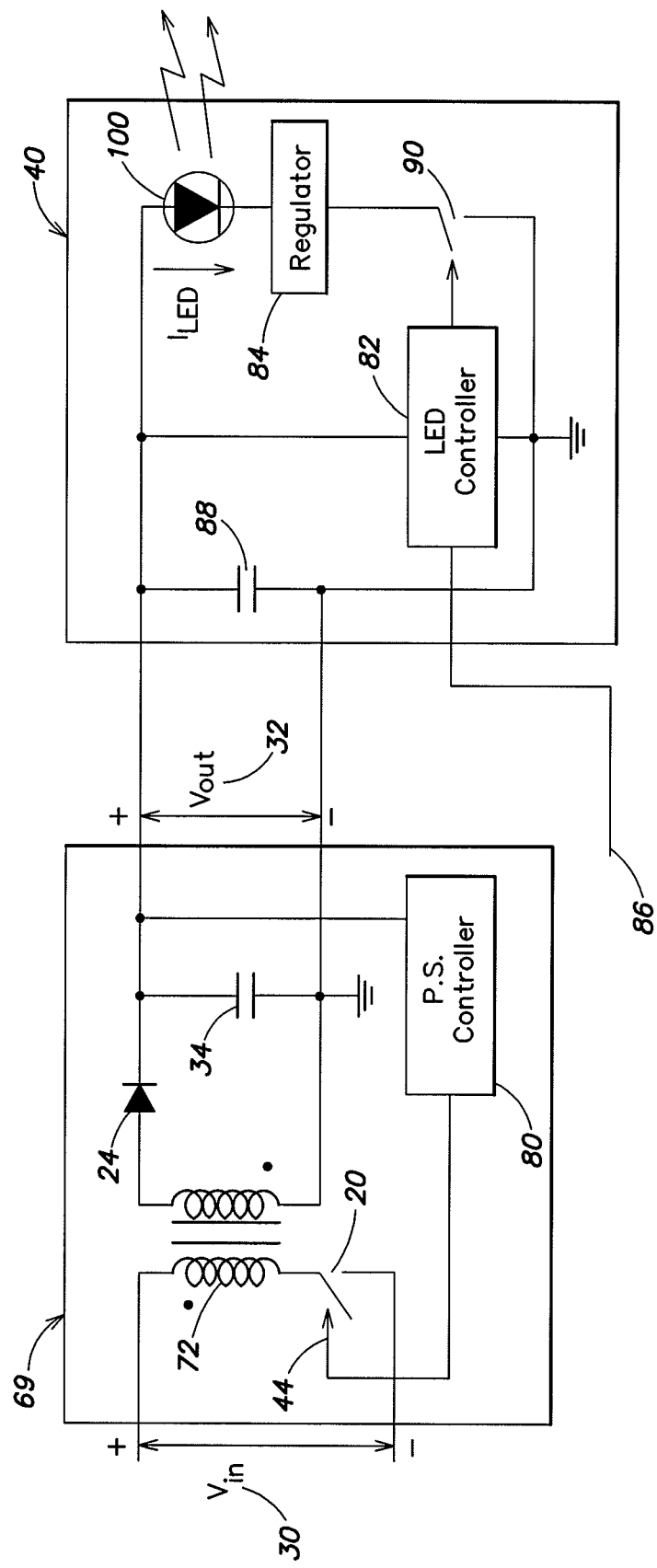
FIG. 10 is a diagram schematically showing an exemplary conventional arrangement of a DC-DC converter coupled to a load that is configured to modulate power delivered to one or more functional components of the load.

FIG. 10 is a diagram illustrating such an exemplary conventional arrangement of a DC-DC converter 69 and an LED-based lighting apparatus serving as a load 40. As illustrated in FIG. 10, the lighting apparatus includes one or more LEDs 100 and various other components configured to control the intensity of radiation generated by the LED(s). One example of such an apparatus is described in U.S. Pat. No. 6,016,038, issued Jan. 18, 2000, entitled "Multicolored LED Lighting Method and Apparatus," which patent hereby is incorporated herein by reference.

Figure 8:
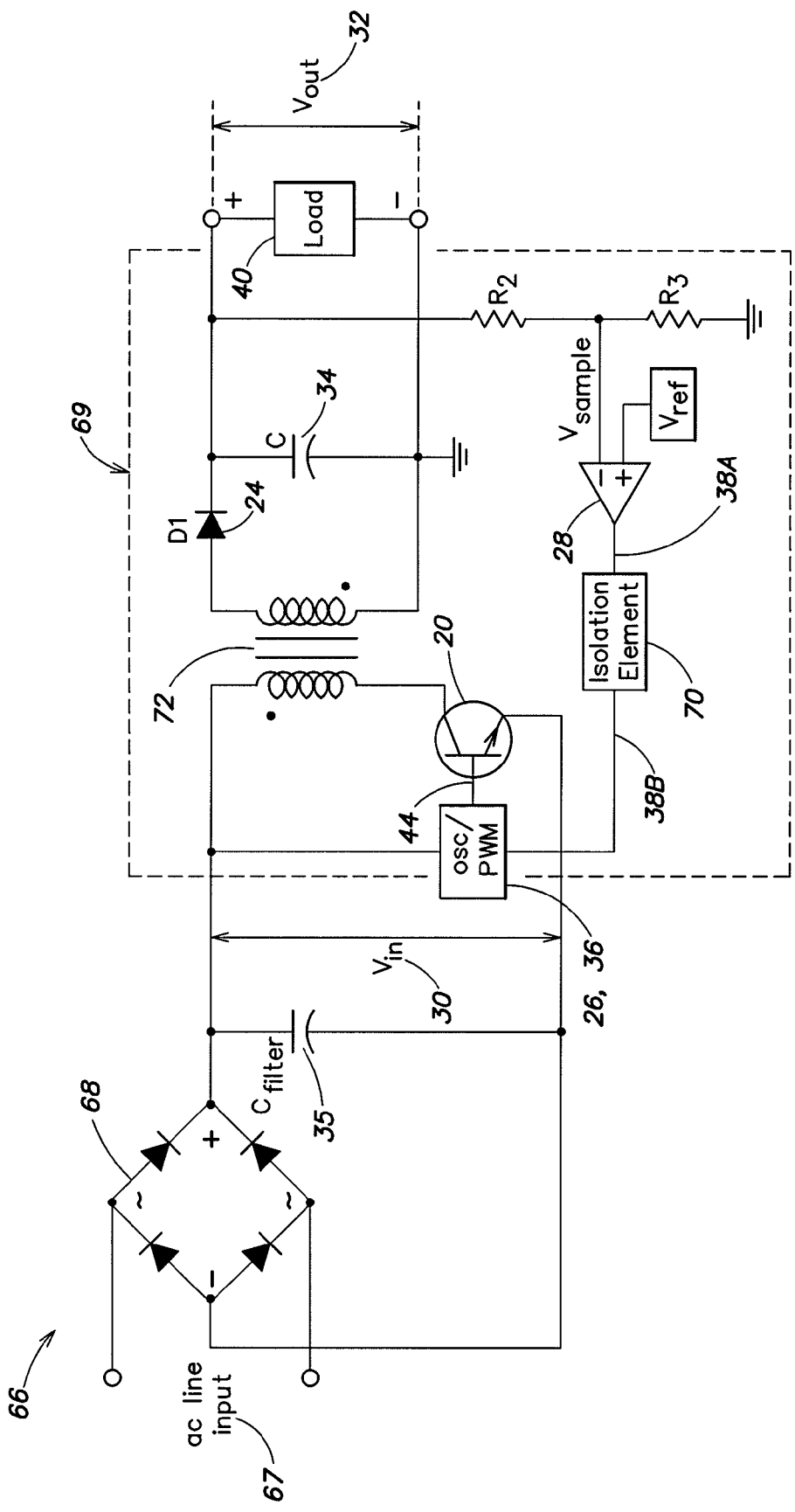
FIG. 8 is a circuit diagram of a conventional "flyback" type DC-DC converter.
Figure 9:
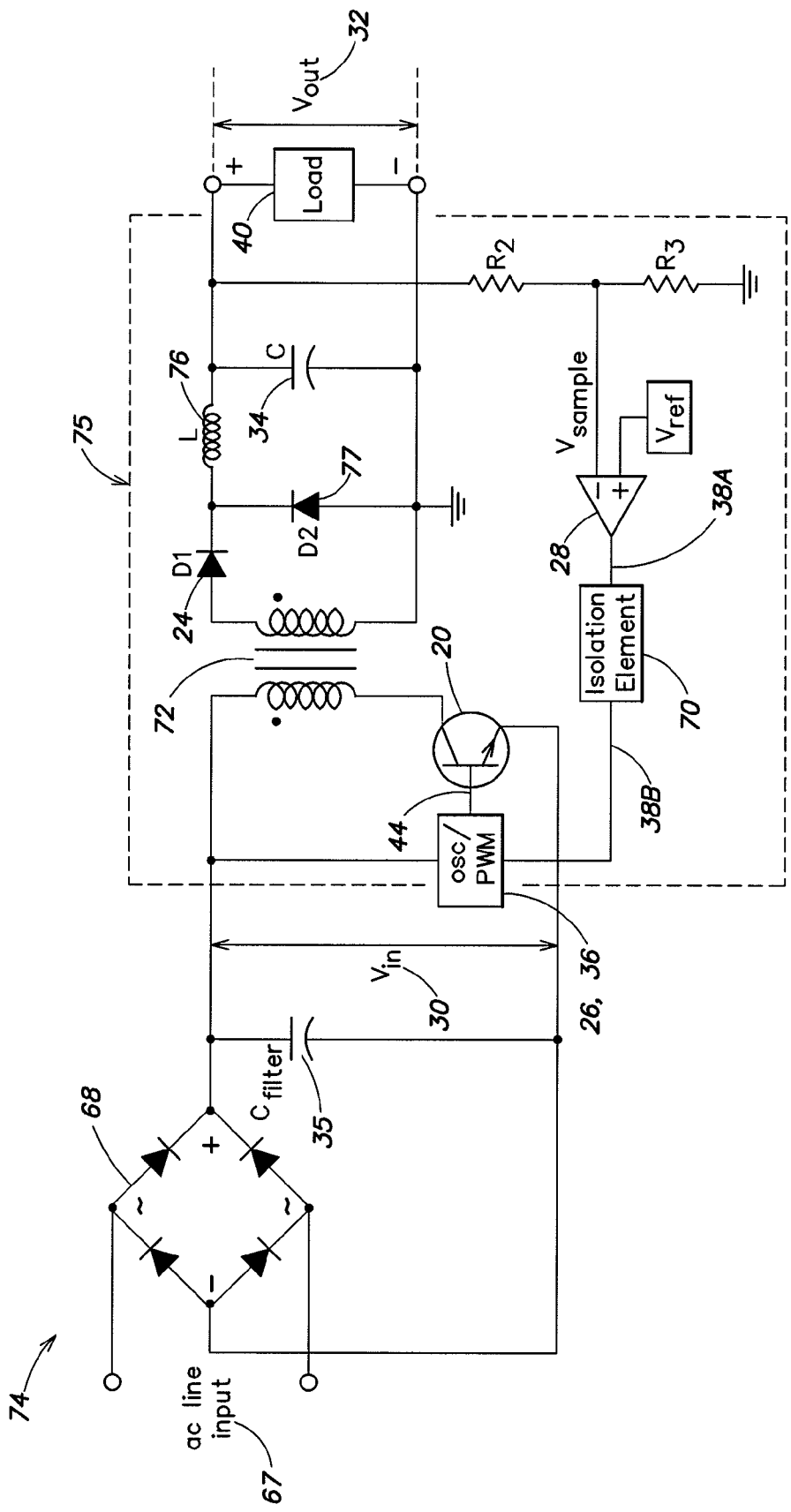
FIG. 9 is a circuit diagram of a conventional "forward" type DC-DC converter.

For purposes of the present discussion, the DC-DC converter 69 of FIG. 10 is shown as a flyback regulator (first discussed above in connection with FIG. 8), and serves as a portion of a power supply which draws power from an A.C. power source (i.e., an A.C. line voltage such as 120 $V_{rms}$/60 Hz). Accordingly, the DC-DC converter 69 includes a transformer 72 and other components to provide appropriate isolation between the unregulated DC input voltage 30 ($V_{in}$) which is derived from the A.C. line voltage, and the regulated DC output voltage 32 ($V_{out}$). It should be appreciated that the forward converter of FIG. 9, as well as other DC-DC converter configurations including input-output isolation features, and/or power factor correction components, likewise could be employed in conventional arrangements similar to that illustrated in FIG. 10.

Figure 7:
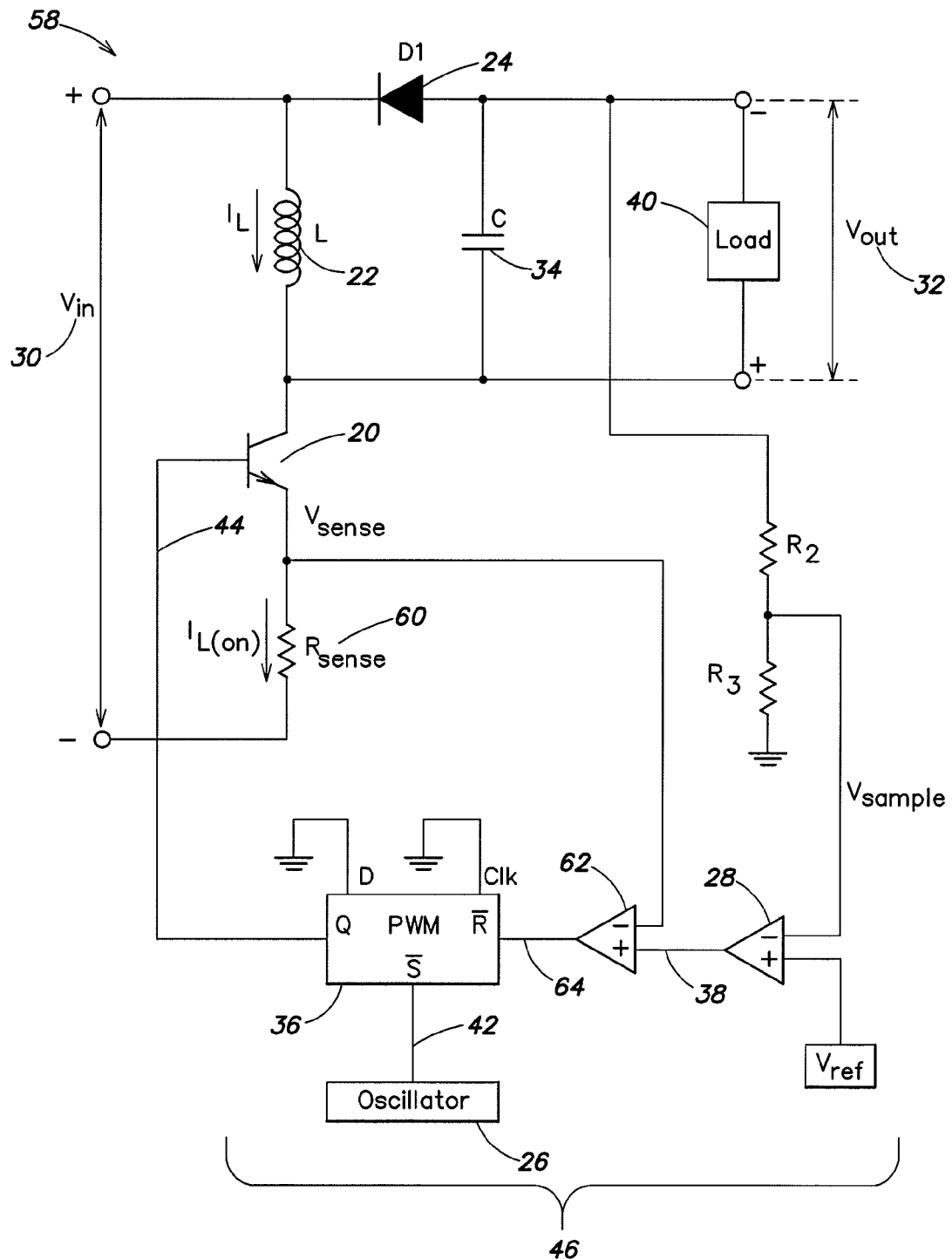
FIG. 7 is a circuit diagram of a buck-boost converter similar to that shown in FIG. 5, configured for current-mode operation.

In FIG. 10, the switch 20 of the DC-DC converter 69 is shown generically as a controllable "make-brake" circuit connection to indicate that various components may be utilized to implement the function of the switch 20 (e.g., BJTs, FETs, as well as other signal amplifier/switch driver circuitry that may be required). Additionally, the components of the converter's voltage regulation feedback loop (refer to FIGS. 1 and 7) are indicated collectively in FIG. 10 as a power supply controller 80, which receives as an input a sample of the DC output voltage $V_{out}$ and provides as an output the control signal 44 that operates the switch 20. As discussed above in connection with FIGS. 1 and 7, the components of the power supply controller 80 are configured to vary the duty cycle of the control signal 44 (and hence the on-off operation of the switch 20) so as to adjust the amount of energy transferred across the transformer in a given time period, thereby making adjustments to $V_{out}$ so that it is regulated at an essentially constant predetermined output voltage level.

The lighting apparatus serving as the load 40 in the exemplary arrangement of FIG. 10 includes one or more LEDs 100 controlled by an LED controller 82. Although only one LED 100 is depicted in FIG. 10 for simplicity, it should be appreciated that the apparatus may include multiple LEDs which may be interconnected in any of a variety of serial, parallel, or serial-parallel arrangements such that the converter's regulated supply voltage $V_{out}$ provides an appropriate voltage to drive the LEDs (an LED typically has a low forward voltage on the order of 2 to 4 Volts, and multiple LEDs may be connected in serial/parallel arrangements such that a more commonly available supply output voltage $V_{out}$, such as 12 Volts or 24 Volts, may be applied to the LED arrangement without damaging the LEDs). In the arrangement of FIG. 10, the unregulated DC input voltage $V_{in}$ provided to the DC-DC converter 69 may be on the order of approximately 160 Volts or even significantly higher, and the converter may be configured to provide a regulated DC output or supply voltage $V_{out}$ of 12 Volts or 24 Volts, for example. As indicated in FIG. 10, a common anode of the one or more LEDs 100 may be connected to the positive terminal of the regulated supply voltage $V_{out}$. The load 40 also may include one or more filter capacitors 88 to filter any residual ripple on the supply voltage $V_{out}$.

In the lighting apparatus/load 40 shown in FIG. 10, the intensity of radiation generated by the one or more LEDs 100 is proportional to the average power delivered to the LED(s) over a given time period. Accordingly, one technique for varying the intensity of radiation generated by the one or more LEDs involves modulating the power delivered to the LED(s). To this end, the lighting apparatus also includes a current regulator 84 and a switch 90 in the current path of the LEDs between +$V_{out}$ and ground, as well as an LED controller 82 (which also may be powered via the regulated supply voltage $V_{out}$).

The regulator 84 of the lighting apparatus/load 40 shown in FIG. 10 generally is configured to define the maximum current $I_{LED}$ through the one or more LEDs 100 when the switch 90 is closed so as to complete the current path. Hence, given the fixed supply voltage $V_{out}$ (and hence a fixed voltage $V_{LED}$ across the LED(s) when energized), the regulated current $I_{LED}$ also determines the amount of instantaneous power $P_{LED}$ delivered to the LED(s) when they are energized ($P_{LED} = V_{LED} \cdot I_{LED}$).

In the exemplary arrangement of FIG. 10, the LED controller 82 may be configured to control the switch 90 using a pulse width modulation technique so as to modulate the average power delivered to the LED(s) over time. In particular, the LED controller is configured to repeatedly open and close the switch 90, thereby energizing the one or more LEDs in a pulsed fashion, preferably at a frequency that is greater than that capable of being detected by the human eye (e.g., greater than approximately 100 Hz). In this manner, an observer of the light generated by the LED(s) does not perceive discrete on and off cycles (commonly referred to as a "flicker effect"), but instead the integrating function of the eye perceives essentially continuous illumination. By adjusting the average amount of time the LED(s) are energized in any given time period (i.e., by adjusting the average power delivered to the LED(s)), the perceived brightness of the generated light may be varied. The LED controller 82 may accomplish this by adjusting the duty cycle of the switch 90 (i.e., by increasing or decreasing the time the switch is on or closed during successive switching cycles). As shown in FIG. 10, the LED controller 82 may receive a control signal or control data 86 which specifies the switch's duty cycle at any given time, and hence the perceived brightness of observed light.

Figure 11:
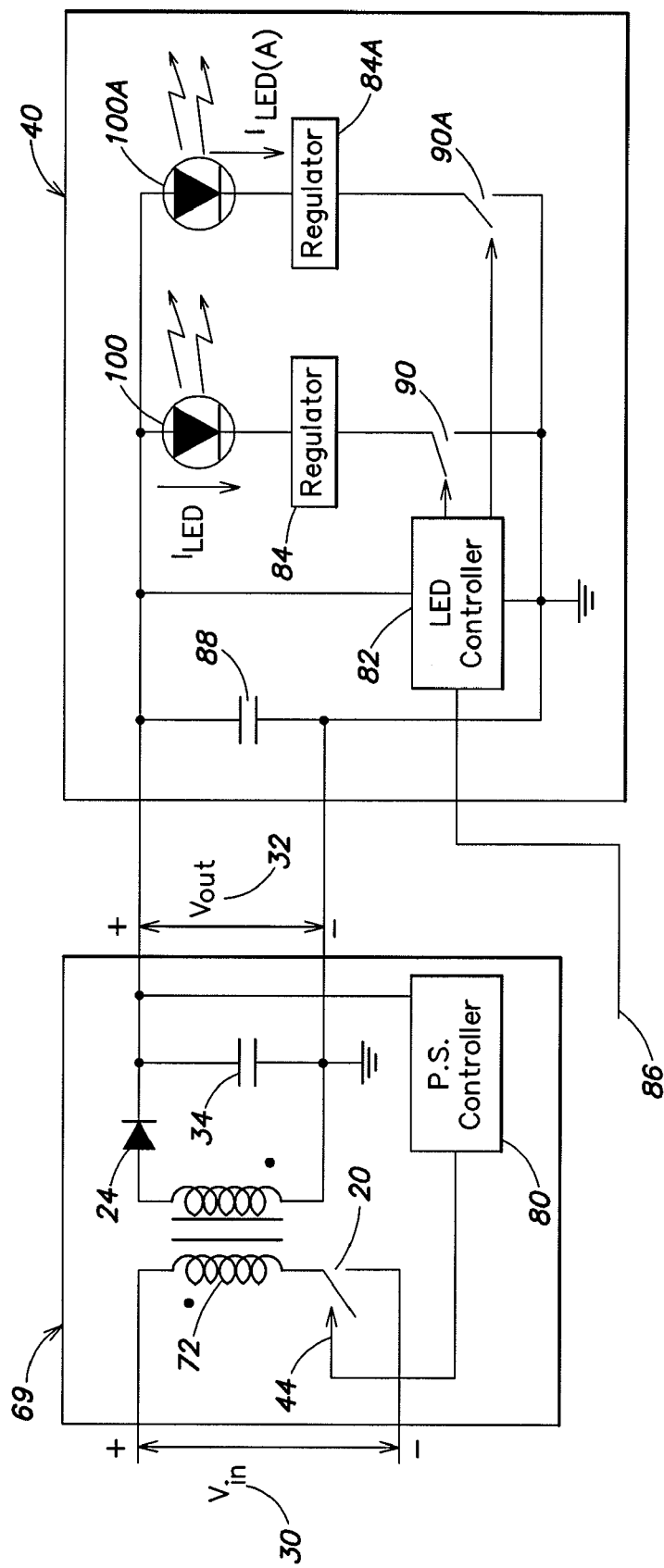
FIG. 11 is a diagram schematically showing another exemplary conventional arrangement of a DC-DC converter coupled to a load that is configured to modulate power delivered to one or more functional components of the load.

In yet another exemplary arrangement illustrated in FIG. 11, in addition to the one or more LEDs 100, the lighting apparatus/load 40 may include one or more additional LEDs 100A having a color different than that of the LED(s) 100. As illustrated in FIG. 11, the circuit arrangement of the LED(s) 100A is similar to that of the LED(s) 100; namely, a common anode of the LED(s) 100A is connected to the positive terminal of $V_{out}$, and a regulator 84A is configured to define the maximum current $I_{LED(A)}$ through the LED(s) 100A when a switch 90A is closed so as to complete the current path. In FIG. 11, the LED controller 82 is configured to also control the switch 90A using a pulse width modulation technique so as to control the average power delivered to the LED(s) 100A over time (and hence the perceived brightness of light generated by the LEDs 100A), as discussed above in connection with FIG. 10.

The LED controller 82 shown in FIG. 11 further may be configured to control the switches 90 and 90A independently (e.g., based on one or more control signals or control data 86) so as to independently adjust the perceived brightness of the differently colored light respectively generated by the LED(s) 100 and the LED(s) 100A. In this manner, a variety of different perceivable colors may be generated by the lighting apparatus based on well-established color mixing principles. It should be appreciated that in other arrangements, lighting apparatus similar to those shown in FIGS. 10 and 11 may include LEDs having three or more different colors, wherein the respective intensities of radiation generated by differently-colored LEDs are controlled independently in a manner similar to that discussed above, so as to generate a wide variety of variable-color light.

Applicants have recognized and appreciated that several issues relating to inefficiency and functional redundancy are presented by the exemplary conventional DC-DC converter/load arrangements illustrated in FIGS. 10 and 11.

First, there are noteworthy inefficiency issues raised by the practical limitations of commercially available switching power supplies. For example, it should be readily appreciated that conventional switching power supplies generally are commercially available with only a few predetermined voltage output levels (e.g., typically 5V, ±12V, ±15V, 24V, etc.) and selected ranges of power output capabilities (in large part determined by various industry conventions). The limited choices of output voltage and output power rating of commercially available switching power supplies may result in a less than optimum matching between supply voltage/power rating, and particular voltage/power requirements of a given load.

With respect to voltage, the regulated DC output voltages typically available in commercial power supplies (as exemplified by the converter 69 in FIGS. 10 and 11) may not be ideally suited for the particular load in question, thereby requiring some voltage or current adjustment/regulation circuitry to appropriately drive one or more functional components of the load. As discussed above in connection with the exemplary arrangements of FIGS. 10 and 11, given commonly available regulated DC supply voltages $V_{out}$ of 12 Volts or 24 Volts driving an LED-based lighting apparatus, significantly lower voltage LEDs need to be particularly interconnected and arranged in the lighting apparatus, together with a current regulator, to ensure proper operation of the LED(s) without damage. The requirement of a regulator or similar adjustment circuitry based on a less than optimum supply voltage $V_{out}$ inevitably wastes power and space.

Similarly, potential mismatches between the power requirements of the lighting apparatus/load 40 and the power provision capabilities of a given switching power supply may give rise to inefficiencies and waste. For example, consider a particular power requirement $P_{LOAD}$ of a given lighting apparatus/load 40 (e.g., based on the number and type of LEDs that may be energized at any given time and the various control and other support circuitry present in the lighting apparatus/load). Given a predetermined selection of output power ratings for commercially available supplies, it is possible that there is no supply readily available with an output power rating that is safely above, but reasonably close to, the power requirements of the given load. Accordingly, a power supply that is significantly over-specified (i.e., capable of providing power outputs significantly greater than $P_{LOAD}$) may be the only reasonable choice in this situation. Again, such a power mismatch involves inefficiency and waste, at least with respect to oversized components in the power supply.

Furthermore, in lighting apparatus/loads 40 with large numbers of LEDs and/or high-power LEDs to provide significant illumination, transmission of the required power over any appreciable distance between the DC-DC converter and the load may present another inefficiency issue. For example, given the converter's fixed regulated DC output voltage (e.g., at 12 Volts or 24 Volts), larger numbers of LEDs and/or high-power LEDs in the lighting apparatus/load may draw significant current when energized, resulting in potentially significant resistive losses in any cable/conductors connecting the load to the DC-DC converter (especially if the lighting apparatus/load is separated from the DC-DC converter by any appreciable distance).

In sum, the aforementioned inefficiency issues relate at least in part to some degree of inflexibility of the DC-DC converter, with respect to potential voltage and/or power mismatches between the converter and the load, as well as potential power transmission losses between the converter and the load.

Second, it is particularly noteworthy in the exemplary conventional arrangements illustrated in FIGS. 10 and 11 that, generally speaking, the operation of the DC-DC converter to provide a regulated voltage output and the operation of the lighting apparatus to provide a controllable light output are significantly similar at least with respect to the switching operations present in both. Specifically, a similar modulated switching operation determines the desired output for both the DC-DC converter and the lighting apparatus.

In view of the foregoing, various embodiments of the present disclosure are directed generally to methods and apparatus for providing and controlling power to at least some types of loads, wherein overall power efficiency typically is improved and functional redundancy of components is significantly reduced as compared to conventional arrangements. In different aspects, implementations of methods and apparatus according to various embodiments disclosed herein generally involve significantly streamlined circuits having fewer components, higher overall power efficiencies, and smaller space requirements.

In some embodiments discussed further below, a controlled predetermined power is provided to a load without requiring any monitoring of load voltage and/or load current (i.e., without any feedback from the load). In one aspect of such embodiments in which feedback is not required, isolation components typically employed between a lower DC load supply voltage and a source of power derived from an AC line voltage (e.g., a high DC voltage input to a DC-DC converter) in some cases may not be required, thereby reducing the number of required circuit components. In another aspect, eliminating the need for a feedback loop generally increases circuit speed and avoids potentially challenging issues relating to feedback circuit stability.

One embodiment disclosed herein is particularly directed to a "feed-forward" driver for an LED-based light source. The feed-forward driver according to this embodiment combines the functionality of a DC-DC converter and a light source controller, and is configured to control the intensity of light generated by the light source based on modulating the average power delivered to the light source in a given time period, without monitoring or regulating the voltage or current provided to the light source. In one aspect of this embodiment, the feed-forward driver is configured to store energy to and release energy from one or more energy transfer elements using a "discontinuous mode" switching operation. This type of switching operation, as discussed further below, facilitates the transfer of a predictable quantum of energy per switching cycle, and hence a predictable controlled power delivery to the light source.

Following below are more detailed descriptions of various concepts related to, and embodiments of, power control methods and apparatus according to the present disclosure. It should be appreciated that various concepts introduced above and discussed in greater detail below may be implemented in any of numerous ways, as the disclosed concepts are not limited to any particular manner of implementation. Examples of specific implementations and applications are provided for illustrative purposes only.

Figure 12:
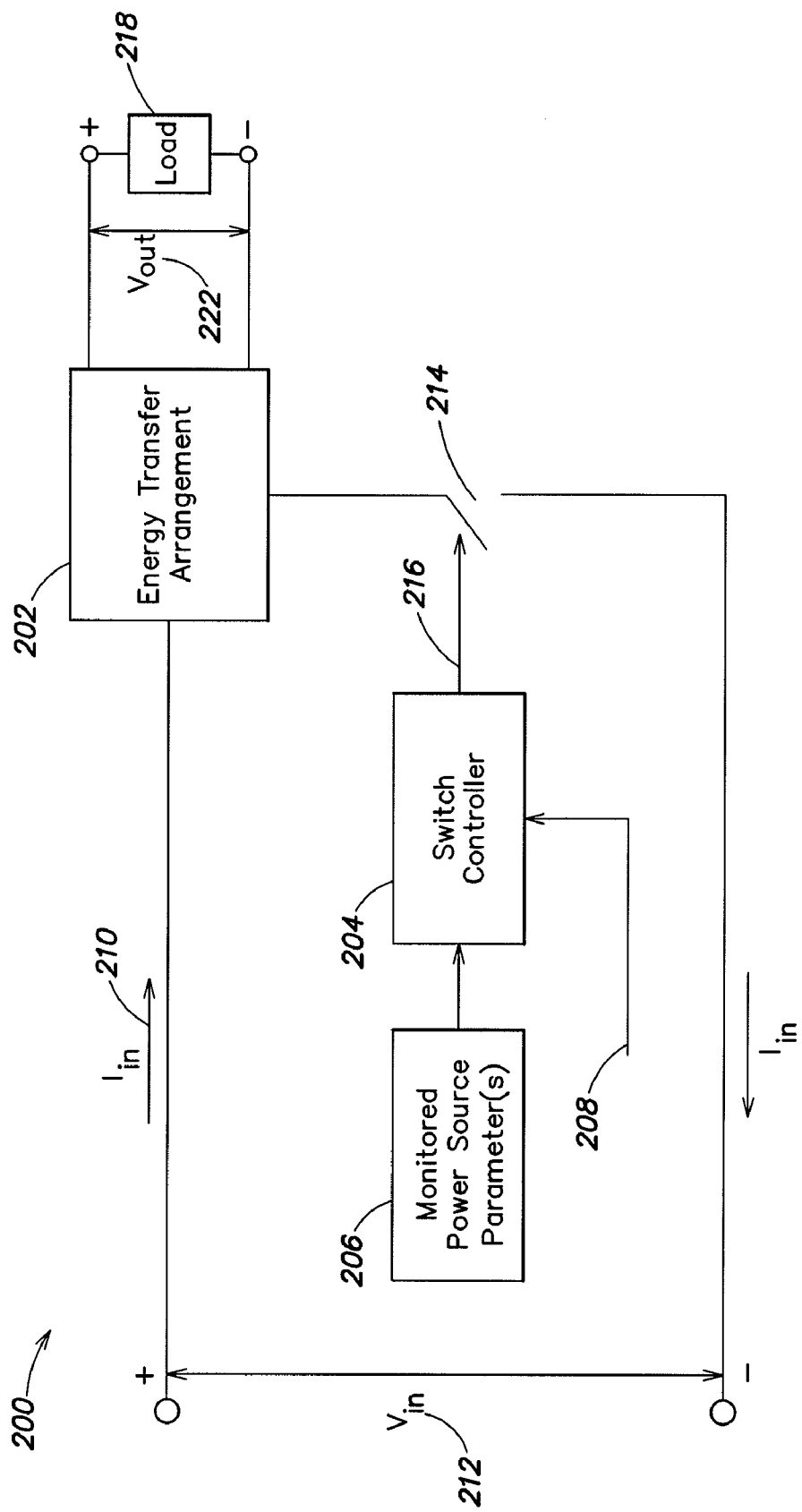
FIG. 12 is a block diagram illustrating a "feed-forward" power control apparatus based at least in part on a switching power supply configuration, according to one embodiment of the disclosure.

FIG. 12 is a block diagram illustrating a "feed-forward" power control apparatus 200 based at least in part on a switching power supply configuration, according to one embodiment of the present disclosure. The terms "feed-forward" used in connection with the embodiment of FIG. 12, as well as other embodiments discussed below, refer to circuit configurations in which information associated with a load (e.g., a desired power to be drawn by the load, a desired voltage to be applied across the load, etc.) is known in advance and used to facilitate circuit operation. For example, in various examples of feed-forward power control apparatus disclosed herein, a controlled predetermined power is provided to a load via a switched energy transfer method without requiring any feedback information from the load; i.e., there is no requirement to monitor load voltage and/or load current. Rather, a controlled predetermined power is provided to the load based on monitoring one or more parameters relating to the source of power provided to the power control apparatus (e.g., a voltage input or current drawn from a power source), as well as other control information or data known in advance relating to desired load parameters.

As shown in FIG. 12, the power control apparatus 200 receives a DC input voltage 212 ($V_{in}$) and draws an input current 210 ($I_{in}$) from a source of power. The DC input voltage 212 may be a regulated or unregulated DC voltage and may be derived, for example, from a rectified and filtered AC line voltage or another DC source of power, as discussed above in connection with the DC input voltage 30 shown in earlier figures. FIG. 12 also shows that the power control apparatus 200 is configured such that the input current $I_{in}$ passes through an energy transfer arrangement 202 via the operation of a switch 214. The switch 214 in turn is controlled by a switch controller 204, which is configured to control the switch 214 via a control signal 216 that is generated in response to one or more monitored power source parameters 206 (e.g., $V_{in}$ and/or $I_{in}$) as well as other control information or data 208 provided to the apparatus 200. While not explicitly shown in FIG. 12, according to various implementations discussed in greater detail below, operating power for the switch controller 204 may be derived from the DC input voltage $V_{in}$ or another source of power.

In FIG. 12, the switch 214 performs a role substantially similar to that of the transistor switches 20 shown in earlier figures. Accordingly, one exemplary implementation of the switch 214 includes, but is not limited to, one or more transistors (e.g., BJTs, FETs) configured to operate as a saturated switch, together with other signal amplifier/switch driver circuitry that may be required to properly operate the transistors. The energy transfer arrangement 202 illustrated in FIG. 12 generally represents one of several possible circuit arrangements configured to implement the general functionality of a DC-DC converter providing power to a load. More specifically, according to different aspects of this embodiment, the energy transfer arrangement 202 may include various components configured to implement the general functionality of one of a buck converter, a boost converter, a buck-boost converter, a CUK converter, a flyback converter, and a forward converter (all of which were discussed above in connection with FIGS. 1 and 4-9), as well as other DC-DC converter arrangements not specifically discussed herein.

As shown in FIG. 12, the energy transfer arrangement 202 is configured to provide a DC output voltage 222 ($V_{out}$) to a load 218. However, as mentioned above and discussed in greater detail below, unlike the conventional arrangements shown in earlier figures, the energy transfer arrangement 202 in the embodiment of FIG. 12 is not configured to provide any information pertaining to the load (e.g., load voltage and/or load current) as feedback to affect the control of the switch 214.

The interconnection of the energy transfer arrangement 202 to other components of the power control apparatus 200 is shown generally in FIG. 12 to facilitate an introductory discussion of the operation of the power control apparatus. It should be appreciated, however, that a particular interconnection of components in a given implementation of the power control apparatus 200 may be dictated by the type of DC-DC converter employed in the energy transfer arrangement 202. Some examples of particular arrangements are discussed in greater detail below, in connection with FIGS. 13 and 15-19.

In another aspect of the embodiment of FIG. 12, the feed-forward power control apparatus 200 may be configured to store energy to, and release energy from, one or more energy transfer elements of the energy transfer arrangement 202 using a "discontinuous mode" switching operation implemented by the switch controller 204 and the switch 214. This type of switching operation facilitates the transfer of a predictable quantum of energy per switching cycle, and hence a predictable controlled power delivery to the load 218. The discontinuous mode switching operation is now discussed in greater detail, with reference initially to FIGS. 13 and 14.

Figure 13:
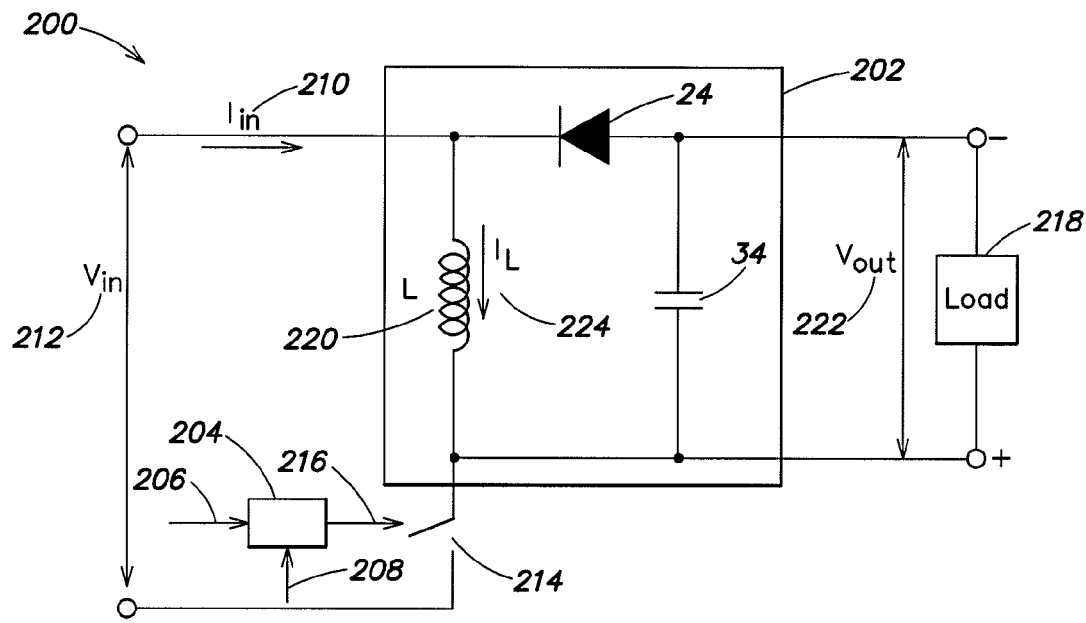
FIG. 13 is a diagram showing some additional details of the power control apparatus of FIG. 12, according to one embodiment of the disclosure.

FIG. 13 is a diagram similar to FIG. 12 schematically illustrating additional details of an exemplary energy transfer arrangement 202 of the power control apparatus 200 according to one embodiment of the present disclosure. In the example of FIG. 13, the energy transfer arrangement is shown as a buck-boost or inverting converter, including the inductor 220 as an energy transfer element having an inductance L, as well as other DC-DC converter circuitry that is configured to provide the DC output voltage 222 to the load 218. As discussed above in connection with FIG. 12, it should be appreciated that the exemplary buck-boost configuration shown in FIG. 13 is provided primarily for purposes of illustrating various concepts relating to discontinuous mode operation; however, power control apparatus according to the present disclosure are not limited to this particular configuration, and other configurations may be operated in discontinuous mode according to other embodiments. In FIG. 13, the current 210 ($I_{in}$) flows through the inductor 220 with operation of the switch 214, based on the voltage 212 ($V_{in}$) applied to the inductor. For purposes of highlighting some of the more salient general concepts underlying the operation of the power control apparatus 200, ideal components and a substantially lossless transfer of energy are assumed in the following discussion.

Figure 3:
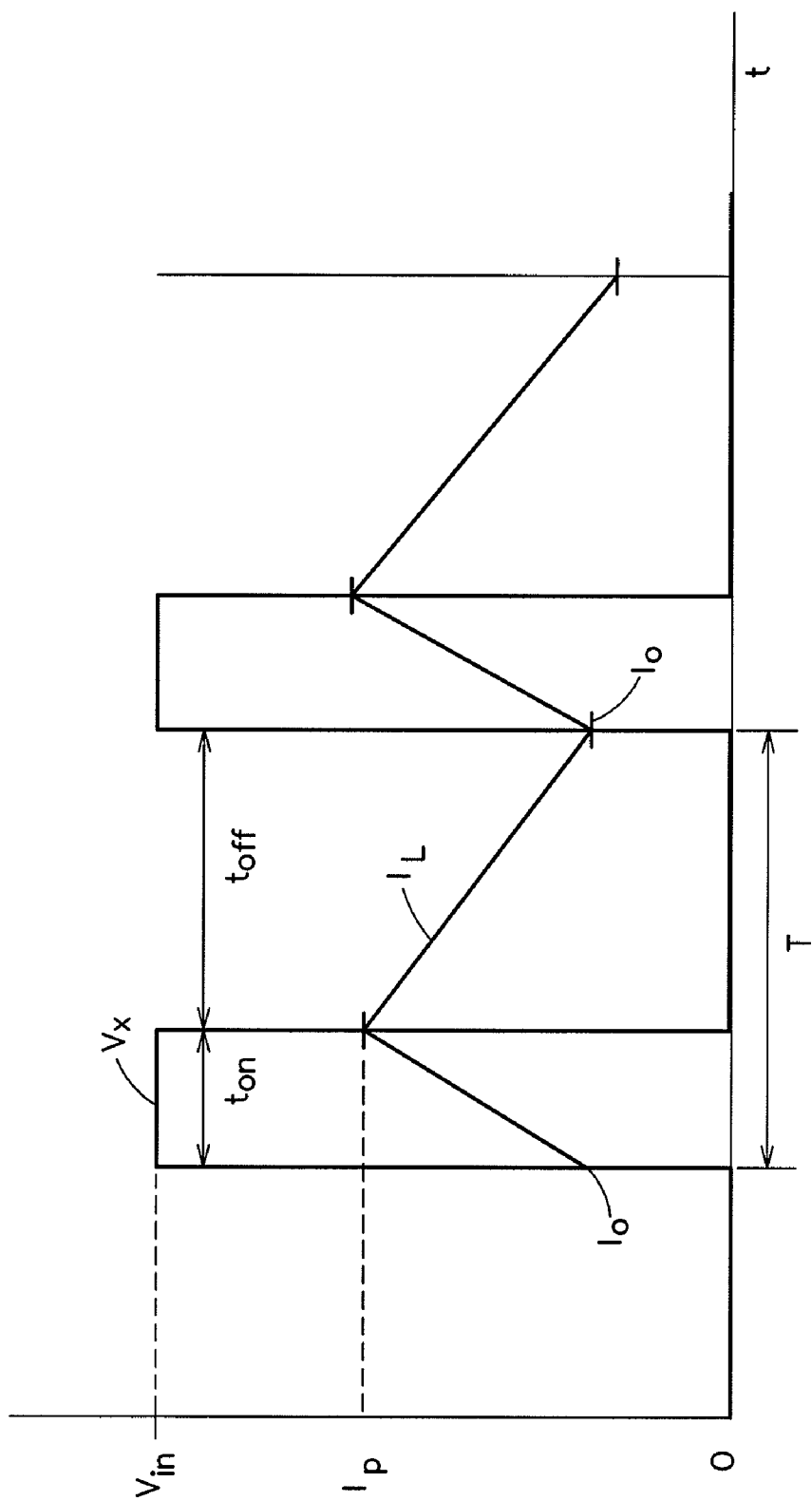
FIG. 3 is a diagram particularly illustrating inductor current vs. applied voltage during two consecutive switching operations in the converter of FIG. 1.
Figure 4:
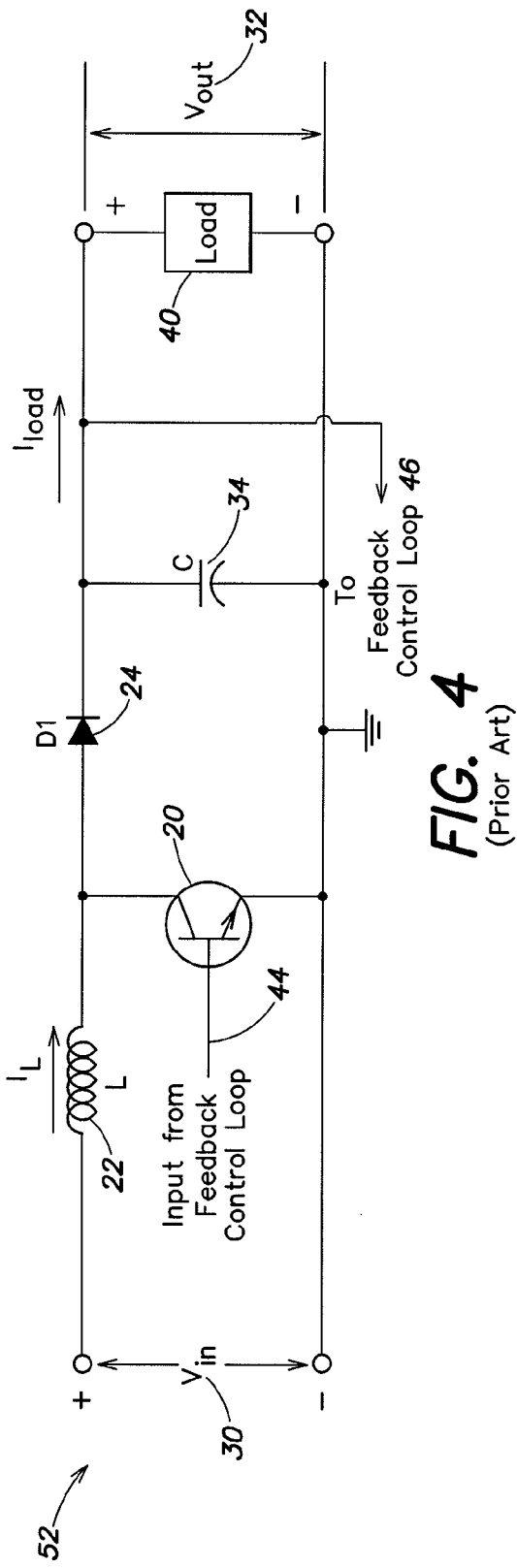
FIG. 4 is a circuit diagram of a conventional step-up or "boost" type DC-DC converter.
Figure 5:
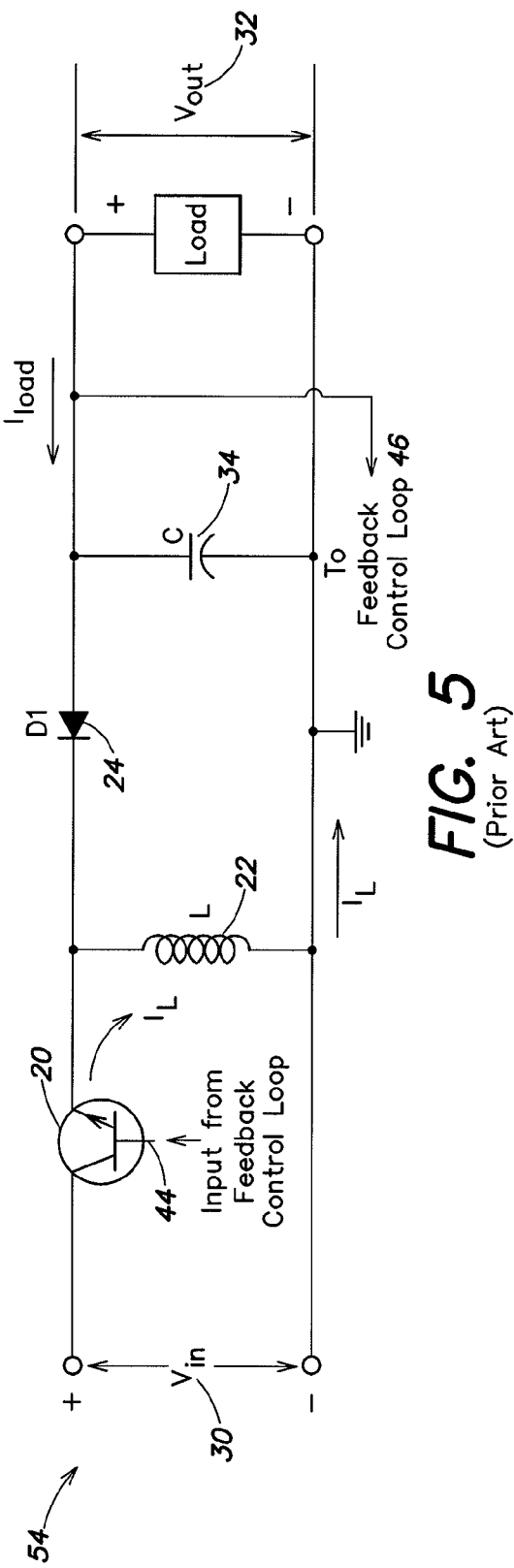
FIG. 5 is a circuit diagram of a conventional inverting or "buck-boost" type DC-DC converter.
Figure 6:
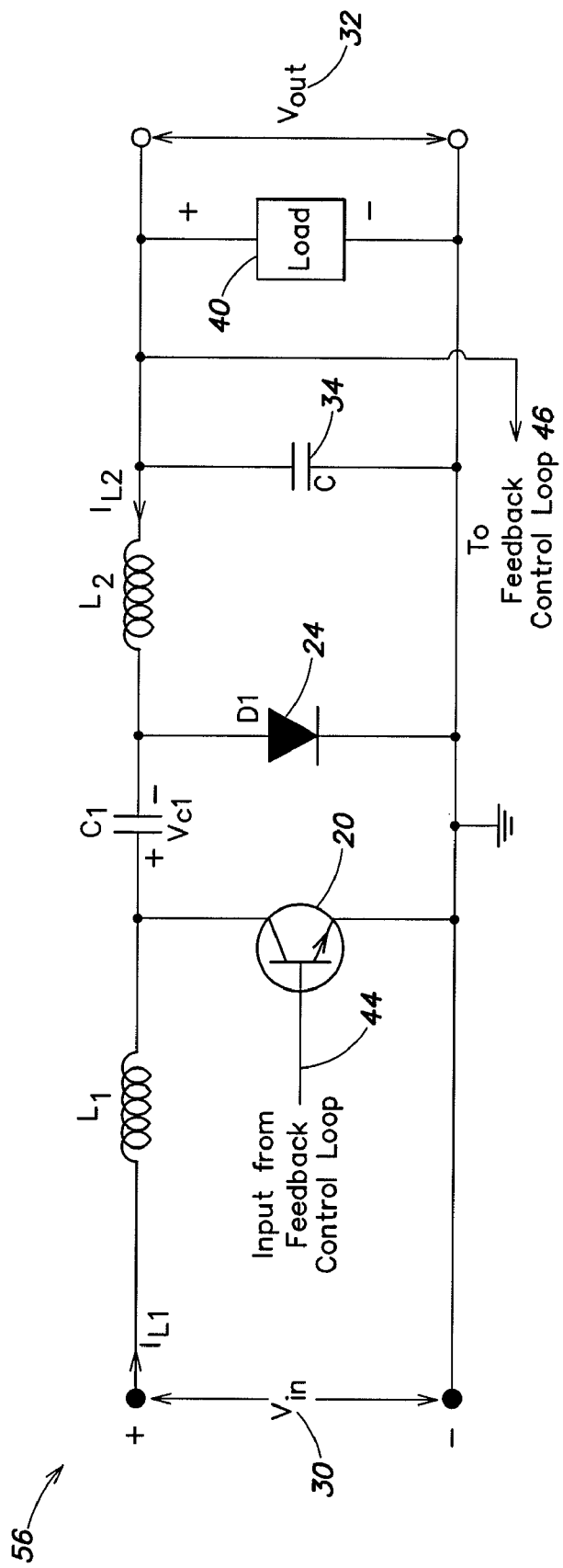
FIG. 6 is a circuit diagram of a conventional "CUK" type DC-DC converter.
Figure 14:
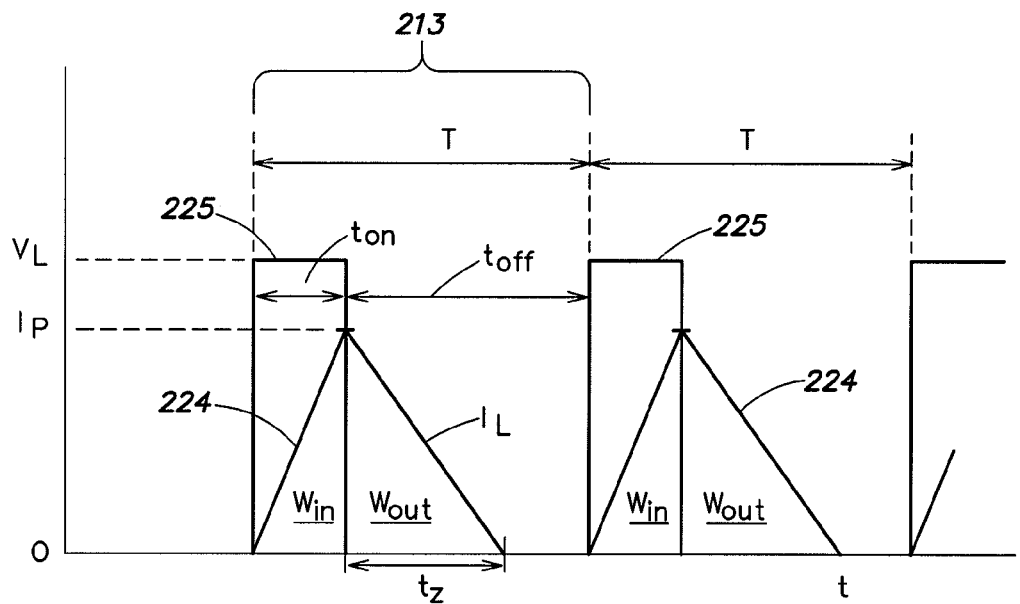
FIG. 14 is an exemplary timing diagram for the apparatus of FIGS. 12 and 13, according to one embodiment of the disclosure.

FIG. 14 is an exemplary timing diagram showing two consecutive switching cycles 213 of the switch 214 shown in FIGS. 12 and 13, according to one embodiment of the disclosure. FIG. 14 shows a pulsed voltage 225 ($V_L$) applied across the inductor 220 based on the input voltage $V_{in}$ during consecutive on/off switching cycles of the switch 214. As in FIG. 3, the time during which the switch 214 is on or closed is indicated in FIG. 14 as $t_{on}$, and the time during which the switch is off or open is indicated as $t_{off}$. Hence, as discussed above, the period T of a given switching cycle 213 is given by $t_{on}+t_{off}$, and the frequency f of multiple switching cycles is given by 1/T.

In FIG. 14, superimposed on the pulsed voltage 225 applied across the inductor is the current 224 ($I_L$) through the inductor 220. As discussed above in connection with FIG. 3, when the switch 214 is closed for the time period $t_{on}$, the voltage $V_L$ applied to the inductor causes a linearly increasing current $I_{in}=I_L$ to flow through the inductor based on the relationship $V_L=L \cdot dI_L/dt$, during which energy is stored in the inductor's magnetic field. At the end of the time period $t_{on}$, FIG. 14 indicates that the inductor current $I_L$ reaches a maximum peak value $I_P$. This same relationship $V_L=L \cdot dI_L/dt$ causes the inductor current $I_L$ to linearly decrease during the time period $t_{off}$ when the switch 214 is off or opened, as the stored energy is provided to the load via the other DC-DC converter circuitry.

The timing diagram of FIG. 14 is similar to that shown earlier in FIG. 3, but differs from FIG. 3 in that the inductor current $I_L$ illustrated in FIG. 14 reflects a "discontinuous mode" switching operation rather than a continuous mode switching operation. In particular, at the beginning and end of each switching cycle, the power control apparatus is configured such that the inductor current $I_L$ is zero; specifically, the inductance L of the inductor and the duty cycle of the switch 214, as well as other components of the apparatus, are configured such that essentially all of the energy stored in the inductor during the time $t_{on}$ is transferred to the load in a time $t_2$ which is less than $t_{off}$, thereby ensuring no current through the inductor at the beginning and end of each switching cycle (and no residual stored energy in the inductor's magnetic field). As shown in FIG. 14, the period of time between the end of $t_2$ and the end of $t_{off}$ represents a discontinuity in the inductor current $I_L$; hence the term "discontinuous" mode.

By employing a discontinuous mode switching operation, and ensuring essentially zero inductor current at the beginning and end of each switching cycle, the transfer of a predictable quantum of energy per switching cycle is facilitated, and hence a predictable controlled power delivery to the load. For example, with reference to FIG. 14, the quantum of energy $W_{in}$ (in Joules) stored in the inductor's magnetic field by the end of the time period $t_{on}$, assuming a zero initial inductor current, is given by $$W_{in} = \frac{1}{2}L(I_P)^2.$$

Assuming a lossless transfer of energy, a quantum of energy $W_{out}$ equal to $W_{in}$ is transferred, during the time period $t_2 < t_{off}$, from the inductor's magnetic field to the load while the switch 214 is opened for the period $t_{off}$. With each successive switching cycle, a predictable quantum of energy is thusly transferred.

Since power is defined as the amount of energy transferred in a given time period (i.e., P=dW/dt), the power P transferred to the load may be expressed as:

$$P = \frac{dW}{dt} = \frac{\frac{1}{2}L(I_P)^2}{T} = \frac{1}{2}L(I_P)^2 f, \quad (1)$$

where f=1/T is the switching frequency of the switch 214. From the foregoing, it may be appreciated that the power to the load may be modulated by varying one or both of the switching frequency f and the peak inductor current $I_P$, given the inductance L of the inductor. As discussed above, the peak inductor current $I_P$ is determined by the duty cycle of the switch 214 (in particular, the time period $t_{on}$). Hence, in the embodiments of FIGS. 12-14, one or both of the frequency and the duty cycle of the switch 214 may be controlled to provide a predictable variable power to the load without any feedback information pertaining to the load.

Another way to view controlling power to the load in the embodiments of FIGS. 12-14 is to consider the transfer of multiple quanta of energy over a time period covering multiple switching operations:

$$P = \text{(Quantum of energy per transfer)} \times \quad (2)$$
$$\text{(Number of transfers per time period)}.$$

From this viewpoint, it may be appreciated that the power to the load may be adjusted by one or both of 1) adjusting the quantum of energy per transfer and 2) varying over time the number of transfers each having the same quantum of energy.

To further explore the control of power to the load in the embodiments of FIGS. 12-14, an exemplary implementation involving holding the number of energy transfers over time (e.g., the switching frequency f) constant and varying the duty cycle of the switching operation by varying the time period $t_{on}$ is now discussed in connection with FIG. 15. In particular, FIG. 15 illustrates a portion of the feed-forward power control apparatus 200 shown in FIG. 13, according to one embodiment of the present disclosure, in which the duty cycle of the switch 214 is controlled based in part on monitoring the inductor current $I_L$ when the switch 214 is on or closed (i.e., monitoring the current $I_{in}$ drawn by the power control apparatus).

Figure 15:
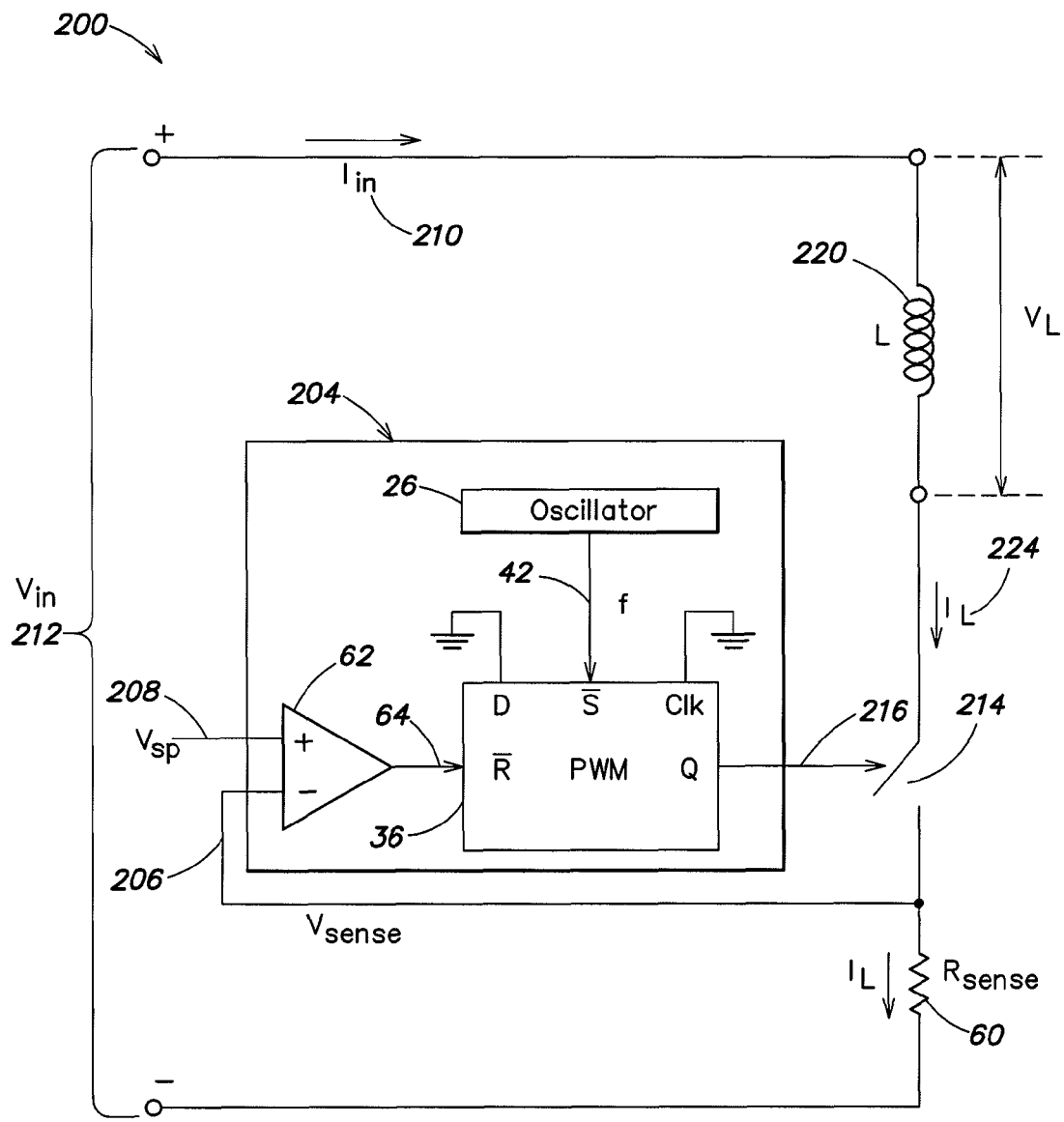
FIG. 15 is a circuit diagram illustrating a portion of the power control apparatus of FIGS. 12 and 13 according to one embodiment of the disclosure, in which the apparatus is controlled based in part on monitoring an inductor current drawn from a source of power and adjusting a duty cycle of a switching operation.

The embodiment of FIG. 15 includes some features discussed above in connection with FIG. 7 regarding a conventional "current-mode" switching regulator. For example, in FIG. 15, an input current sensing device 60, illustrated as a resistor $R_{sense}$, is employed to sample the inductor current $I_L$ when the switch 214 is on or closed (this essentially amounts to sensing the input current $I_{in}$). Additionally, the switch controller 204 includes a comparator 62, a pulse width modulator 36, and an oscillator 26 that provides to the pulse width modulator a pulse stream 42 having a frequency f. As in FIG. 7, one exemplary implementation of the pulse width modulator 36 is a D-type flip-flop with set and reset control, wherein the oscillator 26 provides the pulse stream 42 to the "Set" input of the flip-flop (low activated, $\overline{S}$), the comparator 62 provides a signal 64 to the "Reset" input of the flip-flop (low activated, $\overline{R}$), and the flip-flop's "Q" output provides a pulse width modulated control signal 216 to the switch 214.

In the embodiment of FIG. 15, the function of the pulse width modulator 36 and associated circuitry of the switch controller 204 is similar to that discussed above in connection with FIG. 7. However, unlike FIG. 7, in FIG. 15 there is no feedback information relating to the load that is used to affect the control of the switch 214. Rather, the switch controller 204 in the embodiment of FIG. 15 is configured to control the switch 214 based only on input information 208 representing the desired amount of power to be transferred to the load, and the monitored parameter 206 relating to the power provided to the power control apparatus 200 (i.e., the inductor current $I_L$/input current $I_{in}$).

In particular, according to one aspect of this embodiment, the input information 208 representing the desired amount of power to be transferred to the load may be in the form of a voltage set point $V_{sp}$. According to another aspect, the monitored parameter 206 may be a sensed voltage $V_{sense}$ relating to the inductor current $I_L$ as sampled via the resistor $R_{sense}$ (recall that the sampled inductor current $I_L$ in this example is identical to the input current $I_{in}$). In FIG. 15, the pulse width modulator 36 adjusts the duty cycle of the control signal 216, and hence the time period $t_{on}$ during which the switch 214 is closed, based on a comparison of the voltages $V_{sp}$ and $V_{sense}$. Thus, the voltage $V_{sp}$ essentially determines the peak inductor current $I_P$ at which the switch 214 opens during a given switching operation, thereby also determining the quantum of energy transferred during the switching operation. Accordingly, by varying the voltage $V_{sp}$, the transferred quantum of energy in a given switching operation, and hence the power to the load, similarly may be varied.

Figure 16:
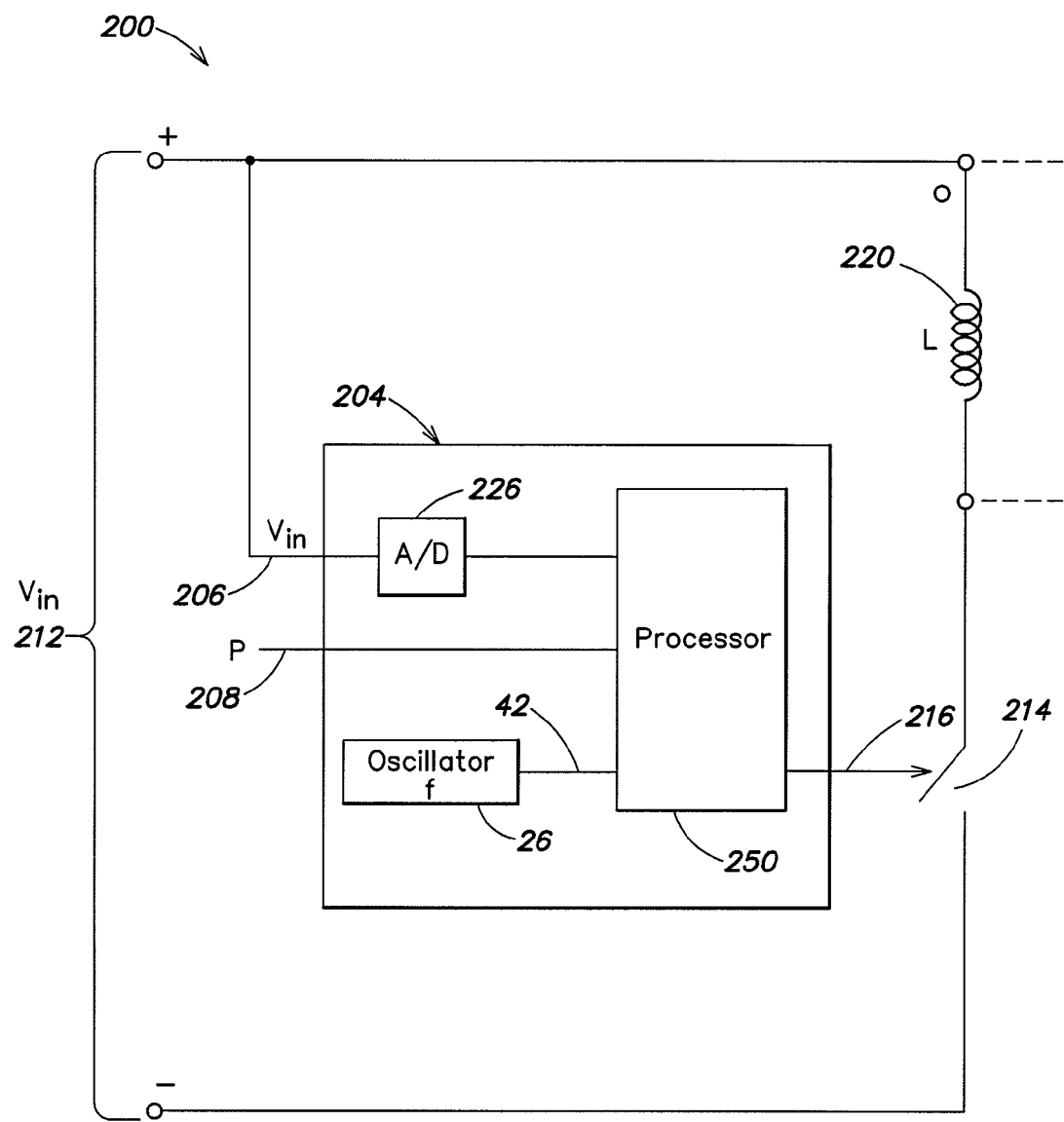
FIG. 16 is a circuit diagram illustrating a portion of the power control apparatus of FIGS. 12 and 13 according to another embodiment of the disclosure, in which the apparatus is controlled based in part on monitoring an input voltage to the apparatus and adjusting a duty cycle of a switching operation.

FIG. 16 illustrates a portion of a feed-forward power control apparatus 200 based on the configuration of FIG. 13 according to yet another embodiment, in which the power to the load again may be adjusted by varying the duty cycle of the switching operation and holding the switching frequency f constant. In the embodiment of FIG. 16, the time period $t_{on}$, and hence the duty cycle of the switch 214, is controlled based on monitoring the input voltage $V_{in}$ to the power control apparatus 200, rather than by sampling the input current $I_{in}$ (via the inductor current $I_L$) as in FIG. 15.

With reference again to the timing diagram of FIG. 14, based on the relationship $V_L=L\cdot dI_L/dt$, the peak inductor current $I_P$ may be expressed in terms of the input voltage $V_{in}$, which in the embodiment of FIG. 16 appears across the inductor when the switch 214 is on or closed:

$$V_{in} = L\frac{\Delta I_L}{\Delta t} = L\left(\frac{I_P - 0}{t_{on} - 0}\right) = \frac{LI_P}{t_{on}};$$

$$I_P = \frac{V_{in}t_{on}}{L}.$$

Using the foregoing relationships and the relationship for the power P transferred to the load given in equation (1) above, the power P transferred to the load also may be expressed in terms of the input voltage $V_{in}$ by substituting for $I_P$:

$$P = \frac{1}{2}L(I_P)^2 f = \frac{(V_{in})^2(t_{on})^2}{2L}f.$$

The foregoing relationship demonstrates that the power transferred to the load may be expressed either in terms of the peak inductor current $I_P$ or the voltage $V_{in}$ input to the apparatus 200. Accordingly, in the embodiment of FIG. 16, the switch controller 204 is configured to monitor the voltage $V_{in}$ (rather than sample the inductor current) as the monitored parameter 206 and receive as input information 208 some representation of the desired load power so as to determine the duty cycle of the switch 214 based on the relationship:

$$t_{on} = \sqrt{\frac{2L}{f}}\frac{\sqrt{P}}{V_{in}}, \quad (3)$$

To this end, FIG. 16 illustrates that, according to one embodiment, the switch controller 204 may include an analog-to-digital converter 226 to monitor the voltage $V_{in}$ and provide a suitable digitized representation of the voltage to a processor 250. The processor 250 also receives the input information 208 representing the desired load power. As in FIG. 15, the switch controller 204 also includes the oscillator 26 providing a pulse train 42 at the frequency f. The processor 250 is configured to generate the control signal 216 having a duty cycle based on a desired $t_{on}$ from equation (3) above by using the known circuit values for L and f, measuring $V_{in}$, and using the input information 208 relating to the desired load power P.

Figure 2:
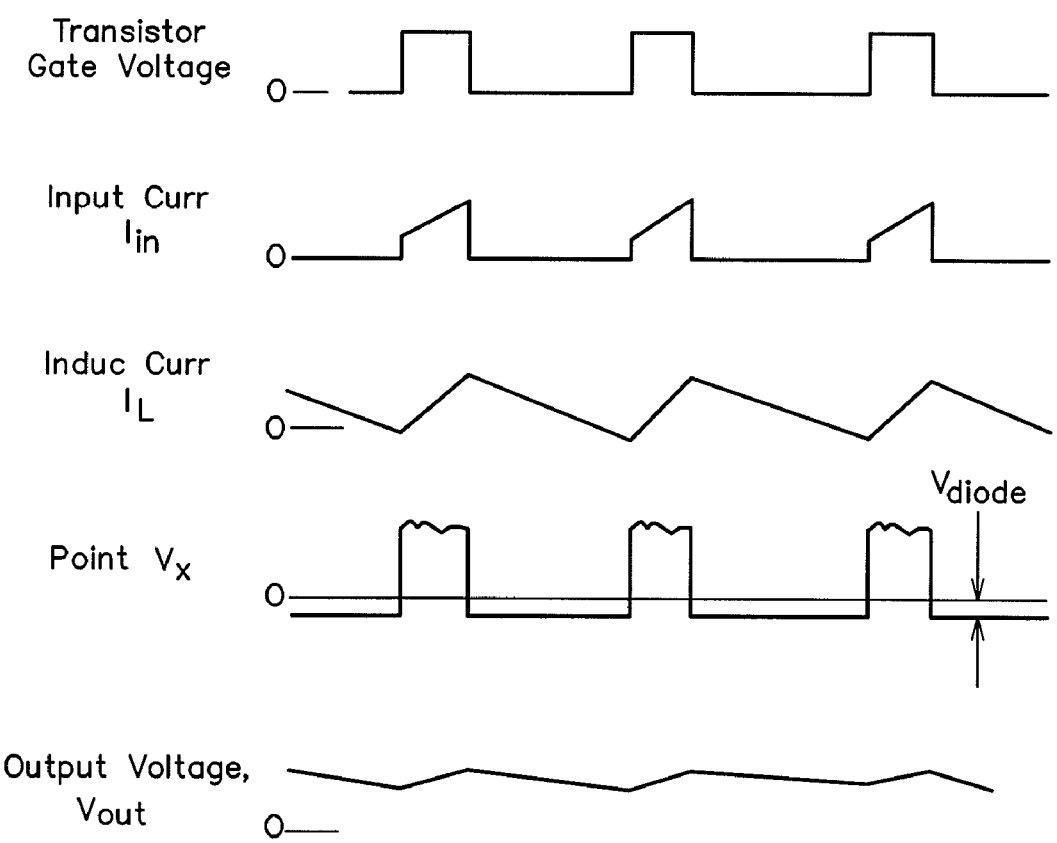
FIG. 2 is a diagram illustrating various operating signals associated with the DC-DC converter of FIG. 1.

Having discussed the control of load power based on varying the duty cycle of the switching operation while holding the number of energy transfers over time (e.g., the switching frequency f) constant in the embodiments of FIGS. 15-16, we now turn to the effects on load power based on varying the number of energy transfers over time while holding the duty cycle of the switching operation constant. Recall from equations (1) and (2) above that the power to the load may be adjusted by one or both of 1) adjusting the quantum of energy per transfer, as in the embodiments of FIGS. 15 and 16, and 2) varying over time the number of transfers each having the same quantum of energy.

To begin a discussion of this latter point, it should be readily appreciated that the circuits shown in FIGS. 15 and 16 may be modified to establish a preset fixed quantum of energy per transfer. For example, this may be accomplished by fixing the voltage set point $V_{sp}$ in FIG. 15, or the desired power input P in FIG. 16, at some essentially constant value rather than having these parameters received as variable input information 208 (in some implementations in which the parameters $V_{sp}$ and P are essentially fixed, some degree of nominal adjustment of these parameters nonetheless may be facilitated, for example, via trim potentiometers and associated circuitry). Accordingly, in some embodiments discussed below relating to adjusting load power based on modulating the frequency of switching operations, the input information 208 instead may represent a desired switching frequency for the switch 214, rather than a desired on-time or duty cycle of the switch 214.

Although the power relationship given in equation (1) above suggests that power to the load may be adjusted linearly with switching frequency f, generally there are practical limits on the range of switching frequencies that place corresponding constraints on the supply of power to the load. For example, there may be practical limits placed on the range of switching frequencies due to the component(s) used to implement the switch 214 as well as other circuit components. At sufficiently high frequencies, switching losses (which generally increase with increasing frequency) may present practical limitations on the highest usable frequency f in a given application. Also, radiated noise resulting from high frequency switching operations may present practical limitations on the highest usable frequency f due to regulatory constraints (presently, a general range of switching frequencies f conventionally employed in many types of DC-DC converters includes, but is not limited to, frequencies from approximately 50 kHz-100 kHz).

Also, the type of load to be controlled also may influence the range of switching frequencies f that may be practically employed to control power to the load. For example, as discussed above, one load of interest according to some embodiments of the present disclosure includes one or more LEDs, in which the perceived brightness of light generated by the LED(s) is controlled based on pulsed power delivery. With respect to this type of load, the capacitor 34 shown in FIG. 13 (which may be used with some loads to smooth the output voltage $V_{out}$) may have an appropriately-sized capacitance, or optionally may be removed from the energy transfer arrangement 202, as the LED(s) can respond to instantaneous changes in the voltage $V_{out}$. As discussed above, the LED(s) of such a load are energized in a pulsed fashion at a frequency that is greater than that capable of being detected by the human eye (e.g., greater than approximately 100 Hz). so as to avoid a "flicker" effect. Hence, in this application, the "flicker frequency" of the human eye may represent a lower limit for the switching frequency.

While the switching frequency f may be directly modulated to vary power to a load according to equation (1), another possibility for varying power can perhaps best be observed from equation (2), and relates to varying the number of fixed-quantum energy transfers over a time period that includes multiple periods T of an oscillator generating a reference pulse stream having a frequency f. This method essentially represents a "pulse dropping" or "pulse number modulation" technique based on the concept of one-bit D/A conversion, and corresponds to varying an effective frequency $f_{eff}$ of the switching operation between some minimum and maximum value (based on the reference pulse stream frequency f) so as to vary power to the load.

Figure 17:
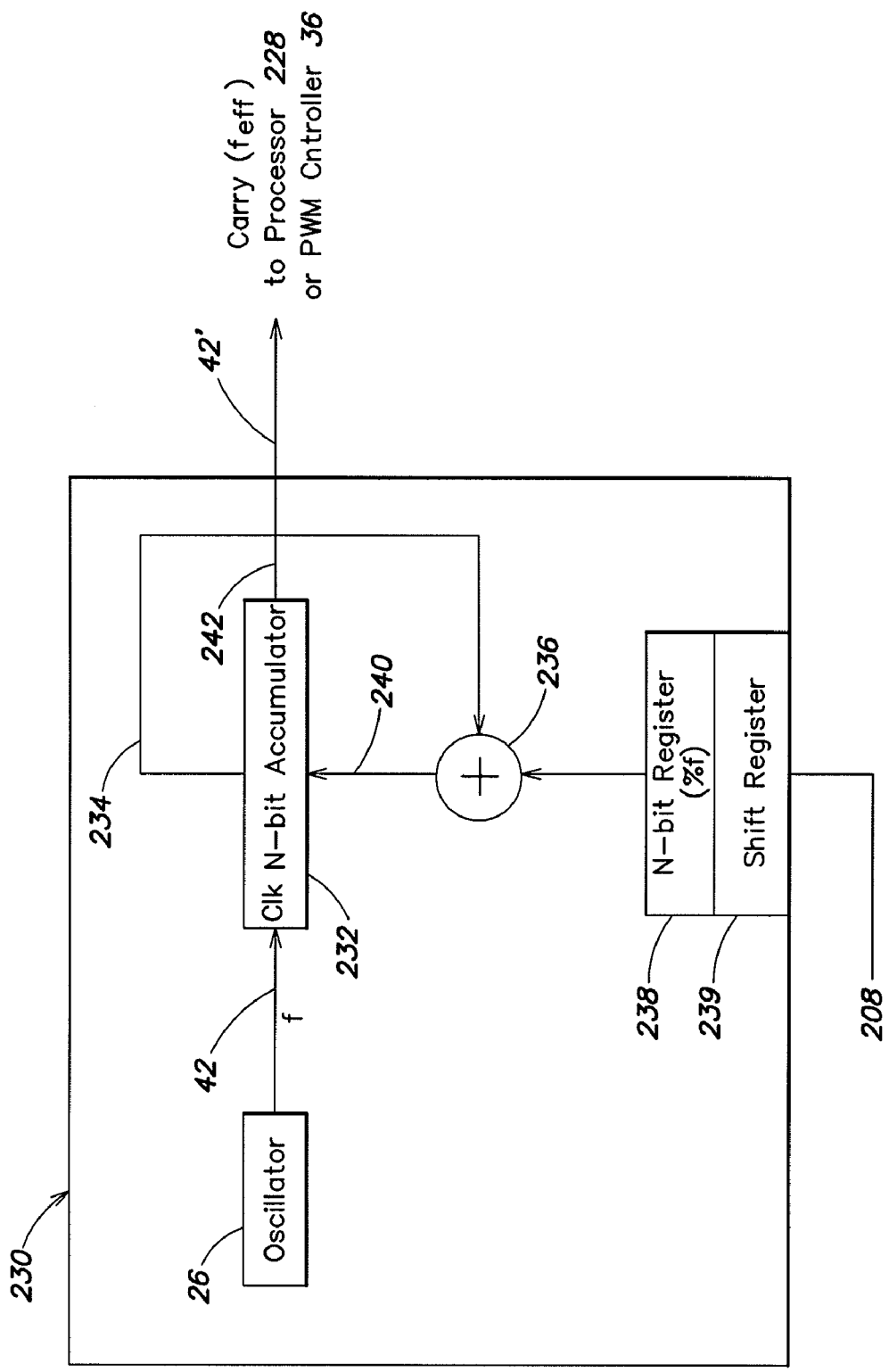
FIG. 17 is a circuit diagram illustrating a portion of a switch controller of the power control apparatus of FIGS. 12 and 13 according to another embodiment of the disclosure, in which the apparatus is controlled based on adjusting an effective frequency of a switching operation.

FIG. 17 is a block diagram schematically illustrating a pulse generation controller 230, which may be included as part of a switch controller 204 of a power control apparatus 200, according to one embodiment of the present disclosure. In one exemplary implementation of a switch controller based on the embodiment of FIG. 17, the pulse generation controller 230 may be employed to replace the oscillator 26 of the switch controllers 204 shown in either FIG. 15 or 16, and the input information 208 may be used to control the pulse generation controller 230 rather than compared to a value representing one of the input voltage $V_{in}$ or the input current $I_{in}$.

In particular, the pulse generation controller 230 of FIG. 17 is configured to facilitate control of power to the load via a pulse dropping or pulse number modulation technique, rather than controlling the quantum of energy per transfer via the duty cycle of the switch 214 (as in the embodiments shown in FIGS. 15 and 16). To this end, the pulse generation controller 230 outputs a modified pulse stream 42' having an effective frequency $f_{eff}$ that may be varied with respect to a reference oscillator frequency f. This modified pulse stream 42' is in turn used by a switch controller to control an effective frequency, rather than the duty cycle, of the control signal 216 that controls the switch 214 (e.g., the modified pulse stream 42' may be provided as an input to a pulse width modulator similar to the modulator 36 shown in FIG. 15, or a processor similar to the processor 228 shown in FIG. 16, in place of the pulse stream 42).

As discussed above, in some embodiments of a switch controller based on the pulse generation controller 230 of FIG. 17, the switch controller may be configured to establish a preset fixed quantum of transferred energy per switching cycle. With reference again to FIGS. 15 and 16, this may be accomplished, for example, by fixing the voltage set point $V_{sp}$ in FIG. 15, or the desired power input P in FIG. 16, at some constant value rather than having these parameters received as variable input information 208. In one aspect of such a switch controller, the input information 208 instead may represent a desired effective switching frequency $f_{eff}$ for the switch 214, wherein the preset fixed values for $V_{sp}$ or P represent a maximum power $P_{max}$ to the load when the input information 208 calls for a maximum effective frequency $f_{eff}$.

As shown in FIG. 17, according to one embodiment, the pulse generation controller 230 includes an N-bit register 238 to store a digital value between zero and $(2^N-1)$ based on the input information 208 (the input information 208 may first be passed through an optional shift register 239, discussed further below). According to one aspect of this embodiment, the digital value stored in the N-bit register 238 represents a desired effective switching frequency $f_{eff}$ in the form of a percentage of the reference frequency f and is accordingly indicated in FIG. 17 as % f. The pulse generation controller 230 also includes the oscillator 26 providing the pulse stream 42 at the reference frequency f.

In FIG. 17, an N-bit accumulator 232 receives as a "clock" input the pulse stream 42, and is configured to load an N-bit digital input value 240 into the accumulator 232 with every pulse of the pulse stream 42. The N-bit input value 240 loaded into the accumulator is the sum of the previous value 234 stored in the accumulator, plus the digital value % f stored in the N-bit register 238 (based on the input information 208), as indicated by the adder 236. Like the register 238, the N-bit accumulator has a maximum digital value of $(2^N-1)$; hence, if the input value 240 exceeds $(2^N-1)$, the accumulator is configured to store the difference between the input value 240 and $(2^N-1)$, and output a carry signal 242 representing an overflow condition. The carry signal returns to zero if the next pulse of the pulse stream 42 removes the overflow condition (i.e., if the next input value 240 loaded into the accumulator is less than $(2^N-1)$).

Hence, the carry signal 242 of the N-bit accumulator 232 represents a modified pulse stream 42', wherein the number of pulses in the modified pulse stream output by the accumulator in a given time period (# pulses out) is related to the number of pulses of the pulse stream 42 for the same time period (# pulses in) by:

$$\frac{\text{\# pulses out}}{\text{\# pulses in}} = \frac{\% \ f}{2^N}, \quad (4)$$

where, again, % f represents the digital value stored in the N-bit register 238 (ranging from zero to $2^N-1$). As discussed above, according to one embodiment, this modified pulse stream 42' is used by the switch controller to determine the effective switching frequency $f_{eff}$ of the switch 214 of the power control apparatus. From the above relationship, dividing the numerator and denominator by units of time to obtain frequency (i.e., frequency=# pulses/unit time), this effective switching frequency $f_{eff}$ relates to the reference frequency f according to:

$$f_{eff} = \left(\frac{\% \ f}{2^N}\right) f. \quad (5)$$

Hence, by varying the parameter % f between zero and $(2^N-1)$, the power to the load similarly may be varied according to equation (1) above (where $f_{eff}$ is substituted for f).

As discussed above, there may be some practical lower limit on the effective frequency $f_{eff}$ depending on the type of load. For example, considering an exemplary load including one or more LEDs, switching frequencies significantly lower than approximately 100 Hz may result in an undesirable "flicker effect" in which the perceived brightness of the illumination generated by the LED(s) is no longer essentially continuous.

For purposes of providing a practical example of control of one or more LEDs based on a pulse number modulation technique as discussed above in connection with FIG. 17, we consider an exemplary reference frequency f of 100 kHz for the pulse stream 42. It should be appreciated that various implementations according to the present disclosure are not limited in this respect, but rather that oscillator frequencies on the order of 100 kHz are commonly employed in various DC-DC converter configurations; accordingly, this reference frequency provides an appropriate example for purposes of illustration, but other reference frequencies may be used in various embodiments.

Given a reference frequency of 100 kHz and a minimum frequency of approximately 100 Hz to avoid an undesirable flicker effect for an LED-based load, it may be readily appreciated that the ratio of minimum to maximum frequency for the effective switching frequency $f_{eff}$ is on the order of 1:1000. Stated differently, to provide a minimum power to the LED-based load without noticeable flicker in the present example, for every 1000 pulses of the pulse stream 42 at a frequency of 100 kHz, the pulse generation controller 230 of FIG. 17 should provide at least one pulse in the modified pulse stream 42' (see equations (4) and (5) above).

Accordingly, to accommodate this range of effective switching frequencies based on a reference frequency of 100 kHz, in one embodiment an N=10-bit register 238 and an N=10-bit accumulator 232 may be employed in the pulse generation controller 230 of FIG. 17, where $2^{10}=1024$. Thus, according to equation (5) above, a minimum effective frequency $f_{eff}$ of (1/1024)f, or approximately 98 Hz, is achieved when the digital value of % f=1, and a maximum effective frequency $f_{eff}$ of (1023/1024)f or approximately 99.9 kHz, is achieved when the digital value of % f=1023. It should also be appreciated that, in the present example, variations in power to the load based on varying the value of % f are limited to increments of 1/1024 of the maximum power $P_{max}$ (i.e., the minimum power resolution capable of being achieved using a 10-bit register and accumulator is 1/1024).

One issue that may arise in connection with controlling power to a load including one or more LEDs relates to a somewhat non-linear relationship between applied average power to the LED(s) and a corresponding perceived brightness of the light generated by the LED(s). For example, the perceived brightness of light generated by one or more LEDs generally changes more dramatically with changes in power at relatively low power levels, whereas changes in power at relatively higher power levels generally results in a somewhat less pronounced change in perceived brightness.

In view of the foregoing, another embodiment of the pulse generation controller 230 shown in FIG. 17 is directed to enhancing the power resolution capability of the controller (i.e., reducing the minimum increment of power variation capable of being achieved by the controller) while at the same time essentially maintaining a predetermined ratio of minimum to maximum frequency for the effective switching frequency $f_{eff}$. By enhancing the power resolution, greater control of power variation may be facilitated, which in some cases may be especially desirable (e.g., at lower load powers for loads such as LEDs).

More specifically, according to one aspect of this embodiment, the number of bits N for the N-bit register 238 and the N-bit accumulator 232 is selected such that the minimum to maximum frequency ratio (i.e., $1:2^N$) for the effective switching frequency $f_{eff}$ is less than a predetermined required minimum ratio. For instance, in the example discussed above regarding LEDs, given a maximum reference frequency of 100 kHz and a minimum frequency of approximately 100 Hz to avoid an undesirable flicker effect, a value of N=10 provides a required ratio of minimum to maximum frequency for the effective switching frequency $f_{eff}$ (and a minimum power resolution) of 1:1024. By selecting an N>10, thereby reducing the ratio $1:2^N$, the power resolution may be enhanced (i.e., the minimum power increment may be reduced). However, so as to maintain the required minimum to maximum frequency ratio of 1:1024, the minimum value of % f needs to be offset (i.e., increased) so as to ensure that the minimum effective frequency does not fall significantly below 100 Hz.

For purposes of illustration, consider the case of N=16 for the N-bit register 238 and the N-bit accumulator 232 of FIG. 17. In this case, the minimum power increment is given by $1:2^{16}$, or 1:65,536 (i.e., a significant improvement in resolution over N=10). However, if the minimum value for % f were still allowed to be % f=1, the minimum effective frequency $f_{eff}$ would be approximately 1.5 Hz (i.e., 1/65,536·100 kHz), well below the minimum frequency to avoid an undesirable flicker effect. Accordingly, in one embodiment, the minimum value for % f is offset so as to maintain the appropriate ratio of minimum to maximum frequency for the effective switching frequency $f_{eff}$. Hence, in the present example in which N=16, the minimum value of % f, including an offset, would be 64, such that the minimum effective switching frequency would be (64/65,536·100 kHz), or approximately 98 Hz. From this minimum value, the effective switching frequency may be increased in increments of (1/65,536·100 kHz)=1.5 Hz (as % f is increased from 64 to 65 to 66, etc.), affording a significant increase in power control ability as compared to the example in which N=10.

To facilitate implementation of a pulse generation controller with enhanced power resolution, according to one embodiment the controller 230 of FIG. 17 may include a shift register 239 to provide an offset to input information 208. For example, consider a situation in which the input information 208 is provided as a 10-bit digital value representing % f, and in which N=16 for the N-bit register 238 and the N-bit accumulator 232. In this example, the required offset may be achieved by employing the shift register 239 to shift the 10-bit digital value provided as the input information 208 six bits to the left (i.e., $2^6$=64). Thus, when the 10-bit digital value "1" is received as the input information, the shift register 239 shifts the 10-bit value six bits to the left, and stores the value "64" in the N=16-bit register 238.

It should be appreciated that, in the discussion above relating to enhanced power resolution in the pulse generation controller 230 of FIG. 17, exemplary values for N and the number of bits in the input information 208 are provided primarily for purposes of illustration, and that various embodiments of the present disclosure are not limited in this respect. Rather, it should be readily appreciated that, according to one aspect of this embodiment, the optional shift register 239 of the pulse generation controller 230 generally provides a degree of flexibility to the controller that facilitates enhanced power resolution, based on input information 208 that otherwise may not provide for a desired degree of power resolution. Furthermore, it should be appreciated that a system or device providing the input information 208 to the controller 230 may be configured to include an offset in the input information, which may then be applied directly to the register 238.

Having now discussed the control of load power based on varying the duty cycle of the switching operation while holding the number of energy transfers over time constant (FIGS. 15-16), and varying the number of energy transfers over time while holding the duty cycle of the switching operation constant (FIG. 17), it should be appreciated that according to other embodiments, both the duty cycle and switching frequency (or effective switching frequency) of the switching operation may be varied, based on the concepts discussed above, to achieve a wide range of power control capability.

Figure 18:
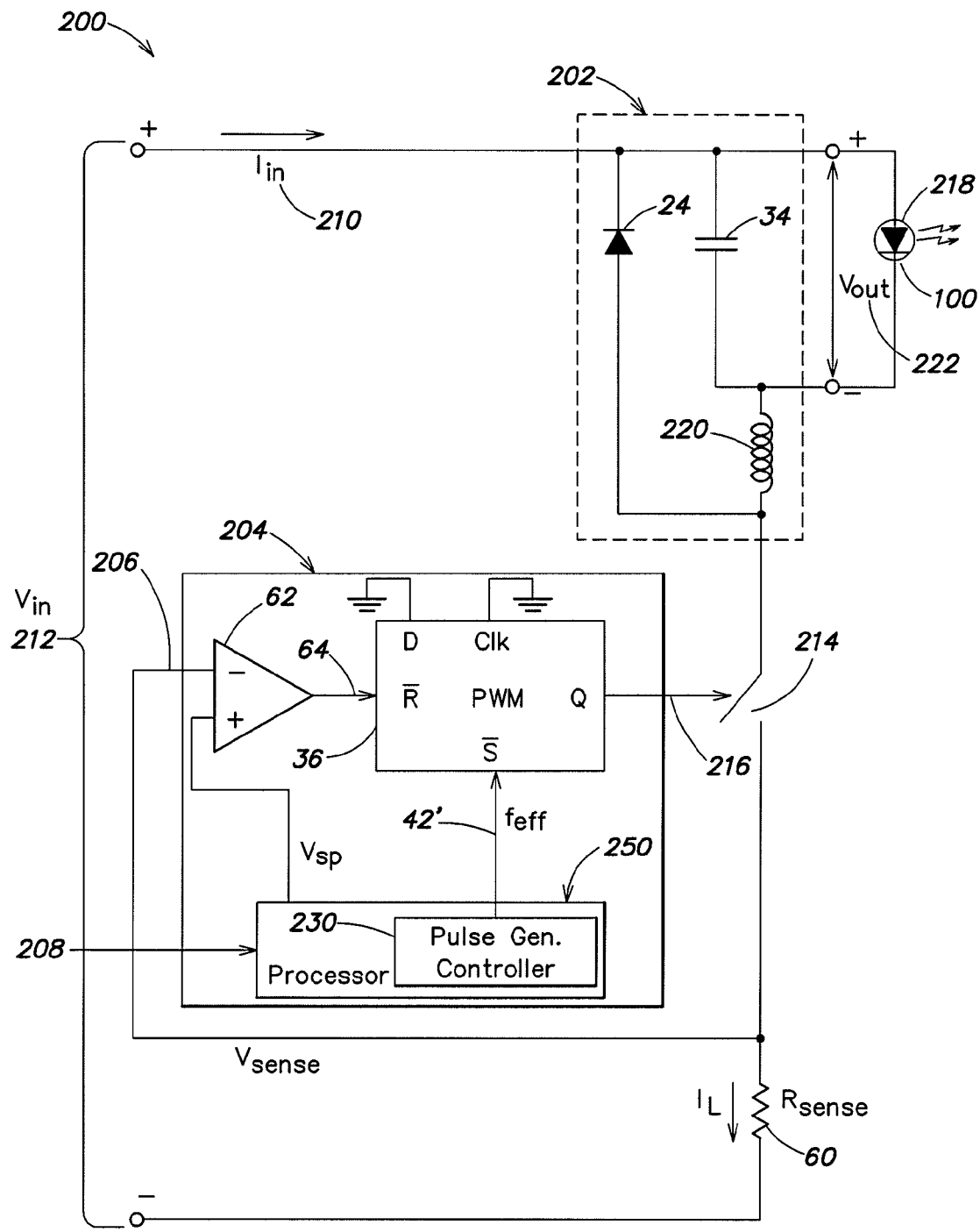
FIG. 18 is a diagram illustrating a power control apparatus according to another embodiment of the disclosure, in which both the duty cycle and effective switching frequency of a switching operation may be controlled to control power to a load.

For example, FIG. 18 is a diagram illustrating a power control apparatus 200 according to yet another embodiment of the present disclosure, in which both the duty cycle and effective switching frequency of the switch 214 may be controlled to control power to the load 218. In the embodiment shown in FIG. 18, the load is illustrated as a light source including one or more LEDs 100. As discussed above in connection with FIGS. 10 and 11, for loads including multiple LEDs, the LEDs may be interconnected in any of a variety of serial, parallel, or serial/parallel arrangements. Additionally, according to different aspects of this embodiment, the light source may include multiple same-color LEDs and/or LEDs of different colors.

In one aspect, the power control apparatus 200 of FIG. 18 is based on the configuration shown in FIG. 15, in that the monitored parameter 206 provided to the switch controller 204 (which parameter relates to the power supplied to the power control apparatus) is a sensed voltage $V_{sense}$ representing the input current $I_{in}$ (via the inductor current $I_L$ as sampled by the resistor $R_{sense}$ when the switch 214 is on or closed).

In the embodiment of FIG. 18, the energy transfer arrangement 202 is illustrated as a buck converter configuration including the diode 24, capacitor 34, and inductor 220 (e.g., see FIG. 1 for an example of a buck converter configuration). The buck converter configuration is different from the buck-boost converter configuration shown in the energy transfer arrangement 202 of FIG. 13, and is shown in FIG. 18 to again highlight that various converter configurations may be employed in the energy transfer arrangement 202 according to different embodiments of a power control apparatus 200.

With respect to the energy transfer arrangement 202, one noteworthy difference between the buck converter configuration shown in FIG. 18 and the buck-boost converter configuration of FIG. 13 is that in the buck converter of FIG. 18, the current $I_{in}$ drawn by the apparatus 200 passes through the load 218 (e.g., the one or more LEDs 100) as well as the inductor 220 when the switch 214 is on or closed. In this sense, it should be appreciated that some power is provided to the load 218 during both of the time periods $t_{on}$ and $t_{off}$ of a given switching cycle. While this situation should be taken into consideration when calculating a desired power to be delivered to the load, the general concepts discussed above in connection with controlling load power based on one or both of the duty cycle and effective frequency of switching operations apply similarly to both the buck and buck-boost converter configurations, as well as a variety of other DC-DC converter configurations that may be employed in the energy transfer arrangement 202 in various embodiments of a power control apparatus 200.

In the embodiment of FIG. 18, as mentioned above, the switch controller 204 employs a variety of features to facilitate control of both the duty cycle and the effective switching frequency of the switch 214. To this end, in one aspect of this embodiment the switch controller 204 includes a processor 250 that receives the input information 208 representing a desired load power. In response to the input information 208, the processor 250 is configured to provide as outputs the voltage set point $V_{sp}$ (which ultimately determines the duty cycle of the switch 214) as well as the modified pulse stream 42' having a frequency $f_{eff}$ (which determines the effective switching frequency of the switch 214). As shown in FIG. 18, according to another aspect, the processor 250 is configured to implement the functions of the pulse generation controller 230 discussed above in connection with FIG. 17 so as to provide the modified pulse stream 42'. The other illustrated components of the switch controller 204, namely the comparator 62 and the pulse width modulator 36, function as discussed above in connection with FIG. 15, based on the outputs $V_{sp}$ and the modified pulse stream 42' provided by the processor 250.

In the embodiment of FIG. 18, the processor 250 may be configured to process the input information 208 in any of a variety of manners; generally, the processor may be configured to vary one or both of the parameters $V_{sp}$ and $f_{eff}$ based on a desired load power represented by the input information 208. This capability provides for a wide range of flexibility in controlling load power for different types of loads.

For example, in one aspect of this embodiment, for a relatively higher range of desired load powers, the processor may be configured to fix the voltage $V_{sp}$ at a predetermined value, thereby fixing the switch's duty cycle and hence the quantum of energy transferred to the load in a given switching cycle. With $V_{sp}$ fixed, the processor may be configured to then control load power via adjustments to the effective switching frequency $f_{eff}$ (via changes to the modified pulse stream 42'). In contrast, for a relatively lower range of desired load powers, the processor may be configured to vary the voltage $V_{sp}$ while holding $f_{eff}$ constant at some appropriate predetermined value. In yet another aspect, for some intermediate range of desired load powers, the processor may be configured to vary both $V_{sp}$ and $f_{eff}$.

The foregoing exemplary technique of employing different control parameters to vary power to the load over different ranges of desired load power may be particularly useful for controlling a load including one or more LEDs, wherein increased power resolution at low load powers generally is desirable. In particular, at relatively low effective switching frequencies approaching approximately 100 Hz, further reductions in load power may be achieved via adjustments to $V_{sp}$ (to avoid a "flicker effect" at switching frequencies substantially lower than approximately 100 Hz). Also, enhanced power resolution features discussed above in connection with FIG. 17 also may be employed to facilitate more precise lower range load power control via the effective switching frequency $f_{eff}$. Again, the foregoing is intended merely to provide some examples of flexibly controlling power to a load via one or both of duty cycle and switching frequency, and it should be appreciated that various embodiments according to the present disclosure are not limited to these examples.

In other aspects of the embodiment of a power control apparatus 200 shown in FIG. 18, the processor 250 may be an addressable device so as to facilitate control of the power control apparatus 200 via a network. For example, in a network environment, the input information 208 may be provided to a number of different devices, including multiple power control apparatus with respective loads, wherein the input information 208 includes load power control information for the multiple power control apparatus.

According to one embodiment, as the input information 208 is communicated via the network to different power control apparatus, the processor 250 of a given apparatus may be configured to be responsive to particular information/data (e.g., power control commands) that pertain to it (e.g., in some cases, as dictated by a particular identifier or address associated with the processor). Once the processor 250 identifies particular information/data intended for it, it may process the information/data and control load power conditions accordingly (e.g., via one or both of $V_{sp}$ and $f_{eff}$ in FIG. 18).

In yet another aspect of the embodiment shown in FIG. 18, the processor 250 of a given power control apparatus 200, whether or not coupled to a network, may be configured to interpret input information 208 that is received in a DMX protocol (as discussed, for example, in U.S. Pat. No. 6,016, 038), which is a lighting command protocol conventionally employed in the lighting industry for some programmable lighting applications. However, it should be appreciated that power control apparatus according to various embodiments of the present disclosure are not limited in this respect, as they may be configured to be responsive to other types of communication protocols.

Figure 19:
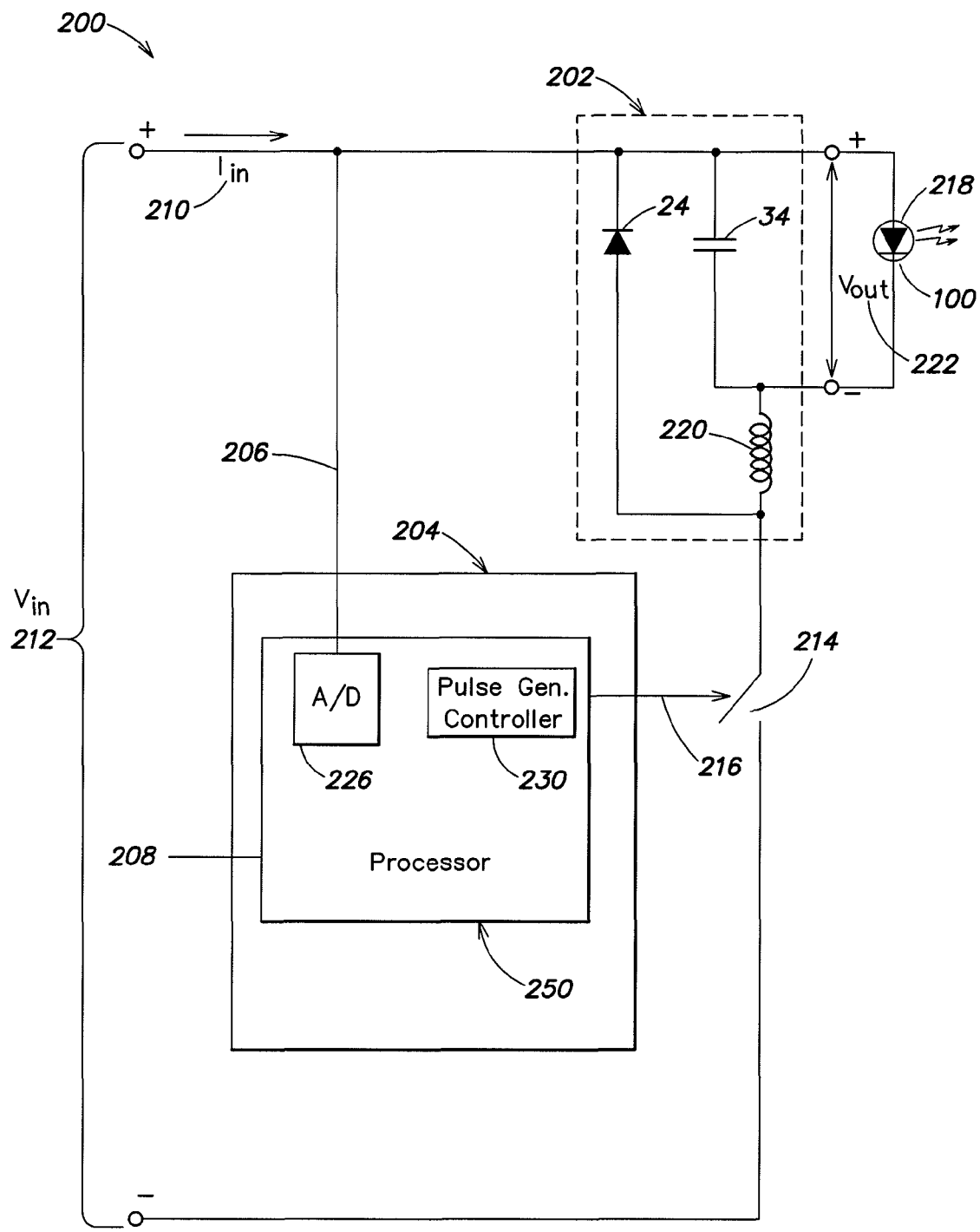
FIG. 19 is a diagram illustrating a power control apparatus according to yet another embodiment of the disclosure, in which both the duty cycle and effective switching frequency of a switching operation may be controlled to control power to a load.

FIG. 19 is a diagram illustrating a power control apparatus 200 according to yet another embodiment of the present disclosure, in which both the duty cycle and effective switching frequency of the switch 214 may be controlled to control power to the load 218. In the embodiment shown in FIG. 19, the load is again illustrated as a light source including one or more LEDs 100, coupled to an energy transfer arrangement 202 based on a buck converter configuration. However, it should be appreciated that these aspects of the apparatus shown in FIG. 19 are provided merely as examples, and that the embodiment of FIG. 19 is not limited in these respects.

In one aspect, the power control apparatus 200 of FIG. 19 is based on the configuration shown in FIG. 16, in that the monitored parameter 206 provided to the switch controller 204 is the input voltage 212 ($V_{in}$). In particular, the processor 250 of the switch controller shown in FIG. 19 may include an A/D converter 226 to monitor the voltage $V_{in}$ and provide a suitable digitized representation of this input voltage. Like the embodiment of FIG. 18, the processor 250 in FIG. 19 also may be configured to implement the function of the pulse generator controller 230, and again receives as input information 208 some representation of the desired load power, in response to which the processor 250 controls the duty cycle (e.g., see equation (3) above) and/or effective switching frequency of the switch 214 via the control signal 216.

In other aspects of the embodiment shown in FIG. 19, the power control apparatus 200 may be configured to process the input information 208 in any of a variety of manners, as discussed above in connection with FIG. 18, to flexibly control the duty cycle and/or effective switching frequency of the switch 214 over various ranges of desired load power. Additionally, the processor 250 of FIG. 19 may be an addressable device so as to facilitate control of the power control apparatus 200 via a network. In yet another aspect of this embodiment, the processor 250 may be configured to interpret input information 208 that is received in a DMX protocol.

In some implementations of a power control apparatus according to various embodiments of the present disclosure, one or more energy transfer elements (e.g., inductors, transformers) of an energy transfer arrangement 202 may include a tapped inductor or a transformer with multiple windings having different numbers of turns to which an input voltage is applied and from which an output voltage is derived. Such components may facilitate the implementation of a power control apparatus that effectively controls power to a load in situations where the DC input voltage $V_{in}$ and the DC output voltage $V_{out}$ of the power control apparatus are significantly different (i.e., when the input voltage is significantly greater or less than the output voltage).

With reference again to FIG. 1, consider the basic input-output voltage relationship for the conventional buck converter, given by:

$$\frac{V_{out}}{V_{in}} = D$$

(where D is the duty cycle of the switch). As discussed earlier, other DC-DC converter configurations have somewhat similar relationships between voltage ratio and duty cycle. In any case, the relationship above generally illustrates the premise that as the desired output voltage becomes significantly different than the available input voltage, in some instances the required duty cycle of the switch may become very short or very long as compared to the total period of a switching cycle. In general, an extremely low duty cycle (extremely short pulse time $t_{on}$) or an extremely long duty cycle (extremely short off time $t_{off}$) may make it more difficult to accurately control the amount of energy transferred to the load with each switching cycle.

In view of the foregoing, in some implementations of power control apparatus according to various embodiments of the present disclosure, a tapped inductor or a transformer having windings with different numbers of turns may be employed in an energy transfer arrangement 202, such that a turns ratio N of the inductor or transformer facilitates a more accurate control of energy transfer (the turns ratio N commonly is defined as the number of windings of a transformer or inductor to which an input voltage is applied, divided by the number of windings from which an output voltage is taken). In various embodiments, the turns ratio N of the inductor or transformer may be selected such that the pulse time $t_{on}$ increased relative to the time $t_{off}$ while essentially maintaining a desired input-output voltage relationship. In particular, larger values of N increase the current during the transfer of energy to the load and hence allow the stored energy to be transferred faster to the load.

Figure 20:
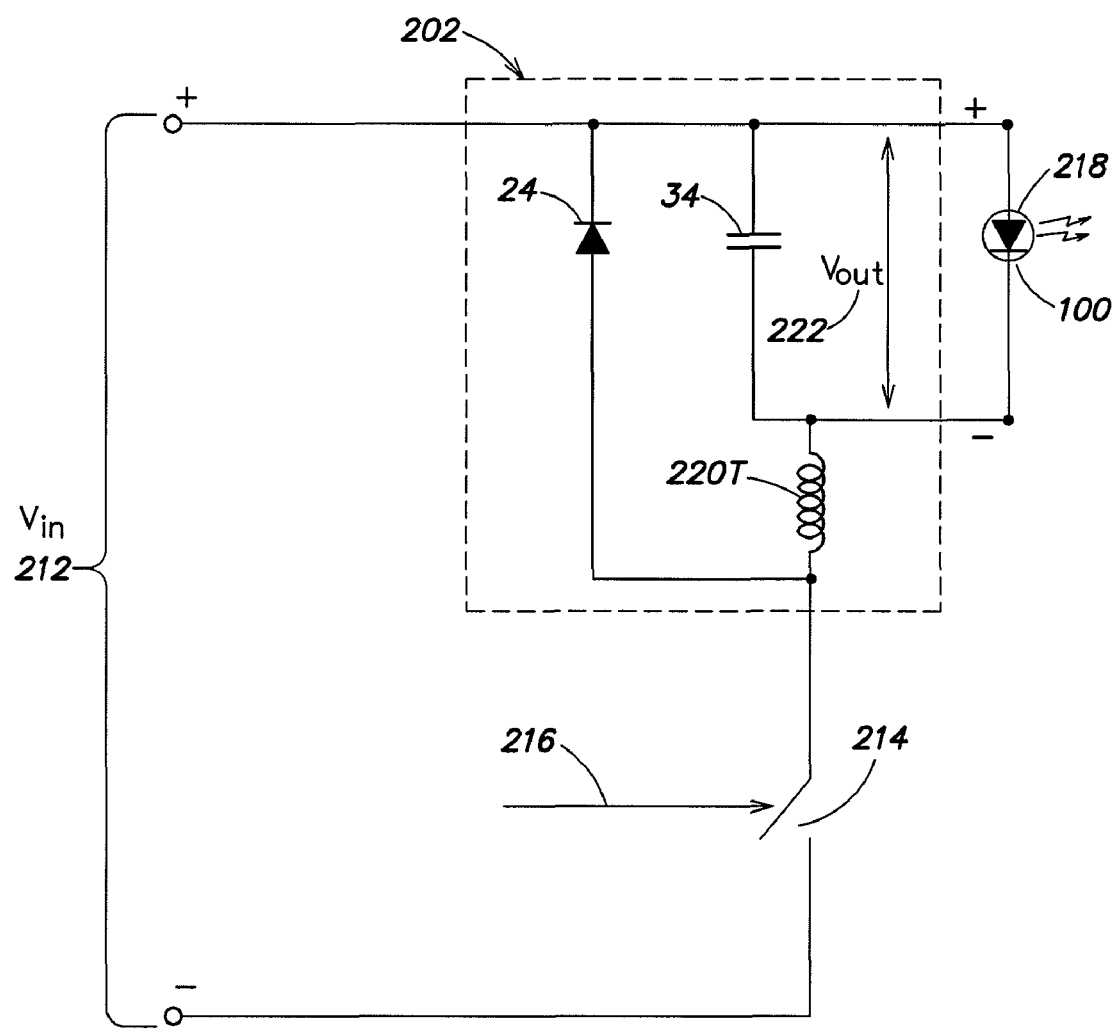
FIG. 20 is a circuit diagram illustrating a portion of a power control apparatus incorporating a tapped inductor, according to one embodiment of the disclosure.

FIG. 20 is a circuit diagram illustrating a portion of a power control apparatus having an energy transfer arrangement 202 that incorporates a tapped inductor 220T, according to one embodiment of the present disclosure. In particular, the energy transfer arrangement 202 shown in FIG. 20 is similar to the buck converter configuration illustrated in FIGS. 18 and 19, but includes the tapped inductor 220T rather than the inductor 220. It should be appreciated that any of the other energy transfer arrangements discussed herein may be equipped with a tapped inductor or transformer having some non-unity turns ratio N, and that the exemplary buck converter configuration arrangement shown in FIG. 20 is provided primarily for purposes of illustration.

In the embodiment of FIG. 20, the input voltage $V_{in}$ periodically is applied across both the load 218 and all of the turns of the tapped inductor 220T, whereas the output voltage $V_{out}$ is derived from only a portion of the total number of turns of the tapped inductor 220T. Accordingly, the turns ratio N of the tapped inductor 220T is greater than unity. An input-output voltage relationship for the energy transfer arrangement 202 of FIG. 20 employing the tapped inductor 220T may be given generally by:

$$\frac{V_{out}}{V_{in}} = \frac{D}{N} = \frac{t_{on}}{NT}, \quad (6)$$

where T=1/f is the period of each switching cycle.

To provide one exemplary implementation of a power control apparatus employing the energy transfer arrangement 202 shown in FIG. 20 and exemplary circuit values for such an implementation, consider an application in which the expected input voltage $V_{in}$ is on the order of 400 Volts, a desired output voltage $V_{out}$ is on the order of 20 Volts, the frequency f of the switching operation is 100 kHz, and the turns ratio of the tapped inductor 220T is N=3. Additionally, in this exemplary implementation, the desired power provided to the load nominally is on the order of approximately 10 to 15 Watts.

To ensure discontinuous mode operation in this example, with reference again for the moment to FIG. 14, the quantity $t_{on}+t_2$ may be chosen to be slightly less than the period T, for example, 0.9T. With this in mind, and applying equation (6) above, the time $t_{on}$ is given approximately by:

$$\frac{V_{out}}{V_{in}} = \frac{20}{400} = \frac{1}{20} = \frac{t_{on}}{3(T)}$$

$$t_{on} + t_2 = 0.9(T)$$

$$t_{on} + \frac{17}{3}t_{on} = 0.9\left(\frac{1}{100\,\text{kHz}}\right)$$

$$t_{on} \approx 1.35\,\mu\text{sec},$$

where the substitution for $t_2$ is obtained by setting $T=20t_{on}/3$ in the second equation above. Recall from equation (3) that the time period $t_{on}$, also may be expressed in terms of the inductance L of the inductor, the frequency f, the desired power P and the input voltage $V_{in}$, according to:

$$t_{on} = \sqrt{\frac{2L}{f}} \frac{\sqrt{P}}{V_{in}},$$

or $$P = \frac{(V_{in})^2 (t_{on})^2}{2L} f.$$

From the above relationship, using the approximate value for $t_{on}$ of 1.35 microseconds, the frequency f=100 kHz, the input voltage $V_{in}$=400 Volts, and an exemplary inductance value L=1.0 milli-Henries for the tapped inductor 220T, the resulting power P to the load is approximately 14.5 Watts. Of course, as discussed above in connection with several embodiments, the exemplary nominal value for load power given above may be varied by varying one or both of the frequency f and the time period $t_{on}$.

Again, it should be appreciated that the foregoing example is provided primarily for purposes of generally illustrating an exemplary range of input and output voltage parameters and desired load power given some exemplary circuit values for one possible implementation. In general, the inductance value L and turns ratio N of the tapped inductor (as well as corresponding values for a transformer in embodiments in which a transformer is employed) may be selected to facilitate predictable transfer of a desired range of load powers given the expected input voltage, desired output voltage and general range of switching frequencies.

In some implementations of power control apparatus according to various embodiments of the present disclosure, depending on the actual components employed, one or more energy storage elements (e.g., inductors) may not completely discharge their stored energy to the load during the $t_{off}$ time period of each switching cycle. In the case of inductors or transformers serving as energy storage elements, this residual energy may be due primarily to a winding capacitance. The amount of the residual energy stored in the winding capacitance is voltage dependent (since the energy-capacitance relationship $W=(1/2)CV^2$ includes the voltage squared as a principal term). Such residual energy may be observed as a "ringing" at the conclusion of a switching cycle, which represents the continual transfer of energy from the winding capacitance to the inductance and back again. In some instances, this residual energy may affect the precision with which power may be transferred to the load.

Figure 20A:
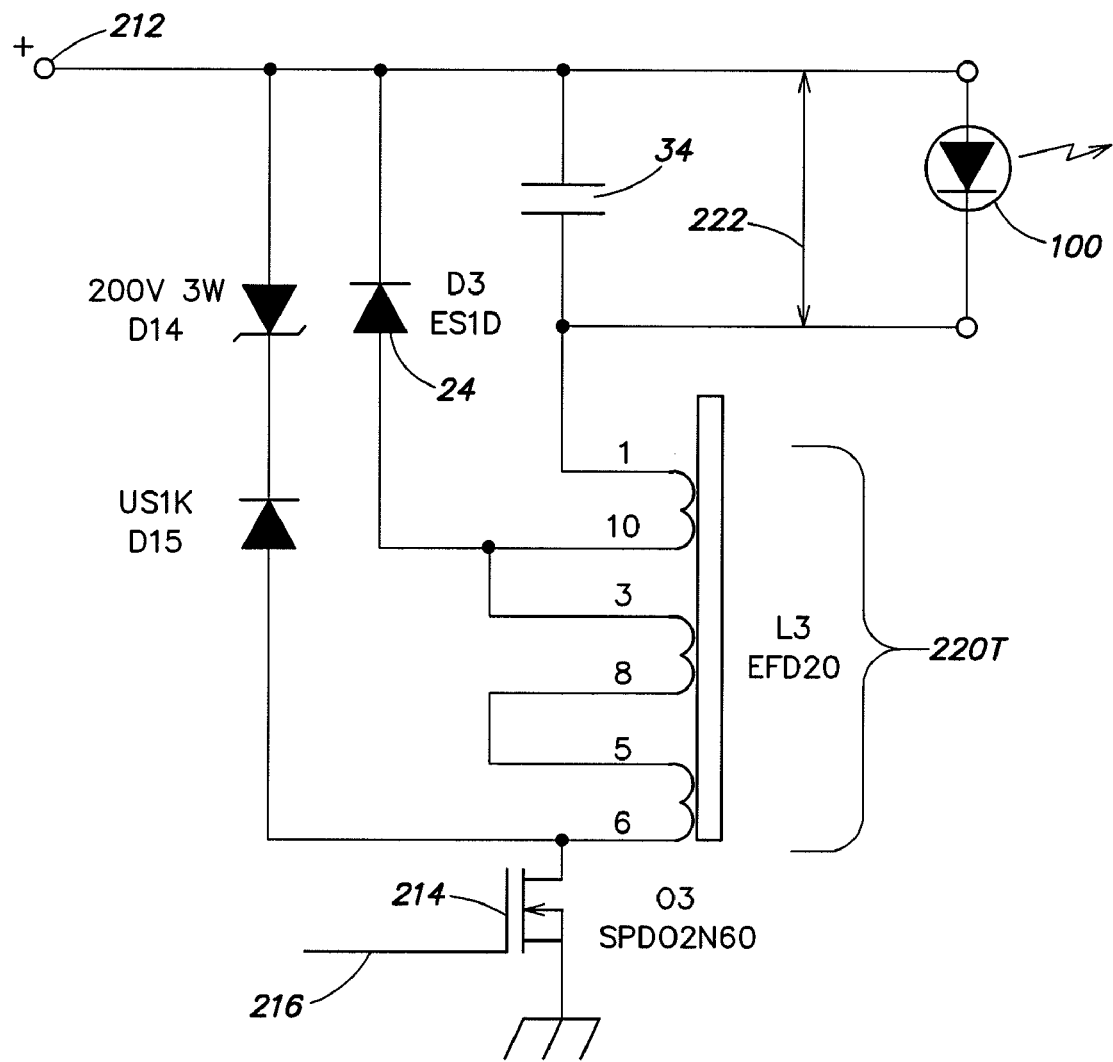
FIG. 20A is a circuit diagram illustrating the portion of the power control apparatus shown in FIG. 20, with additional components to reduce residual stored energy, according to one embodiment of the disclosure.

According to one embodiment, this ringing effect due to residual energy may be reduced primarily by selecting inductors or transformers with a low winding capacitance. Any remaining residual energy further may be reduced, or even substantially eliminated, by providing a discharge path for the residual energy once the transfer of energy to the load is complete. For example, with reference again to the exemplary circuit shown in FIG. 20, once the diode 24 stops conducting during the $t_{off}$ period (i.e., at a point when substantially all of the energy stored in the inductor 220T has been transferred to the load 100), a low impedance may be appropriately placed across the inductor 220T for a short time, so as to effectively discharge any residual energy. In one exemplary implementation, this may be accomplished by placing an auxiliary transistor (e.g., FET) across the inductor winding, which is switched on briefly at an appropriate time (e.g., after the diode 24 ceases to conduct). In another exemplary implementation, the circuit configuration shown in FIG. 20A may be employed. In FIG. 20A, the tapped inductor 220T is depicted as a series connection of three windings, across one of which the voltage 216 may be obtained.

Figure 21:
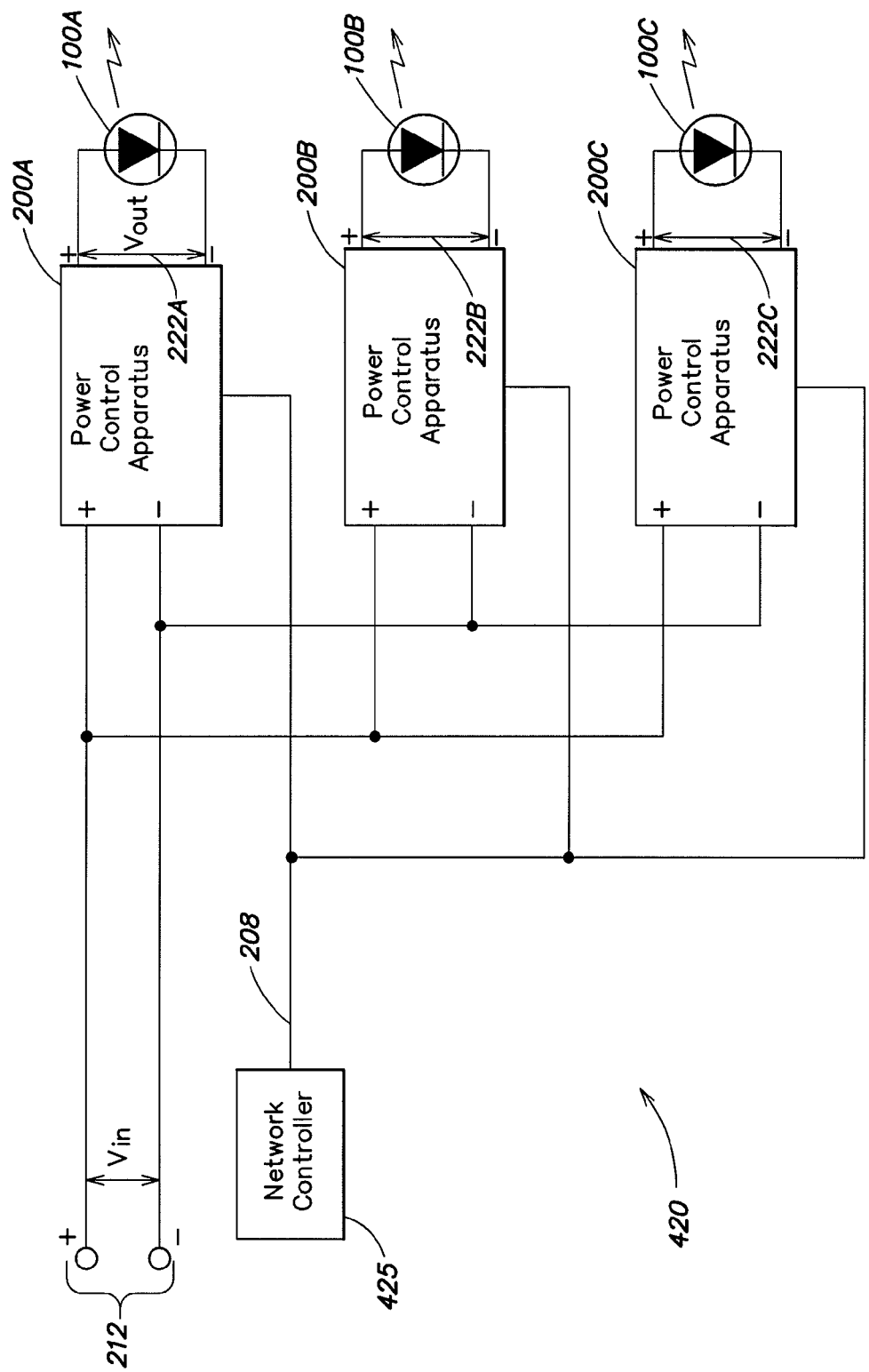
FIG. 21 is a block diagram illustrating a lighting network based on multiple power control apparatus, according to one embodiment of the disclosure.

FIG. 21 is a block diagram illustrating yet another embodiment of the present disclosure, based on the various power control apparatus discussed above. In the embodiment of FIG. 21, multiple power control apparatus 200A, 200B and 200C, similar to that shown for example in either FIG. 18 or 19, may be coupled together to form a lighting network 420. In one implementation of such a network, each power control apparatus receives operating power from the DC input voltage 212 ($V_{in}$). While not explicitly shown in FIG. 21, this DC input voltage may be in turn derived from an AC source of power (e.g., an AC line voltage) via rectification and filtration components, for example. Each power control apparatus also receives input information 208, and is configured to control multiple LED-based loads to provide general illumination and/or a variety of lighting effects.

More specifically, in the lighting network 420 shown in FIG. 21, the power control apparatus 200A, 200B and 200C are configured to control power delivered to respective LED-based loads 100A, 100B and 100C based on the input information 208. In one aspect, each of the LED-based loads may include one or more LEDs of a same color, and different loads may include different color LEDs (e.g., the load 100A may include only one or more red LEDs, the load 100B may include only one or more green LEDs, and the load 100C may include only one or more blue LEDs). In other aspects, one or more of the LED-based loads 100A, 100B and 100C may include only white LEDs, and two or more different LED based loads may include white LEDs that generate radiation having different respective spectra or color temperatures (e.g., the load 100A may include one or more white LEDs that generate radiation having a first spectrum, and the load 100B may include one or more white LEDs that generate radiation having a second spectrum different from the first spectrum). In another aspect, the respective loads may contain the same or different numbers of LEDs, and one or more of the loads may contain multiple LEDs interconnected in any of a variety of serial, parallel, or serial/parallel configurations. In yet another aspect, one or more of the loads 100A, 100B and 100C may include multiple LEDs of mixed colors.

Although the lighting network 420 is shown in FIG. 21 as including three power control apparatus 200A, 200B and 200C, it should be appreciated that the lighting network is not limited in this respect, as different numbers of power control apparatus and associated loads may be included in such a lighting network according to various embodiments. Additionally, in other embodiments, one or more loads other than LED-based loads may be employed in similar multi-load configurations based on the general arrangement of components in the network 420.

As shown in FIG. 21, all of the power control apparatus forming the network 420 may be configured to receive commonly distributed input information 208 that may be provided, for example, from one or more network controllers 425. To this end, in one aspect of this embodiment, multiple power control apparatus forming the network 420 may be configured with addressable processors, as discussed above in connection with FIGS. 18 and 19, having respective unique identifiers (e.g., addresses) such that a given power control apparatus may be configured to be responsive to particular portions of the input information 208 (e.g., power control commands) that pertain to it. In yet another aspect of this embodiment, the network controller 425 and the processors of the respective power control apparatus forming the network 420 may be configured to communicate the input information 208 using a DMX protocol.

In other aspects of the embodiment of FIG. 21, a given power control apparatus of the lighting network 420 generally may be represented by the embodiment shown in FIG. 12, and may incorporate any of a variety of energy transfer arrangements as well as various other features discussed above in connection with FIGS. 15-20. In particular, the energy transfer arrangement of a given power control apparatus of FIG. 21 may be based on any one of a number of DC-DC converter configurations, including those with or without isolation features.

In one aspect of the lighting network 420 shown in FIG. 21, the DC-DC converter functionality implemented by the respective power control apparatus 200A, 200B and 200C facilitate a network in which a relatively high DC input voltage $V_{in}$ (e.g., on the order of approximately 150 to 400 Volts DC) may be distributed to the power control apparatus forming the network 420, which in turn each provides a significantly smaller output voltage $V_{out}$ (e.g., on the order of 20 Volts) to its associated LED-based load. It should be appreciated that by distributing a DC source of power throughout the network via a relatively high DC voltage, resistive power losses that may otherwise be significant for network implementations involving substantial cable lengths may be reduced, thereby increasing power efficiency.

Figure 22:
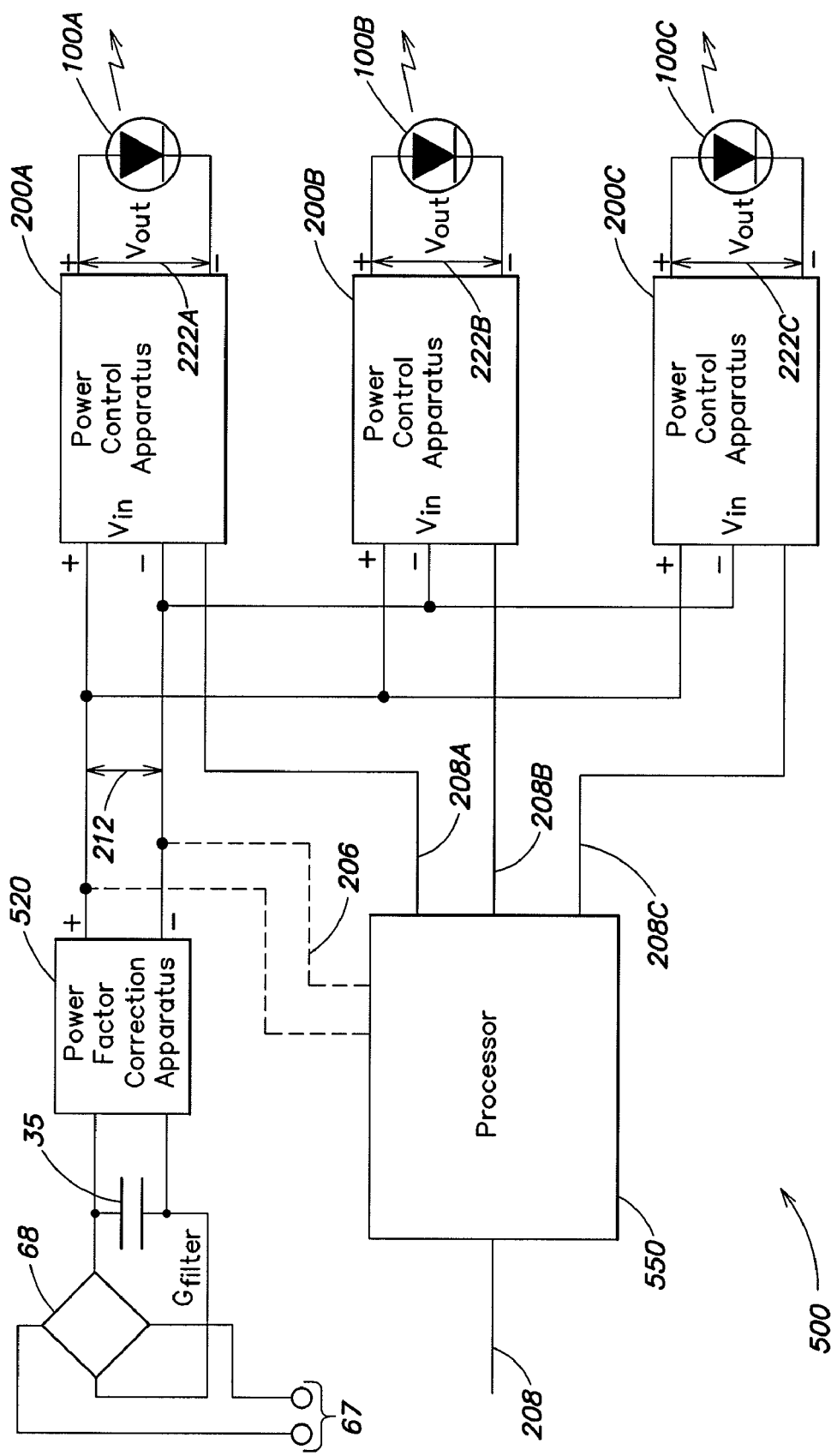
FIG. 22 is a diagram of a lighting apparatus incorporating multiple power control apparatus according to one embodiment of the disclosure.

FIG. 22 is a diagram of a lighting apparatus 500 incorporating multiple power control apparatus 200A, 200B, and 200C according to another embodiment of the present disclosure. In one aspect of the embodiment of FIG. 22, the lighting apparatus 500 receives power from an AC line voltage 67 (i.e., an AC source of power) and input information 208, and is configured to control multiple LED-based loads to provide general illumination and/or a variety of lighting effects.

More specifically, in the lighting apparatus 500 shown in FIG. 22, the power control apparatus 200A, 200B and 200C are configured to control power delivered to respective LED-based loads 100A, 100B and 100C based on the input information 208, in a manner similar to that discussed above in connection with FIG. 21. As discussed above in connection with the embodiment of FIG. 21, the respective LED-based loads 100A, 100B and 100C may include various numbers, arrangements, and colors of LEDs. Likewise, although the lighting apparatus 500 is shown in FIG. 22 as including three power control apparatus 200A, 200B and 200C, it should be appreciated that the lighting apparatus is not limited in this respect, as any number (i.e., one or more) of power control apparatus and associated loads may be included in a lighting apparatus according to various embodiments. Additionally, in other embodiments, one or more loads other than LED-based loads may be employed in similar multi-load configurations based on the general arrangement of components in the apparatus 500.

Figure 9A:
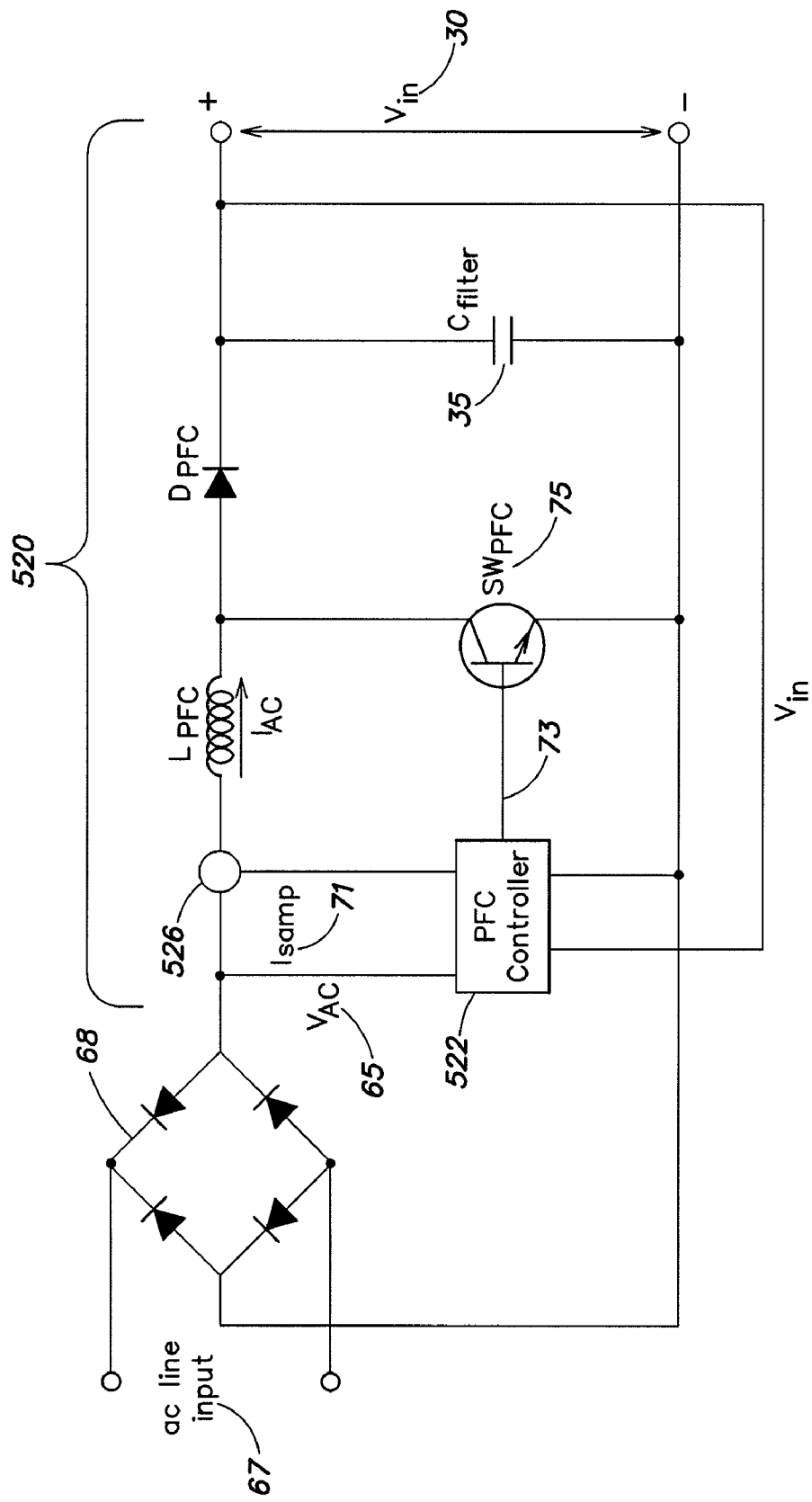
FIG. 9A is a circuit diagram of a conventional power factor correction apparatus based on a boost converter topology.

In one aspect of the embodiment of FIG. 22, each power control apparatus 200A, 200B and 200C receives a common DC input voltage 212 ($V_{in}$) that may be provided by an optional power factor correction apparatus 520. If the optional power factor correction apparatus is not employed, the DC input voltage 212 may be obtained across the filter capacitor 35 ($C_{filter}$) across the output of the bridge rectifier 68 coupled to the AC line voltage 67 (i.e., an AC power source), in a manner similar to that shown above in FIG. 8. Alternatively, in embodiments in which the power factor correction apparatus 520 is employed, the power factor correction apparatus 520 receives power from the output of the bridge rectifier 68, and the filter capacitor 35 is employed in an output stage of the power factor correction apparatus (e.g., see FIG. 9A).

Figure 9B:
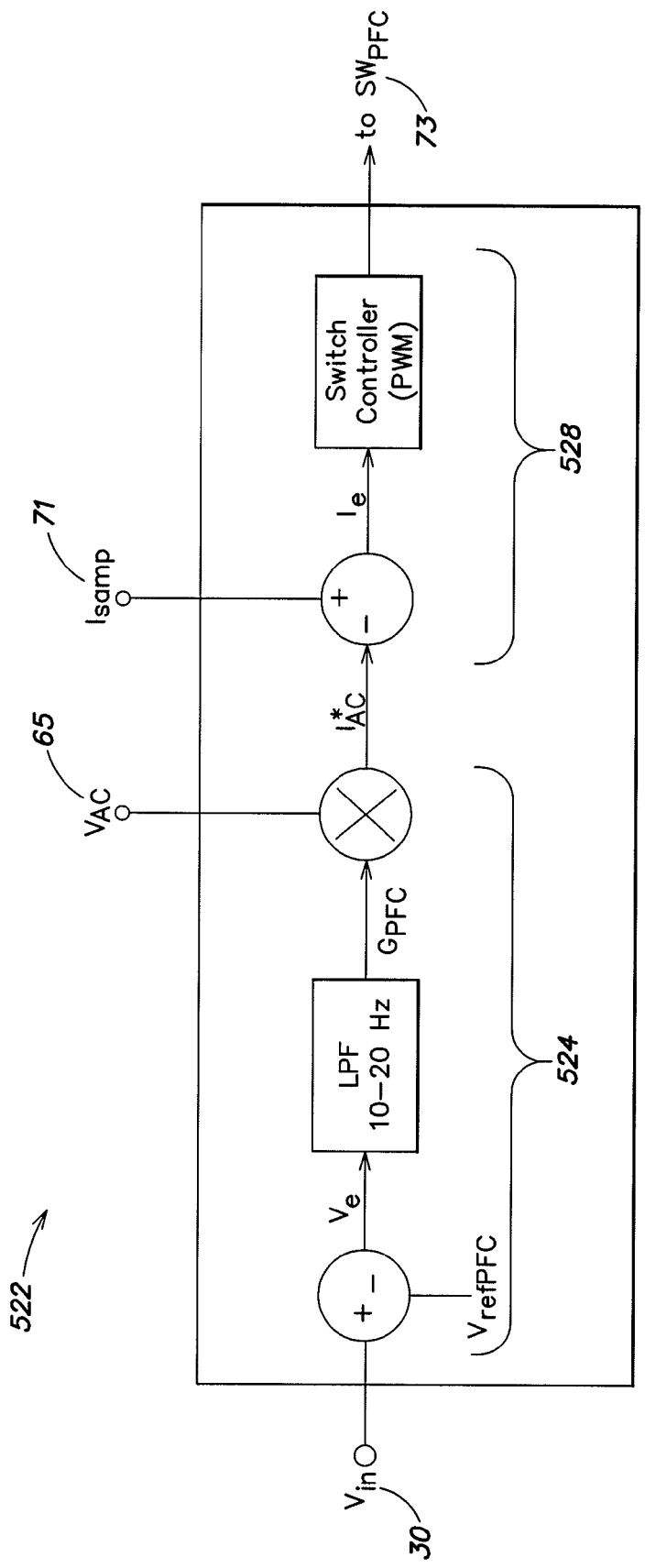
FIG. 9B is a diagram that conceptually illustrates the functionality of a power factor correction controller of the power factor correction apparatus shown in FIG. 9A.

As discussed above in connection with FIGS. 9A and 9B, DC-DC converter switching devices such as the power control apparatus 200A, 200B, and 200C generally draw current from a power source in short pulses. However, for maximum power efficiency from an AC power source, the input current ultimately drawn from the AC line voltage ideally should have a sinusoidal wave shape and be in phase with the AC line voltage. This situation commonly is referred to as "unity power factor." The switching nature of the power control apparatus and resulting pulsed current draw causes these apparatus to have less than unity power factor, and thus less than optimum power efficiency. Also, if the power control apparatus were to draw current from the AC line voltage with only intervening rectification and filtering (i.e., without power factor correction), the pulsed current drawn by the apparatus would place unusual stresses and introduce generally undesirable noise and harmonics on the AC line voltage.

In view of the foregoing, the power factor correction apparatus 520 shown in FIG. 22 is configured to address these issues and provide for a more efficient provision of power to the power control apparatus 200A-C from the AC line voltage 67. It should be appreciated, however, that in some applications the power factor correction apparatus 520 may not be required, and that the lighting apparatus 500 may be implemented without power factor correction in other embodiments. As discussed above in connection with FIG. 9B, a number of conventional integrated circuit power factor correction controllers (not specifically shown in FIG. 22) may be employed in a power factor correction apparatus in one exemplary implementation of the lighting apparatus of FIG. 22, some examples of which include, but are not limited to, the Fairchild Semiconductor ML4821 PFC controller, the Linear Technology LT1248 or LT1249 controllers, and the ST Microelectronics L6561 controller.

As also illustrated in FIG. 22, the lighting apparatus 500 may include a processor 550 to receive input information 208 including power control information for one or more of the power control apparatus 200A, 200B and 200C. The processor 550 in turn is configured to provide control signals 208A, 208B and 208C, based on the input information 208, so as to independently control the respective power control apparatus 200A, 200B, and 200C (and hence the intensity of light generated by the respective loads 100A, 100B and 100C). In various aspects, as discussed above in connection with FIGS. 18 and 19, the processor 550 may be configured as an addressable device so as to facilitate control of the lighting apparatus 500 via a network. In yet another aspect of this embodiment, the processor 550 may be configured to interpret input information 208 that is received in a DMX protocol.

In other aspects of the embodiment of FIG. 22, a given power control apparatus of the lighting apparatus 500 generally may be represented by the embodiment shown in FIG. 12, and may incorporate any of a variety of energy transfer arrangements as well as various other features discussed above in connection with FIGS. 15-20. In particular, the energy transfer arrangement of a given power control apparatus of FIG. 22 may be based on any one of a number of DC-DC converter configurations, including those with or without isolation features. As discussed above, since the power control apparatus generally represented in FIG. 12 does not include any feedback features relating to the load, in some applications DC-DC converter configurations not including isolation features may be employed in the lighting apparatus 500, even though power is ultimately being derived from an AC power source. Again, this feature in some cases facilitates a significantly streamlined realization (e.g., fewer components, higher power efficiency, smaller space requirements, etc.) of a lighting apparatus 500 according to various embodiments discussed herein.

Additionally, in yet another aspect of the lighting apparatus 500 shown in FIG. 22, one or more functions performed by the various processors or other components of the switch controllers 204 illustrated in FIGS. 15-20 may be performed by the processor 550; stated differently, the resources of the processor 550 may be shared amongst the power controllers 200A, 200B, and 200C to move some of the functionality associated with their respective switch controllers to the processor 550.

For example, in one embodiment of the lighting apparatus 500 of FIG. 22, each of the power control apparatus 200A, 200B and 200C may be similar to that shown in FIG. 18. In this embodiment, however, the switch controller 204 of each power control apparatus would not necessarily include the processor 250 shown in FIG. 18; rather, the functions performed by each of the processors 250 may be performed collectively by the processor 550. In one aspect of this embodiment, each of the control signals 208A, 208B and 208C output by the processor 550 may include two signals, namely, a first signal representing the set point voltage $V_{sp}$ (to control duty cycle) and a second signal representing the modified pulse stream 42' (to control effective switching frequency $f_{eff}$). Again, the processor 550 would be configured to process the input information 208, which may include power control information for one or more of the power control apparatus 200A, 200B and 200C, and appropriately provide a set point voltage $V_{sp}$ and modified pulse stream 42' independently to each of the power control apparatus 200A, 200B and 200C, as specified by the input information 208.

In yet another embodiment of the lighting apparatus 500 of FIG. 22, each of the power control apparatus 200A, 200B and 200C may be similar to that shown in FIG. 19. In one aspect of this embodiment, however, the functions of the switch controller 204 of each power control apparatus essentially may be completely relegated to the processor 550. In particular, the processor 550 may be configured to sample (e.g., via an internal A/D converter) the common input voltage $V_{in}$ (e.g, see the dashed connections 206 in FIG. 22), and the control signals 208A, 208B and 208C output by the processor 550 may respectively serve as the control signals 216 that control the switches 214 in each of the power control apparatus 200A, 200B and 200C. The processor 550 further may be configured to independently generate the control signals 208A, 208B and 208C so as to adjust one or both of the duty cycle and the effective switching frequency of each of the switches 214 to control power to the respective loads 100A, 100B and 100C based on the input information 208.

Figure 22A:
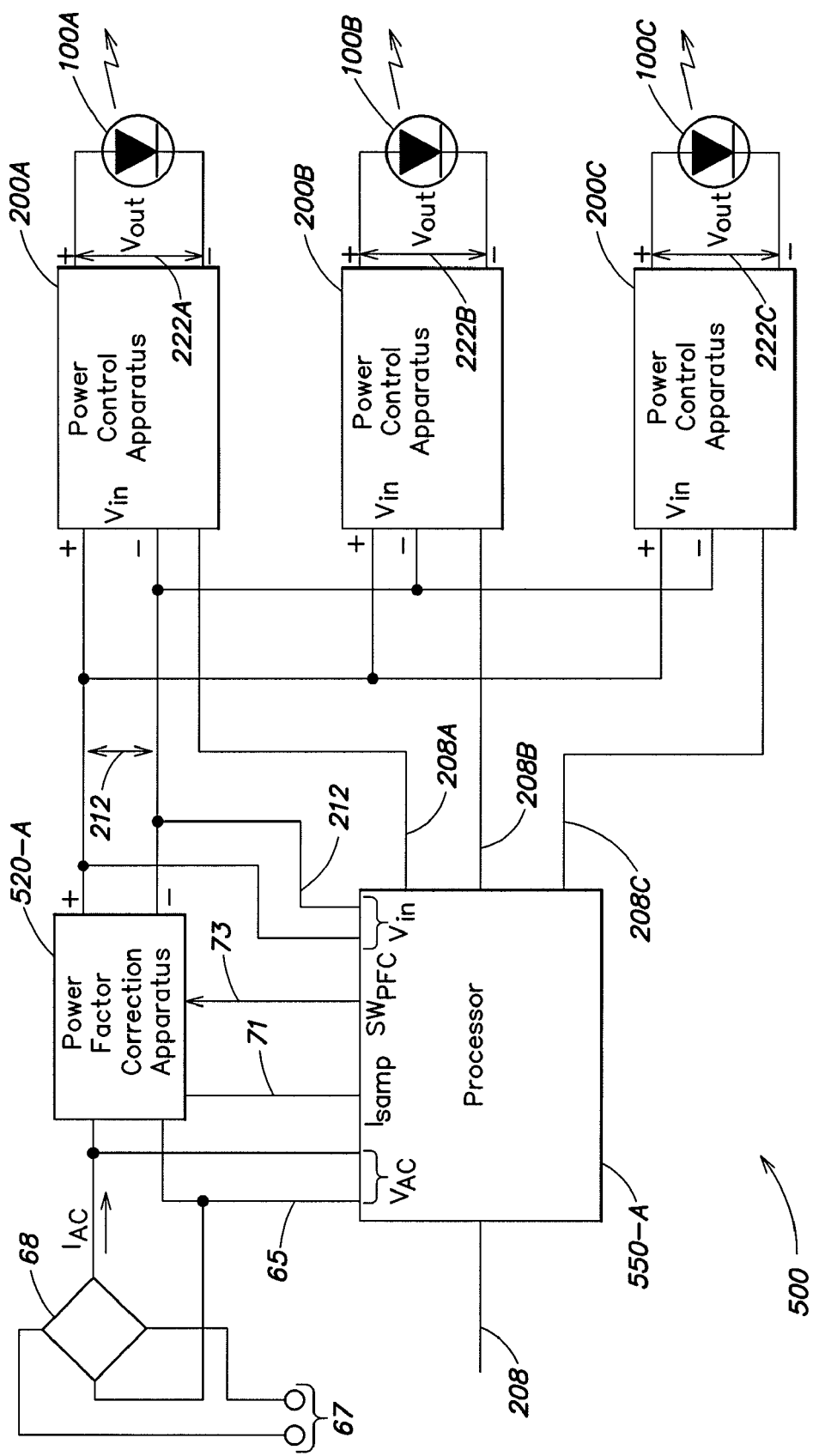
FIG. 22A is a diagram of a lighting apparatus similar to that shown in FIG. 22, with modified power factor correction control, according to one embodiment of the disclosure.

In yet another embodiment of a lighting apparatus 500, as shown in FIG. 22A, a processor 550-A may be configured to not only control the power control apparatus 200A, 200B and 200C as discussed above, but to additionally facilitate control of a power factor correction apparatus 520-A based on information known in advance relating to one or more parameters associated with the loads 100A, 100B and 100C. According to various aspects of this embodiment, by knowing in advance some particular information relating to one or more of the loads, for example the desired power to a given load (as provided by the input information 208), and/or the voltage $V_{out}$ to be applied to a given load, the processor 550-A may control the power factor correction apparatus 520-A in a "feed-forward" manner to significantly improve the operation of the power factor correction apparatus.

Recall that, as discussed above in connection with FIGS. 9A and 9B, the overall control loop response of conventional power factor correction apparatus (due primarily to the voltage feedback loop 524 shown in FIG. 9B) is relatively slow (e.g., a bandwidth of approximately 10 to 20 Hz) compared to the line frequency (e.g., 50 or 60 Hz). The relatively slow response of a conventional power factor control loop is required to facilitate higher power factor by ensuring that any changes in the generated voltage $V_{in}$ (which in turn affect adjustments to the current $I_{AC}$ drawn from the line voltage) occur over multiple cycles of the line voltage rather than abruptly during any given cycle. However, as a result of this relatively slower control loop response, conventional power factor correction apparatus are known for their potential instability and less than optimal performance in connection with line voltage or power draw transients.

In view of the foregoing, the processor 550-A in the embodiment of FIG. 22A is configured to control the power factor correction apparatus 520-A based on "feeding-forward" known information about anticipated load conditions. In this manner, the overall control loop response of the power factor correction apparatus 520-A may be significantly improved so as to reduce fluctuations in the voltage 212 ($V_{in}$) provided to the power control apparatus 200A, 200B, and 200C, particularly in situations in which one or more desired load powers traverse a wide range in a short time period (e.g., load full off to load full on, or vice versa). By mitigating fluctuations of $V_{in}$ due to significant/sudden load power demand requirements, a more stable power factor correction control may be realized. Furthermore, smaller circuit components (such as a smaller filter capacitor 35) may be employed based on more predictable expectations for signal values, thereby reducing the cost and/or size of the implemented circuits.

As shown in FIG. 22A, the processor 550-A of this embodiment receives as inputs the rectified line voltage 69 ($V_{AC}$) output by the bridge rectifier 68, as well as a signal 71 ($I_{samp}$) representing the current $I_{AC}$ drawn by the power factor correction apparatus 520-A (the derivation of the signal $I_{samp}$ is discussed further below in connection with FIGS. 22B and 22C). The processor 550-A also receives as inputs the voltage 212 ($V_{in}$) provided to the power control apparatus 200A, 200B and 200C, and the input information 208 representing the respective desired load powers. Based on these inputs, the processor 550-A is configured to generate the control signals 208A, 208B and 208C as discussed above in connection with FIG. 22, as well as a power factor control signal 73 to control the power factor correction apparatus 520-A.

Figure 22B:
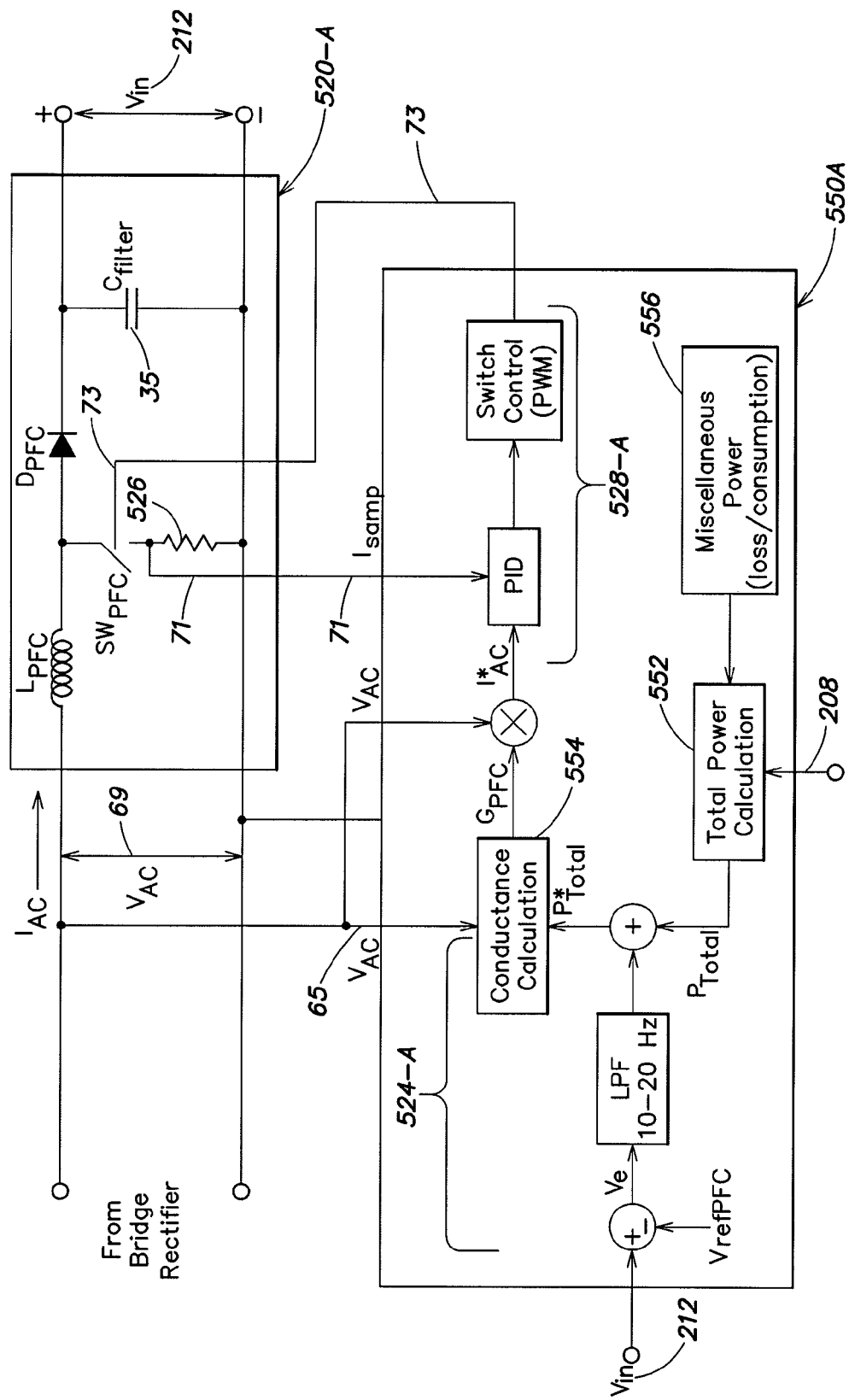
FIG. 22B is a diagram illustrating circuit generalities of a power factor correction apparatus of FIG. 22A and a conceptual functional block diagram of a portion of a processor dedicated to control of the power factor correction apparatus, according to one embodiment of the disclosure.

FIG. 22B is a diagram illustrating circuit generalities of the power factor correction apparatus 520-A, together with a conceptual functional block diagram of a portion of the processor 550-A dedicated to control of the power factor correction apparatus 520-A, according to one embodiment of the present disclosure. In general, the portion of the processor 550-A shown in FIG. 22B is configured to determine an effective conductance $G_{PFC}$ for the power factor correction apparatus 520-A based in part on "feeding-forward" into the control loop a calculated total anticipated power draw $P_{TOTAL}$ of the collective loads ultimately coupled to the voltage $V_{in}$. Recall from FIG. 9B that the general architecture of a PFC controller includes a voltage feedback loop and a current feedback loop to implement a control strategy that manipulates the instantaneous current $I_{AC}$ drawn by the power factor correction apparatus based on a derived effective conductance $G_{PFC}$ for the power factor correction apparatus. In the implementation of FIG. 22B, the voltage feedback loop 524-A is modified from that shown in FIG. 9B to include a term $P_{TOTAL}$ representing the total anticipated power drawn from the AC power source. In this manner, rather than being merely responsive to changes in the voltage $V_{in}$ as in FIG. 9B (and hence subject to the low bandwidth of the low pass filter LPF), the voltage feedback loop 524-A of FIG. 22B functions more "proactively" to generate an effective conductance $G_{PFC}$, based on the fed-forward term $P_{TOTAL}$.

More specifically, the processor 550-A of FIG. 22B is configured to perform a total power calculation 552 based in part on the input information 208, which includes information relating to the desired load power for each of the loads 100A, 100B and 100C at any given time. Accordingly, in one aspect of this embodiment, as part of the total power calculation the processor 550-A adds together the respective desired load powers represented in the input information 208. In another aspect, the processor additionally considers any power consumption and/or losses 556 in the respective power control apparatus themselves (indicated as "Miscellaneous Power" in FIG. 22B); for example, each of the power control apparatus may include one or more IC power supplies to provide various bias voltages for the circuitry in each apparatus. Moreover, each power control apparatus generally has an associated efficiency loss. This power consumption and/or loss 556 may be calculated and/or estimated in advance based on the particular circuitry employed in the power control apparatus, and stored in memory for use by the processor in the total power calculation to provide the term $P_{TOTAL}$.

As shown in FIG. 22B, the processor 550-A then adds to the term $P_{TOTAL}$ another term corresponding to the output of the low pass filter that conditions the error signal $V_e$ in the voltage feedback loop 524-A. In this manner, the conditioned error signal serves as an adjustment or correction to the fed-forward total power term $P_{TOTAL}$ to provide an adjusted term $P^*_{TOTAL}$ for use in a conductance calculation 554. Assuming that the term $P^*_{TOTAL}$ substantially represents the anticipated actual power to be drawn from the AC power source, and that the operation of the power factor correction apparatus is to make the apparent power drawn essentially equal to the actual power drawn, the processor may be configured to perform the conductance calculation 554 according to the following relations:

$$P^*_{TOTAL} = (V_{AC,rms})(I_{AC,rms});$$

$$V_{AC,rms} = (V_{AC,peak})(0.707);$$

$$I_{AC,rms} = G_{PFC}(V_{AC,rms}) = G_{PFC}(V_{AC,peak})(0.707);$$

$$P^*_{TOTAL} = G_{PFC}[(V_{AC,peak})(0.707)]^2;$$

$$G_{PFC} = \frac{P^*_{TOTAL}}{[(V_{AC,peak})(0.707)]^2}.$$

Accordingly, to determine the effective conductance $G_{PFC}$, the processor 550-A may be configured to sample the rectified line voltage $V_{AC}$ to thereby determine its peak, and then implement the above calculation based on the term $P^*_{TOTAL}$.

Having thus derived the effective conductance $G_{PFC}$, the processor 550-A shown in FIG. 22B is then configured to implement a current feedback loop 528-A in a manner similar to the discussed above in connection with FIG. 9B. In particular, the processor 550-A is configured to multiply the effective conductance $G_{PFC}$ by the monitored rectified line voltage $V_{AC}$ to generate a reference current signal $I^*_{AC}$ representing the desired current to be drawn from the line voltage. This signal $I^*_{AC}$ thus provides a reference or "set-point" input to the current control loop 528-A, wherein $I^*_{AC}$ is compared to the signal 71 ($I_{samp}$) (e.g., in a proportional-integral-derivative (PID) controller). The result of such a comparison provides a current error signal $I_e$ that controls a pulse width modulated (PWM) switch controller (e.g., similar to that discussed above in connection with FIG. 7). The PWM switch controller in turn outputs the control signal 73 to control the switch $SW_{PFC}$ so as to manipulate the actual current $I_{AC}$ being drawn.

Figures 1, 22C:
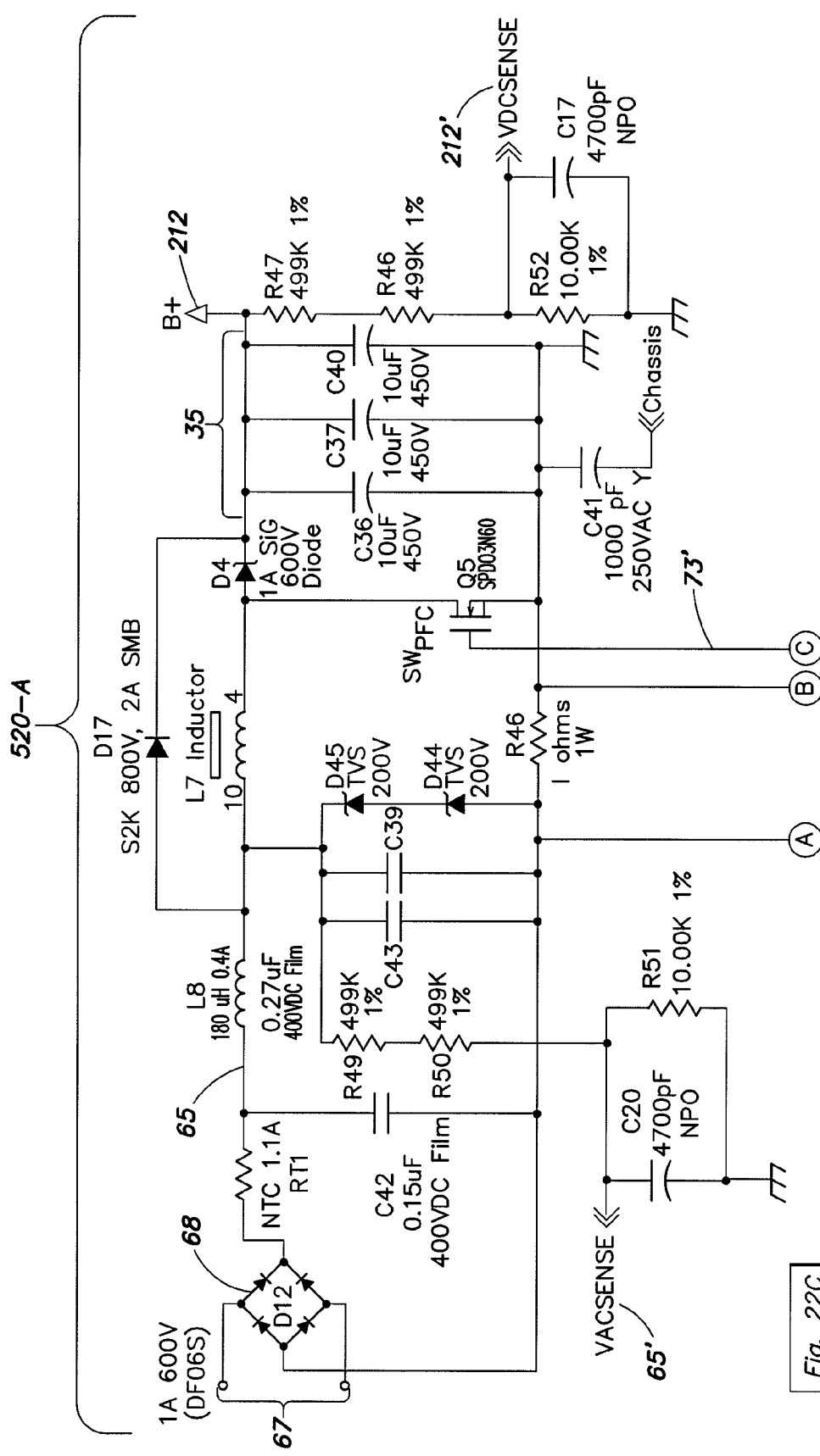
FIG. 22C is a diagram illustrating further circuit details of the power factor correction apparatus shown in FIGS. 22A and 22B, according to one embodiment of the present disclosure.
Figures 2, 22C:
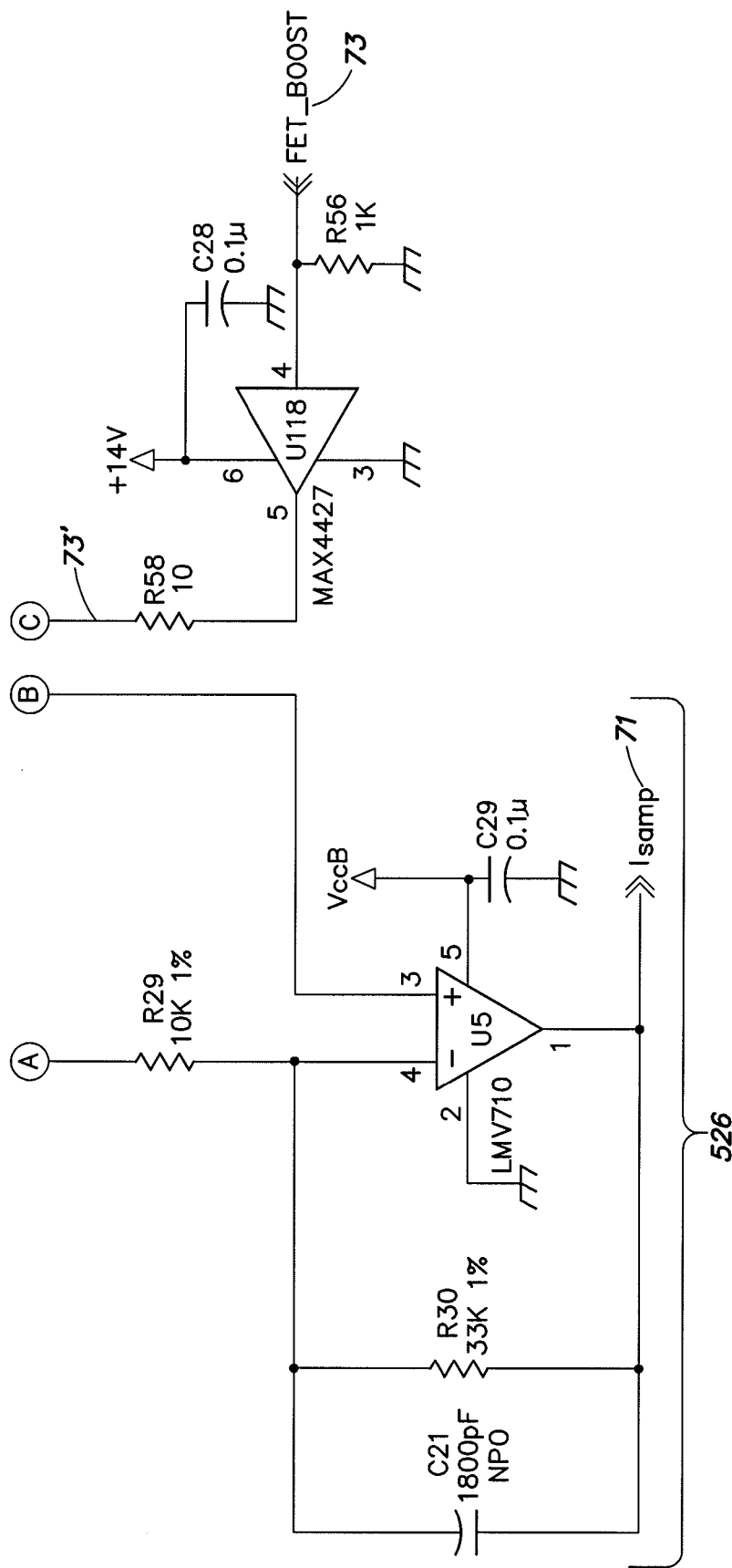

FIG. 22C is a diagram illustrating further circuit details of a power factor correction apparatus 520-A, according to one embodiment of the present disclosure. In the circuit of FIG. 22C, a signal 65' (VACSENSE) is derived from the rectified line voltage 65 via a resistor divider network formed by R49, R50 and R51, and is applied to the processor 550-A as a signal representing the monitored rectified line voltage $V_{AC}$. The signal 71 ($I_{samp}$) representing the actual current drawn by the apparatus 520-A is derived via current sensing elements 526 comprising the circuit components R48, R29, R30, C21 and U5. The control signal 73 output by the processor 550-A to control the switch $SW_{PFC}$ is applied first to a buffer amplifier U11B and then to the switch $SW_{PFC}$ as the signal 73'. The filter capacitance 35 is provided in the circuit of FIG. 22C by three capacitors C36, C37 and C40 connected in parallel. A signal 212' (VDCSENSE) is derived from the DC voltage 212 ($V_{in}$) via a resistor divider network formed by R47, R46 and R52, and is applied to the processor 550-A as a signal representing the voltage 212 ($V_{in}$).

As discussed above, by virtue of the fed-forward term $P_{TOTAL}$ representing the total anticipated power draw, the overall control loop response of the power factor correction apparatus 520-A and the processor 550-A is significantly improved so as to reduce fluctuations in the voltage 212 ($V_{in}$) provided to the power control apparatus 200A, 200B, and 200C, particularly in situations in which one or more desired load powers traverse a wide range in a short time period (e.g., load full off to load full on, or vice versa). By mitigating fluctuations of $V_{in}$ due to significant/sudden load power demand requirements, a more stable power factor correction control may be realized. Additionally, smaller circuit components (such as a smaller filter capacitor 35) may be employed based on more predictable expectations for signal values, thereby reducing the cost and/or size of the implemented circuits.

While the "feed-forward" power factor correction technique discussed above in connection with FIGS. 22A, 22B and 22C is described in connection with a lighting apparatus 500 including multiple loads 100A, 100B and 100C, it should be appreciated that this power factor correction technique is not limited in this respect. Rather, the concepts discussed above in connection with FIGS. 22A, 22B and 22C may be more generally applied for power factor correction of any number and/or types of loads, wherein some information relating to the anticipated power drawn by the load(s) is used to facilitate the power factor correction function.

Figure 23:
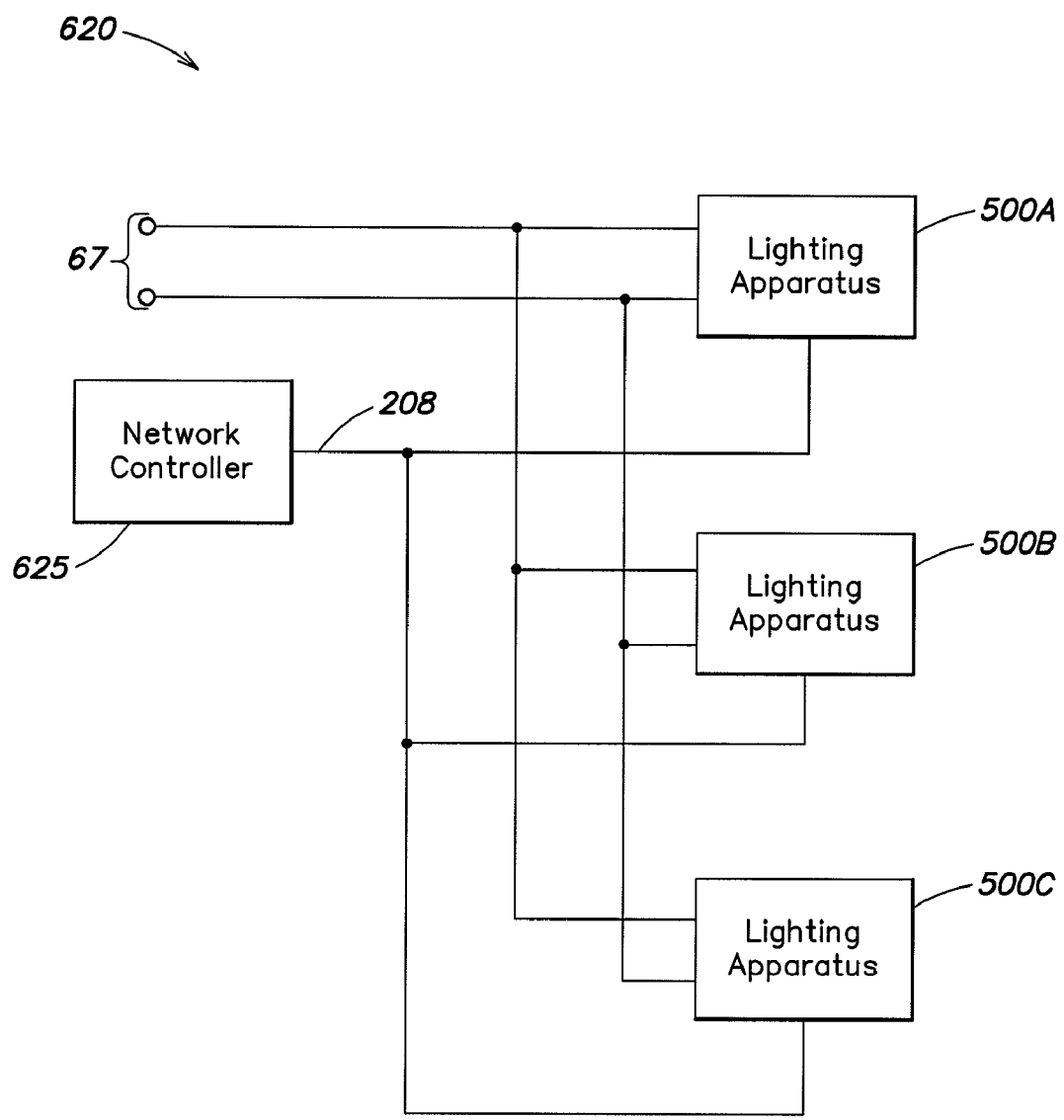
FIG. 23 is a block diagram illustrating a lighting network based on multiple lighting apparatus similar to that shown in FIG. 22, according to one embodiment of the disclosure.

FIG. 23 is a block diagram illustrating yet another embodiment of the present disclosure, based on the lighting apparatus 500 of FIG. 22 or 22A. In the embodiment of FIG. 23, multiple lighting apparatus 500A, 500B and 500C, similar to that shown in FIG. 22 or 22A, may be coupled together to form a lighting network 620. As shown in FIG. 23, in one implementation of such a network, each lighting apparatus receives operating power from an AC line voltage 67 and accordingly includes a bridge rectifier and may optionally include a power factor correction apparatus, as discussed above in connection with FIG. 22 or 22A, 22B and 22C. Additionally, multiple lighting apparatus forming the network 620 may be configured to receive commonly distributed input information 208 that may be provided, for example, from one or more network controllers 625.

In one aspect of this embodiment, multiple lighting apparatus forming the network 620 shown in FIG. 23 may have respective unique identifiers (e.g., addresses) such that a given lighting apparatus may be configured to be responsive to particular portions of the input information 208 (e.g., power control commands) that pertain to it. In another aspect of this embodiment, the configuration of the multiple lighting apparatus to each receive operating power in the form of an AC line voltage 67 facilitates lighting network implementations that may include significant numbers of lighting apparatus distributed over substantial distances, while nonetheless ensuring an appreciably efficient use of power across the lighting network 620. Again, it should be appreciated that while FIG. 23 illustrates three lighting apparatus 500A, 500B and 500C, the network 620 is not limited in this respect, as different numbers of lighting apparatus may be coupled together to form the network 620.

Figure 23A:
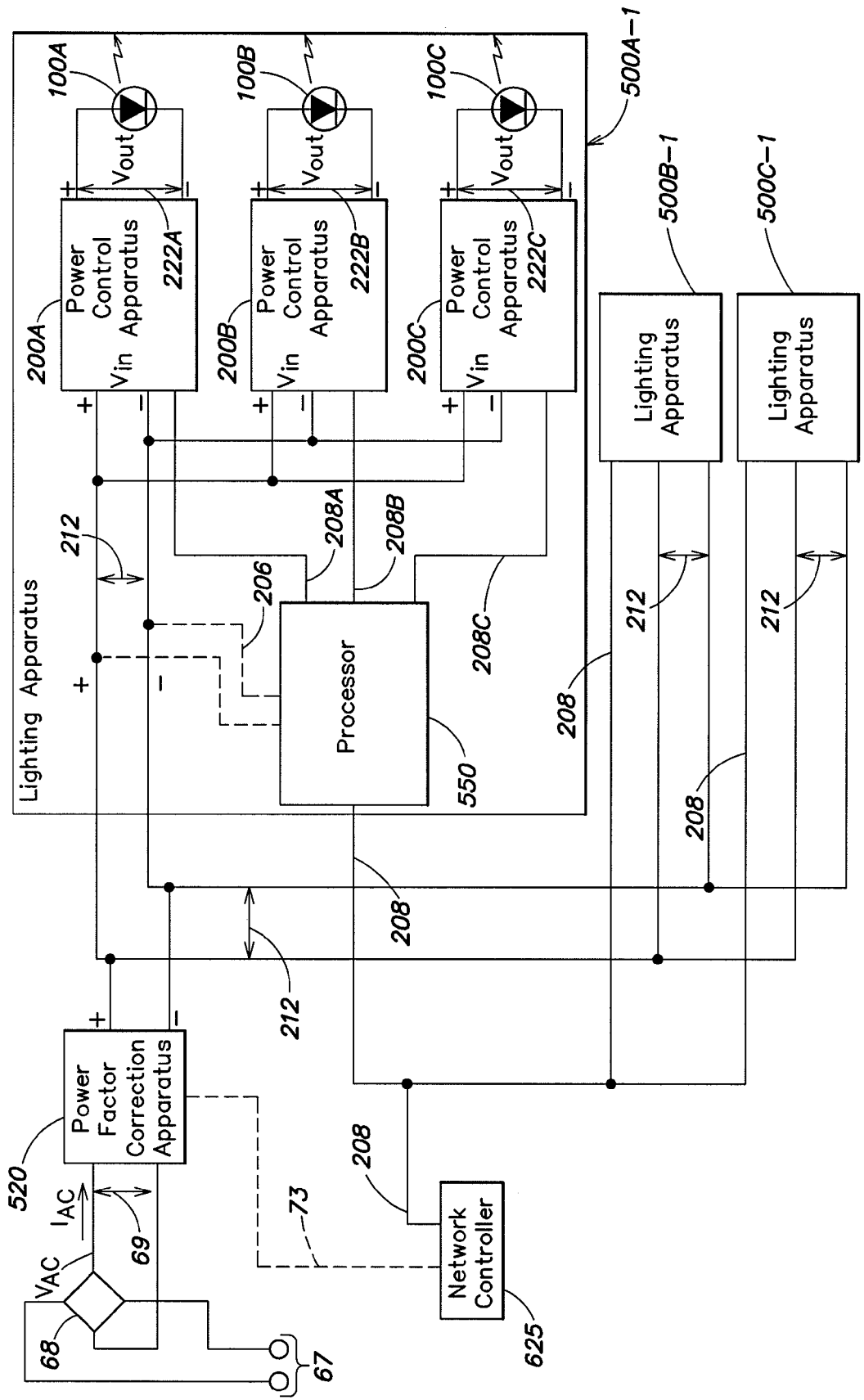
FIG. 23A is a block diagram illustrating an alternative lighting network based on multiple lighting apparatus similar to that shown in FIG. 22, according to one embodiment of the disclosure.

In yet another network implementation based on the general network architecture discussed above in connection with FIG. 23, multiple lighting apparatus coupled to form a network may include neither a bridge rectifier nor a power factor correction apparatus; instead, a common bridge rectifier and optional power factor correction apparatus may be "shared" amongst multiple lighting apparatus of the network. FIG. 23A illustrates such a network implementation, in which a common DC input voltage 212 provided by either a shared bridge rectifier 68 or power factor correction apparatus 520 serves as the power distribution medium and is thus shared amongst multiple lighting apparatus 500A-1, 500B-1 and 500C-1 of the network. Again, each of the lighting apparatus 500A-1, 500B-1 and 500C-1 differs from the lighting apparatus 500 shown in FIG. 22 in that a bridge rectifier and optional power factor correction apparatus is not required in each lighting apparatus (an example of this is shown explicitly in FIG. 23A by the lighting apparatus 500A-1). As discussed above in connection with FIG. 21, by distributing a DC source of power throughout the network via a relatively high DC voltage, resistive power losses that may otherwise be significant for network implementations involving substantial cable lengths may be reduced, thereby increasing power efficiency.

In another network implementation based on the general configuration shown in FIG. 23A, a modified power factor correction apparatus according to the present disclosure, similar to that discussed above in connection with FIGS. 22A, 22B and 22C, may be employed. In such an implementation, the network controller 625 may be configured to provide a control signal 73 to the power factor correction apparatus based on information known in advance relating to the anticipated power to be drawn by all of the loads on the network at any given time, which can be derived from the input information 208. While not explicitly shown in FIG. 23A, the network controller in this configuration may also be configured to monitor the rectified line voltage 65 ($V_{AC}$), the distributed voltage 212, and some parameter relating to the current $I_{AC}$ drawn from the line voltage to provide the control signal 73 to the power factor correction apparatus, in a manner similar to that discussed above in connection with FIGS. 22A, 22B and 22C.

Figure 24A:
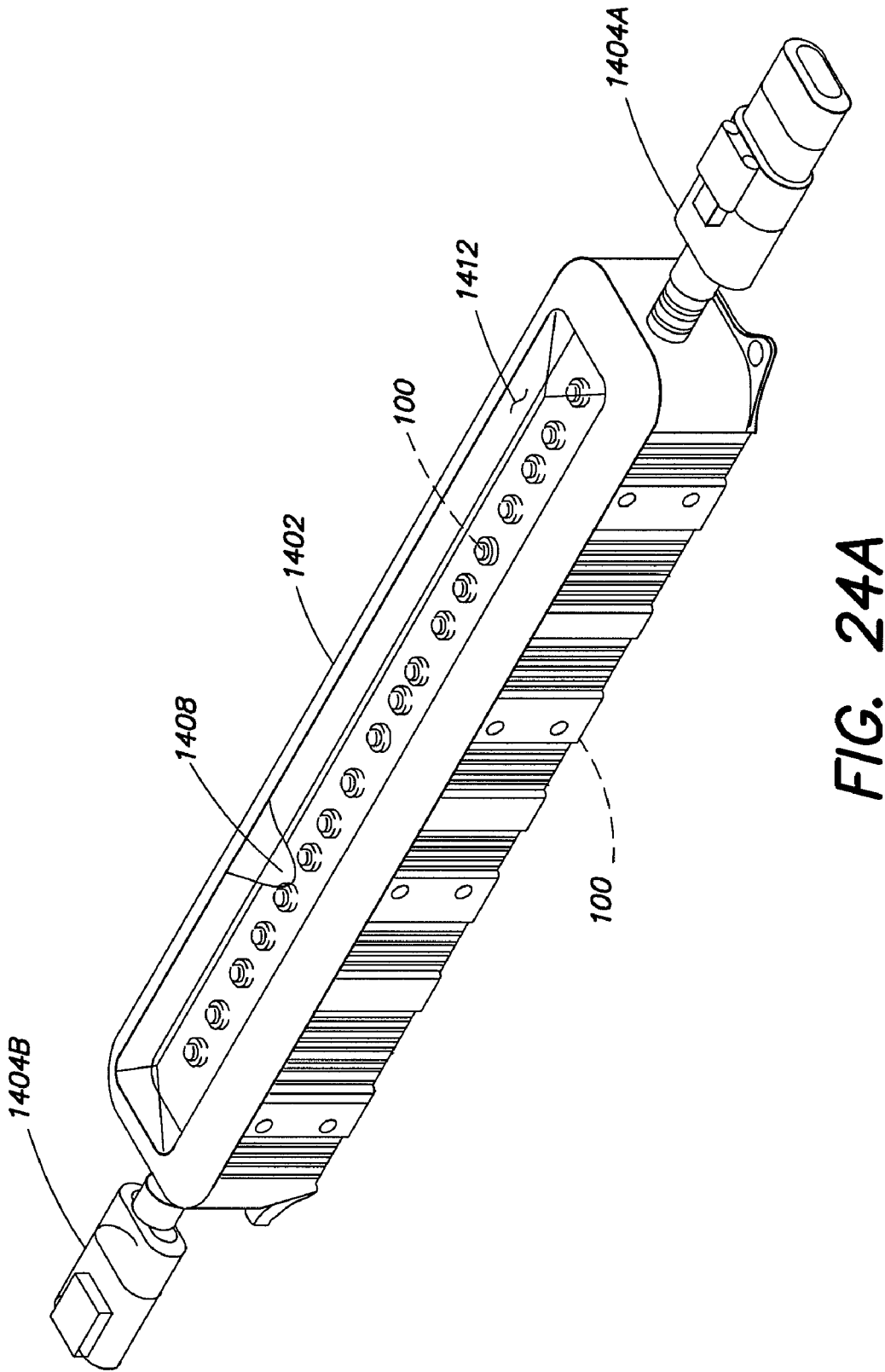

FIGS. 24A and 24B are diagrams illustrating various views of housing configurations for the lighting apparatus 500 of FIG. 22 or 22A, according to one embodiment of the present disclosure. In particular, FIGS. 24A and 24B illustrate an essentially linear housing 1402 for the lighting apparatus 500, in which may be disposed the bridge rectifier 68, the optional power factor correction apparatus 520, the processor 550, one or more power control apparatus 200 and associated LED-based load(s) 100. In one aspect, the top of the housing 1402 may include a slot 1408 into which the LEDs of the load(s) 100 are disposed. In another aspect, the housing 1402 also may include a lens 1412 for protecting the LEDs 100 and/or shaping (e.g., diffusing) light generated by the LEDs.

As also shown in FIGS. 24A and 24B, the housing 1402 may include one or more connectors 1404A and 1404B through which the AC line voltage 67 and input information 208 are provided to the apparatus 500. In one aspect, the connectors 1404A and 1404B may be configured in a complimentary (e.g., male/female) arrangement, such that a connector 1404A of a first lighting apparatus may be electrically and mechanically coupled to a complimentary connector 1404B of a second lighting apparatus, so as to facilitate electrical and mechanical coupling of multiple lighting apparatus (e.g., as discussed above in connection with FIG. 23). In yet another aspect, the housing 1402 may include a cover 1414 (see FIG. 24B) for covering one or more of the connectors 1404A, 1404B if the connector is not in use.

As illustrated in FIG. 24A, in one exemplary implementation, one or more connectors 1404A, 1404B of the housing 1402 may be configured so as to extend outwardly from the housing 1402. Alternatively, in another possible implementation illustrated in FIG. 24B, the housing 1402 may be configured such that one or more connectors 1404A, 1404B do not extend substantially beyond a perimeter edge of the housing, thereby facilitating multiple lighting apparatus 500 to be abutted against each other in a contiguous fashion. FIG. 24B also illustrates exemplary dimensions for a linear housing 1402 for a lighting apparatus 500 according to one embodiment.

While several embodiments discussed above generally relate to "feed-forward" power control apparatus, according to other embodiments various power control apparatus may be implemented which incorporate some type of feedback relating to the load, while nonetheless providing streamlined and power efficient circuit solutions.

Figure 25:
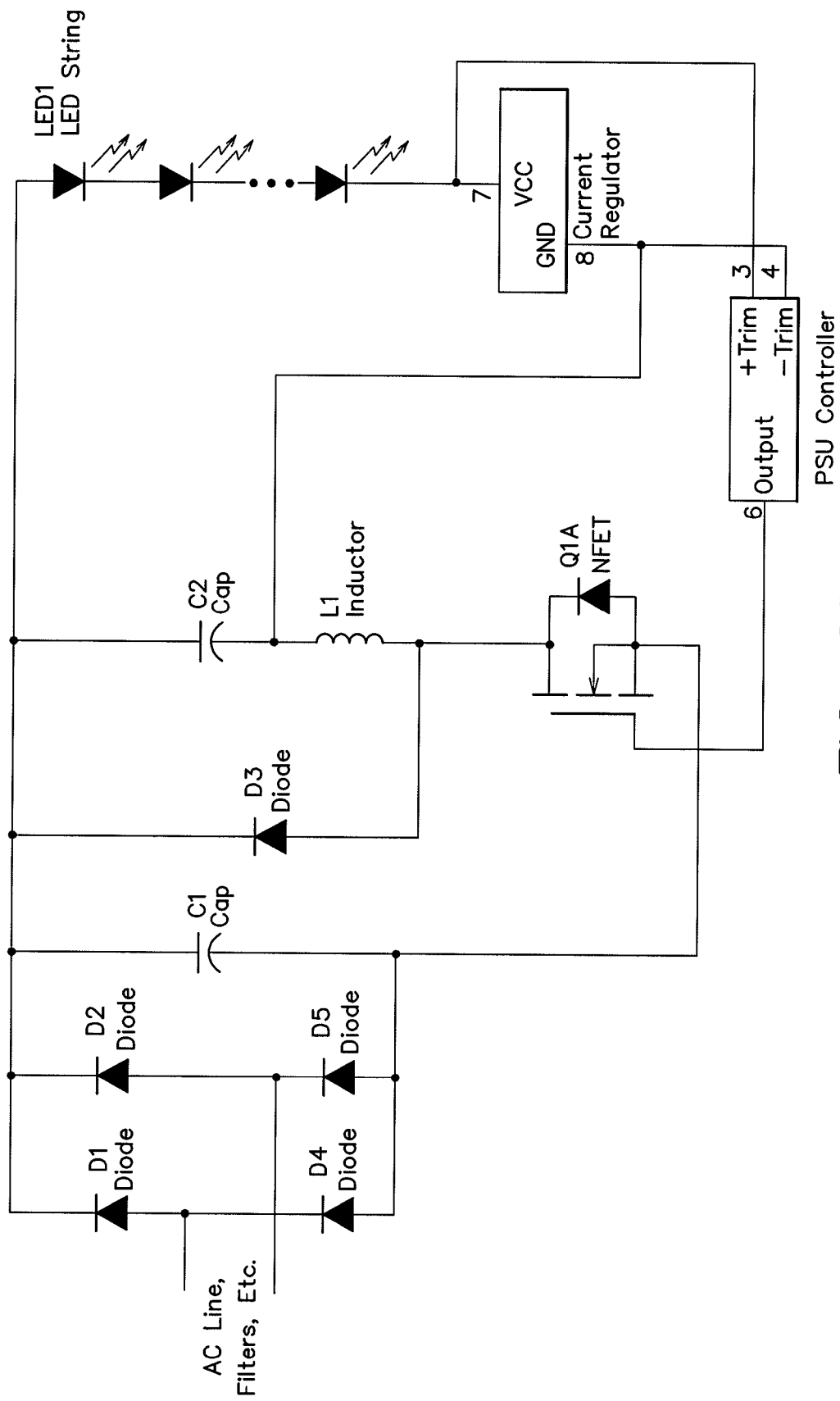
FIGS. 25-34 are circuit diagrams illustrating a variety of power control apparatus configurations according to other embodiments of the disclosure.
Figure 26:
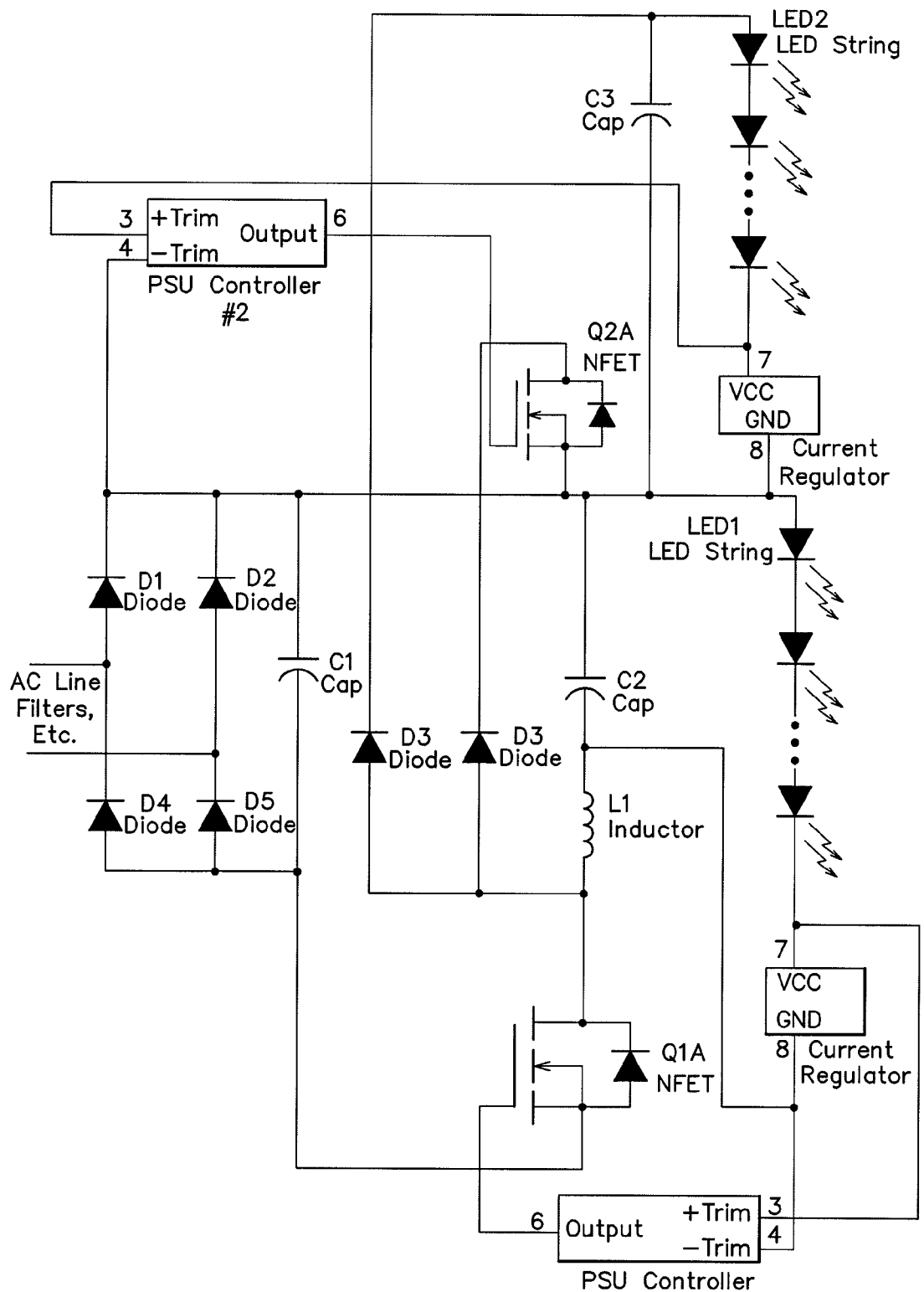

For example, FIG. 25 illustrates a circuit in which a switch controller obtains voltage feedback from an LED-based load via a current regulator. In the embodiment of FIG. 26, two different LED-based loads are driven via a single inductor, wherein one of the loads is driven at a higher current than the other load. In this embodiment, again voltage feedback is provided from each LED-based load via current regulators. In FIG. 26, the inductor L1 charges capacitor C2 during transistor Q1A's on time, and the energy stored in L1 is split between C2 and C3 during the off time. Transistor Q2A may be further enabled to reduce current in load LED2.

Figure 27:
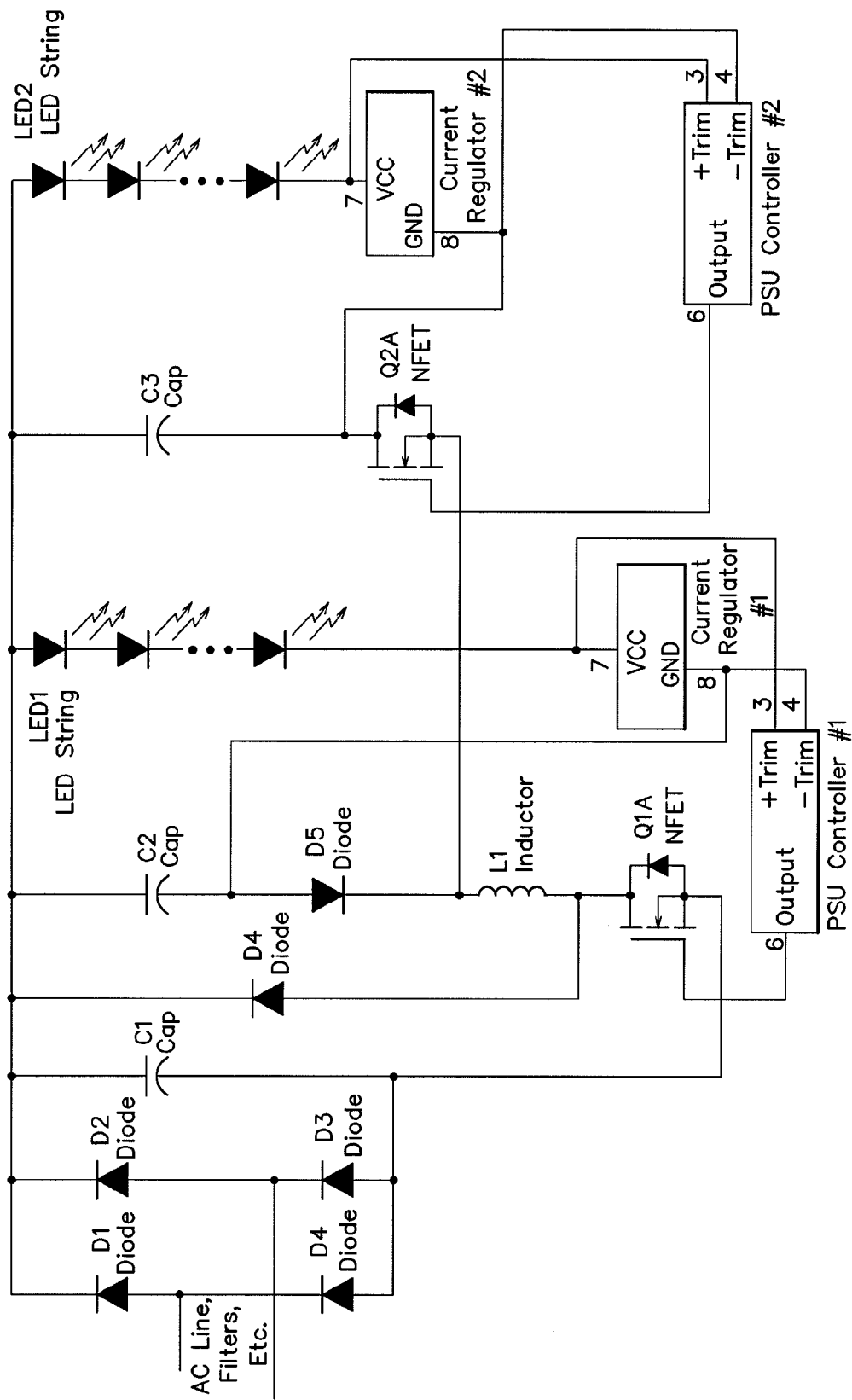

In the embodiment of FIG. 27, again two different LED-based loads are driven via a single inductor, wherein one of the loads is driven at a higher voltage than the other load. Like FIGS. 25 and 26, voltage feedback is provided from each load via current regulators. In FIG. 27, controller #2 enables switch Q2A to divert power flow from LED string 1 and LED string 2. The controllers may alternate enabling string 1 and string 2 to achieve consistent power flow between strings in any desired ratio.

Figure 28A:
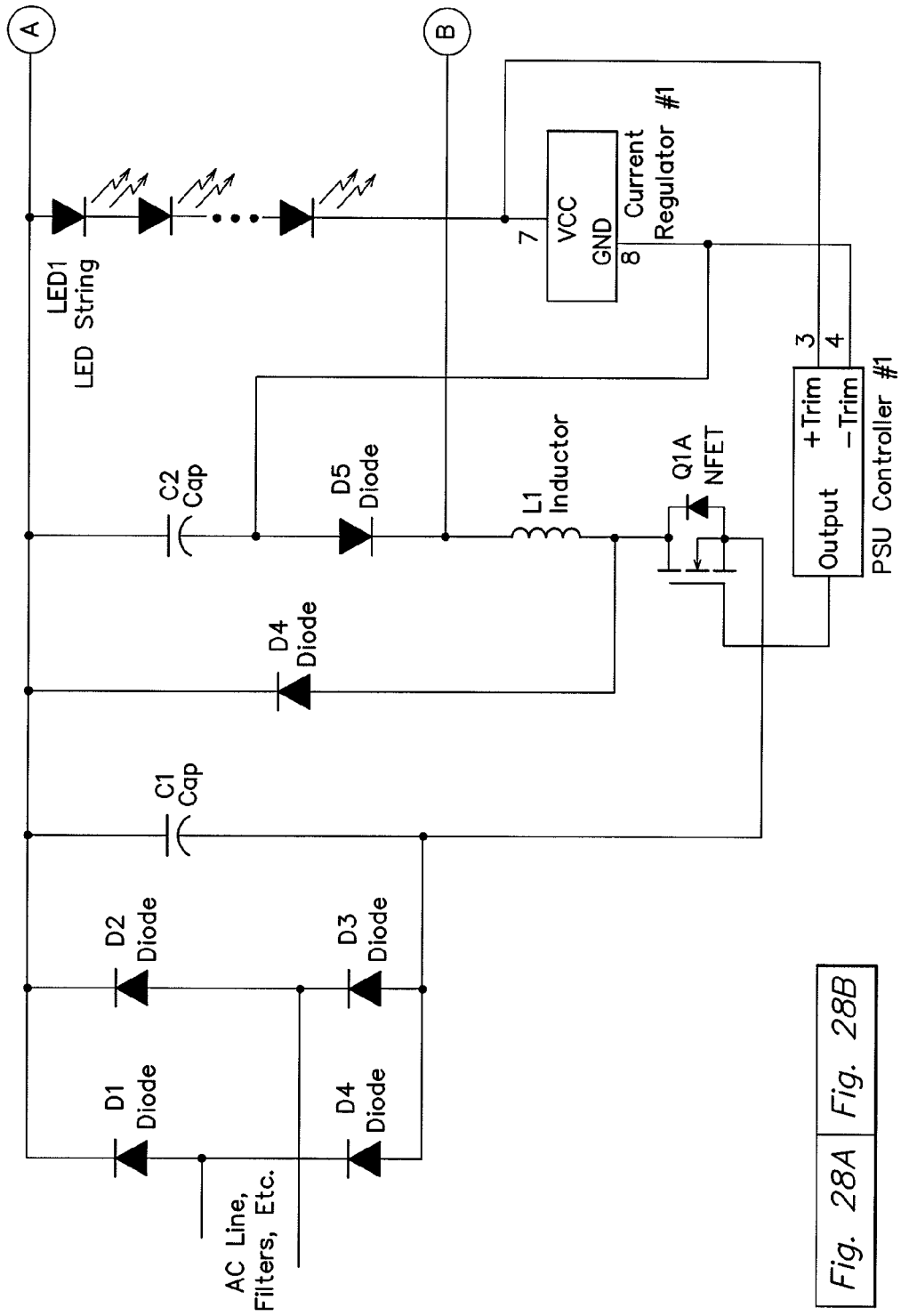
Figure 28B:
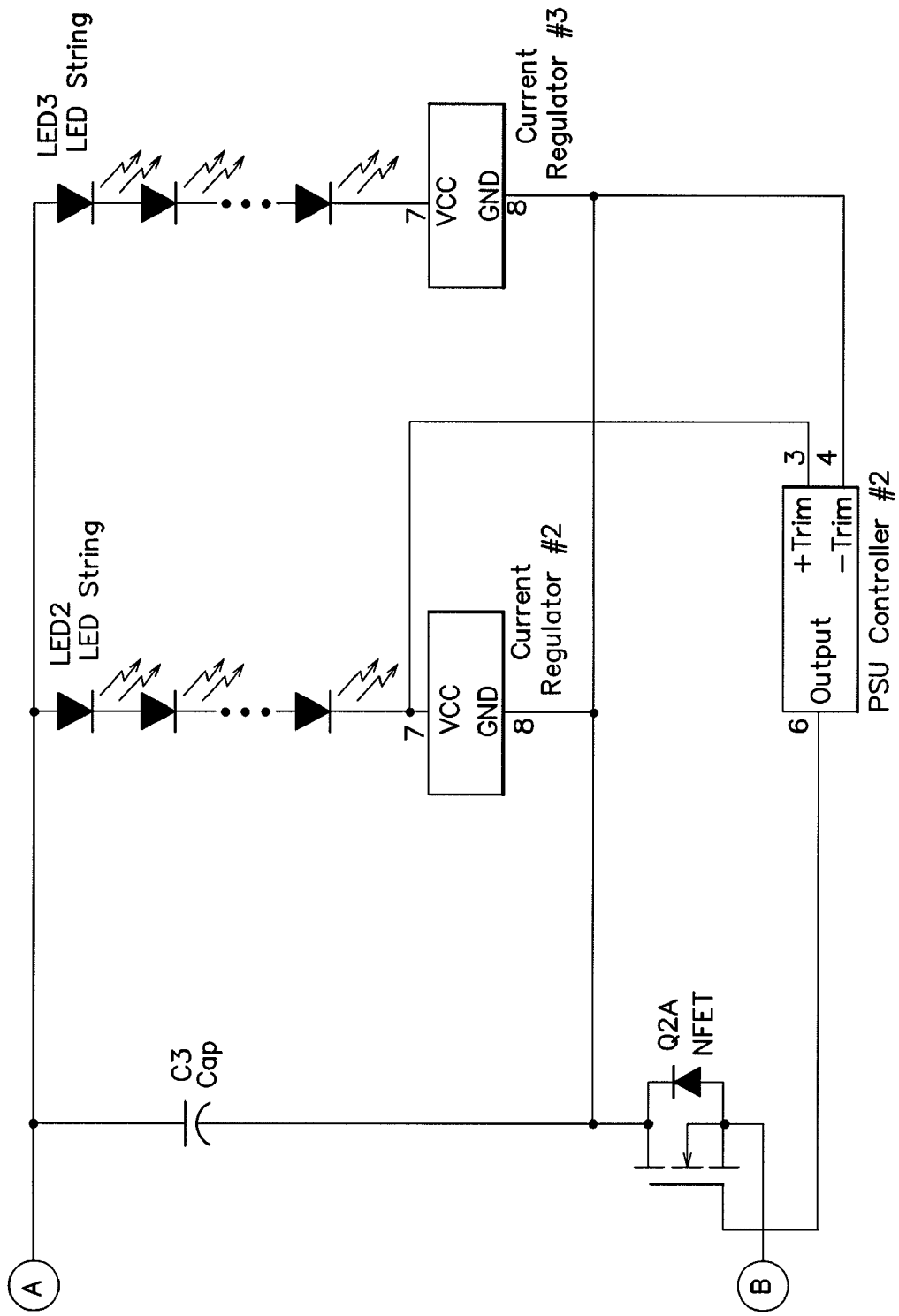
Figures 29A, 29B:
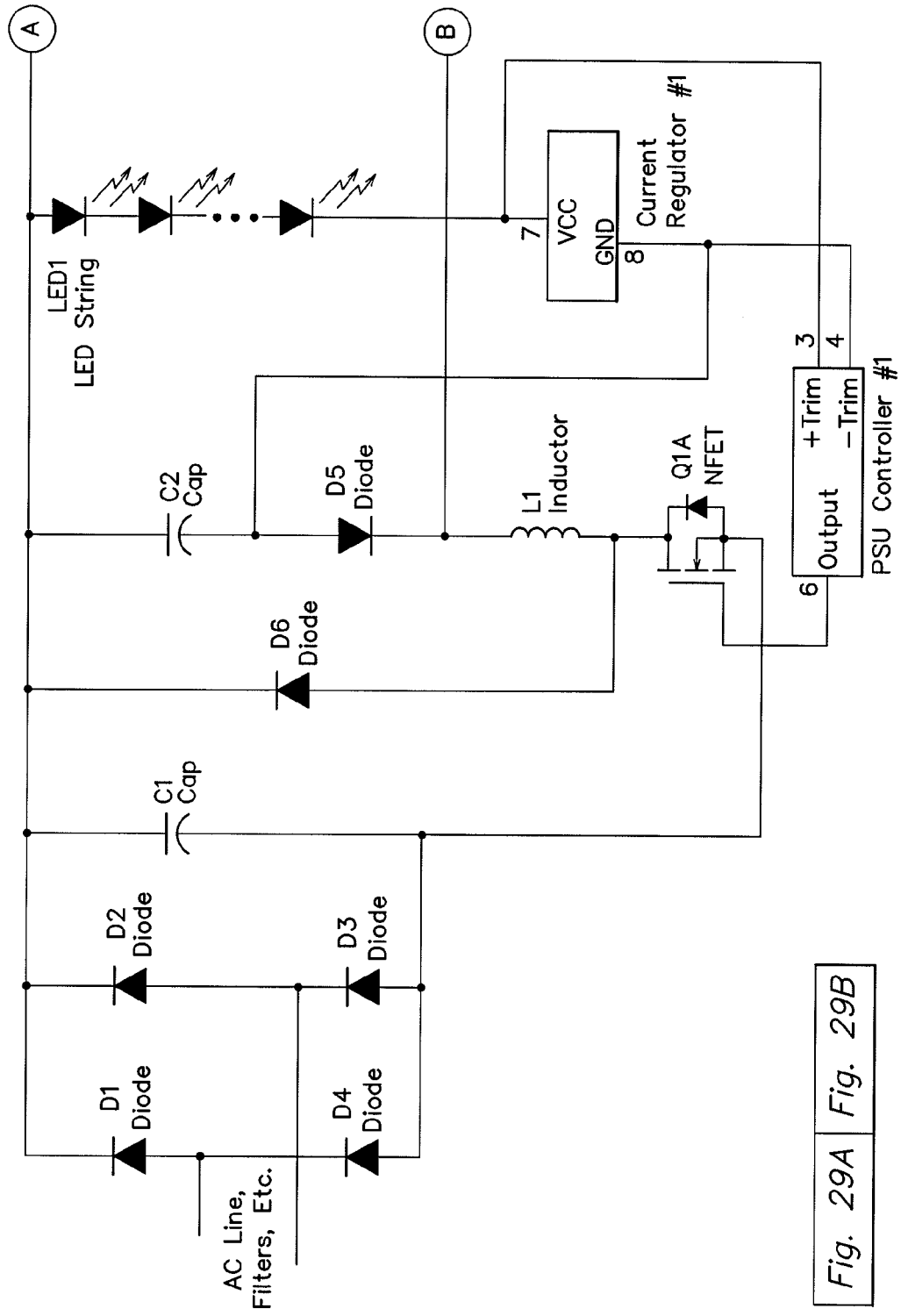
Figure 29B:
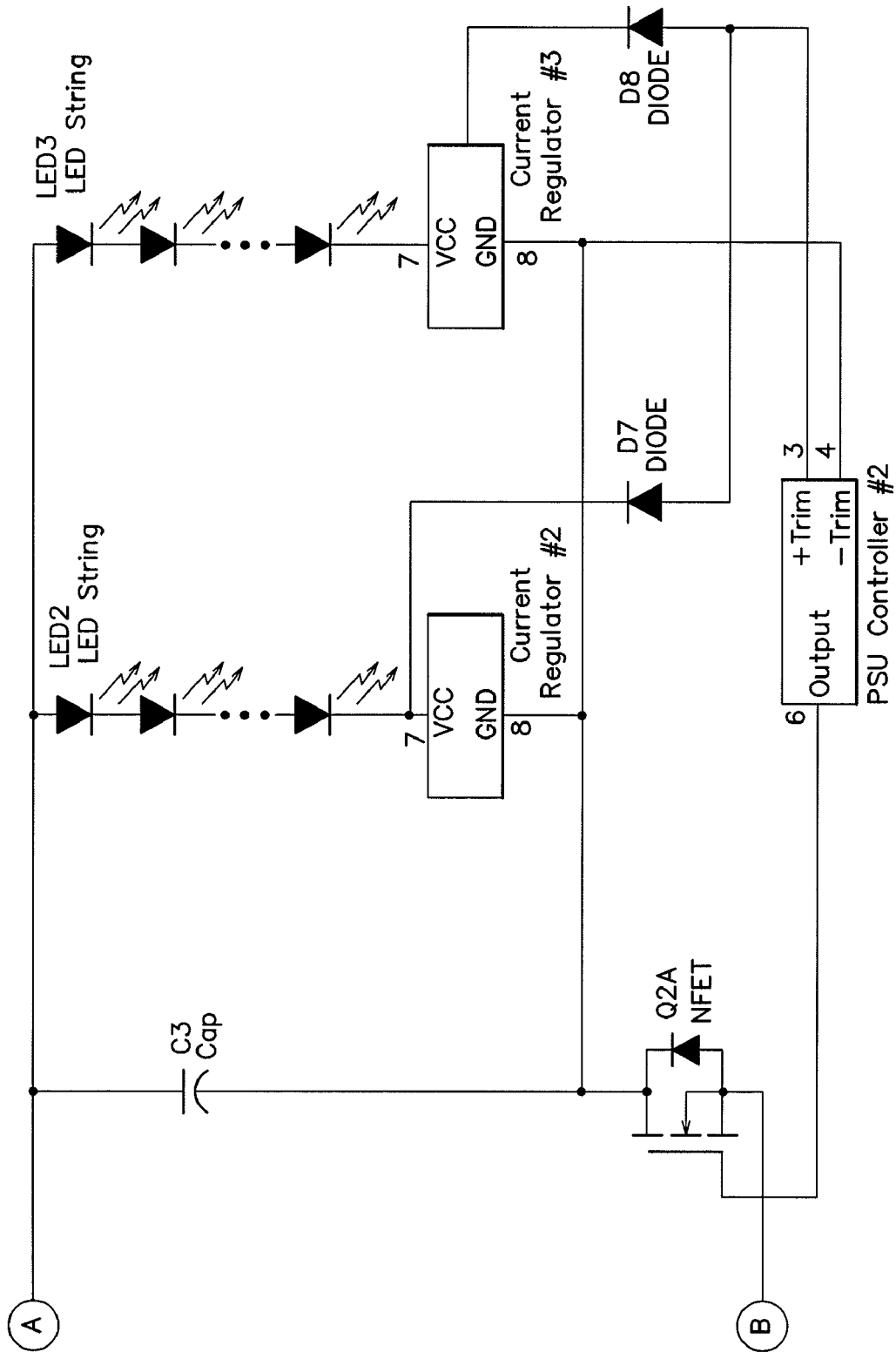

In the embodiment of FIG. 28, three LED-based loads are driven with a single inductor based on current regulator voltage feedback, wherein the load LED1 is driven at a higher voltage than the loads LED2 and LED3, which run at similar voltages. In the embodiment of FIG. 29, again three LED-based loads are driven with a single inductor based on current regulator voltage feedback in an arrangement similar to that shown in FIG. 28; however, in FIG. 29, circuitry is included to regulate the minimum voltage of loads LED2 or LED3 without knowing in advance which is smaller.

Figure 30A:
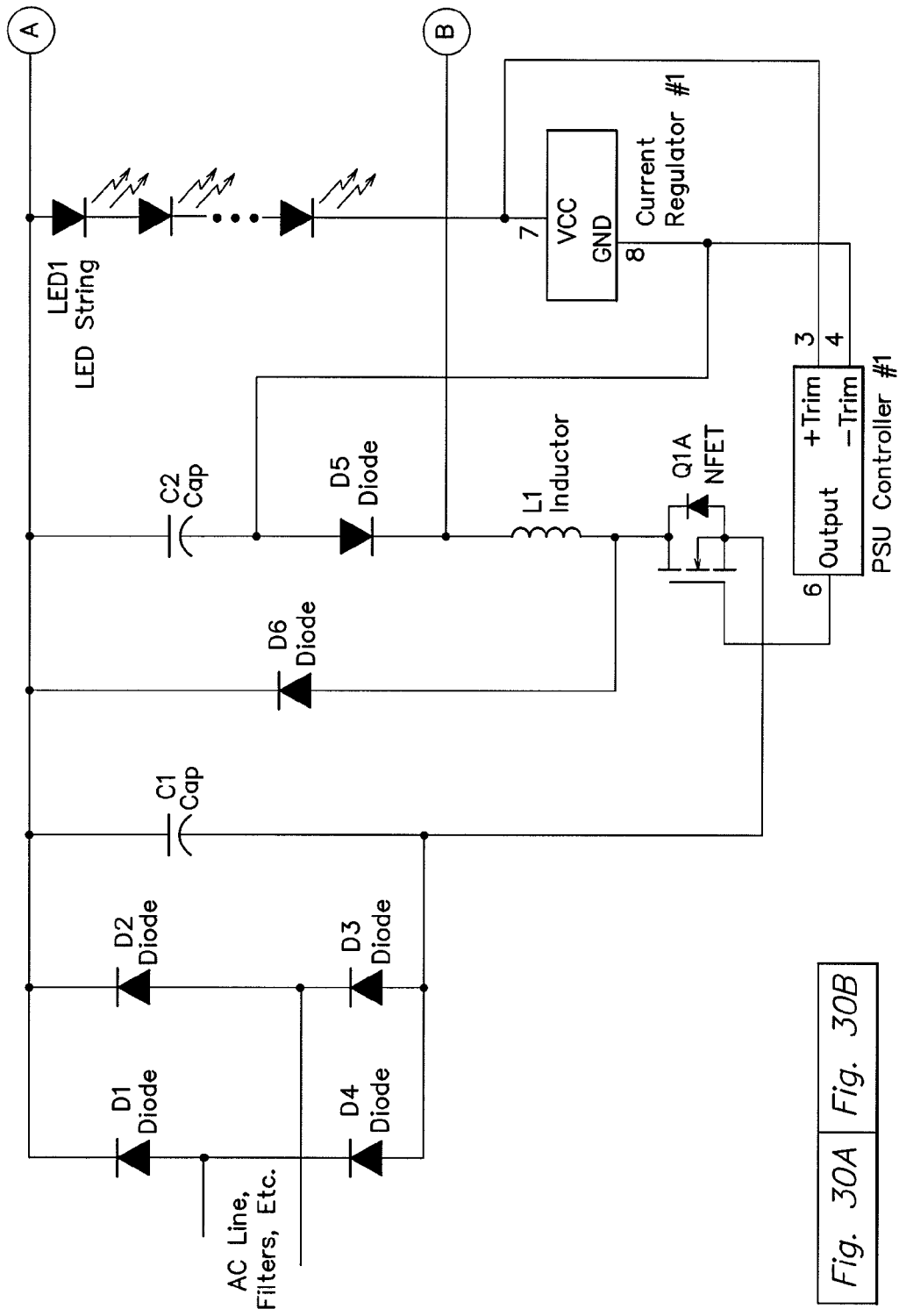
Figure 30B:
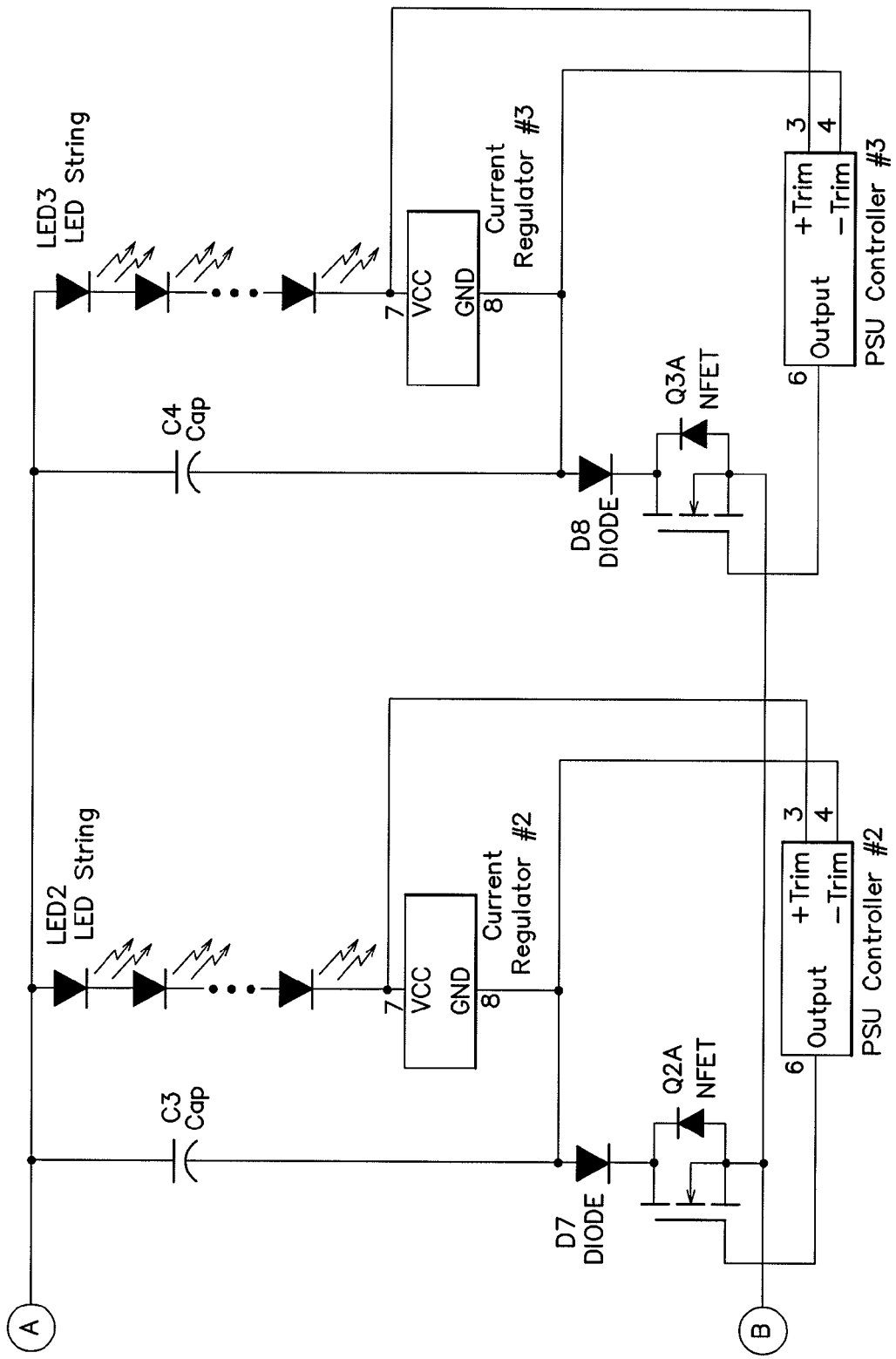
Figure 31A:
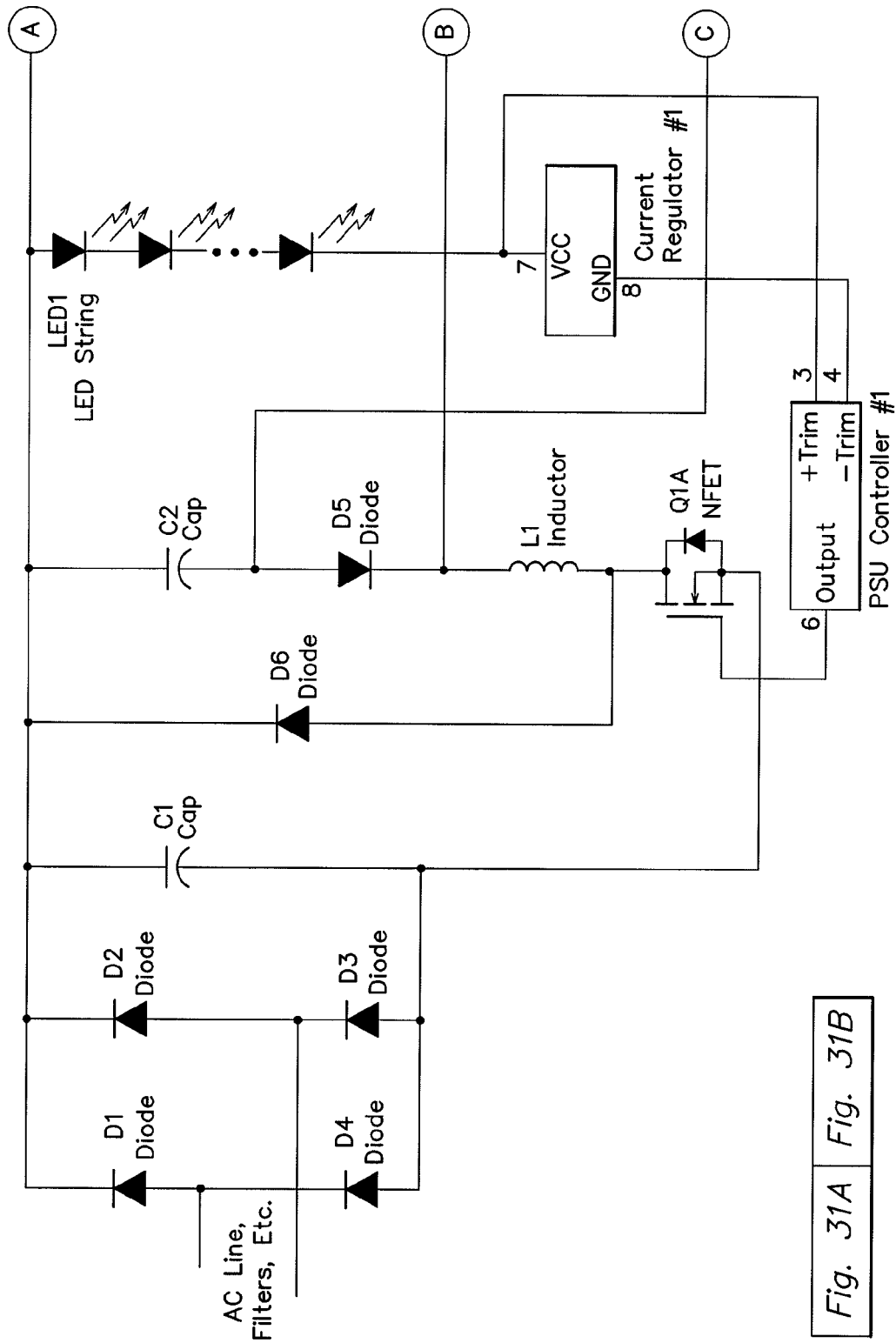
Figure 31B:
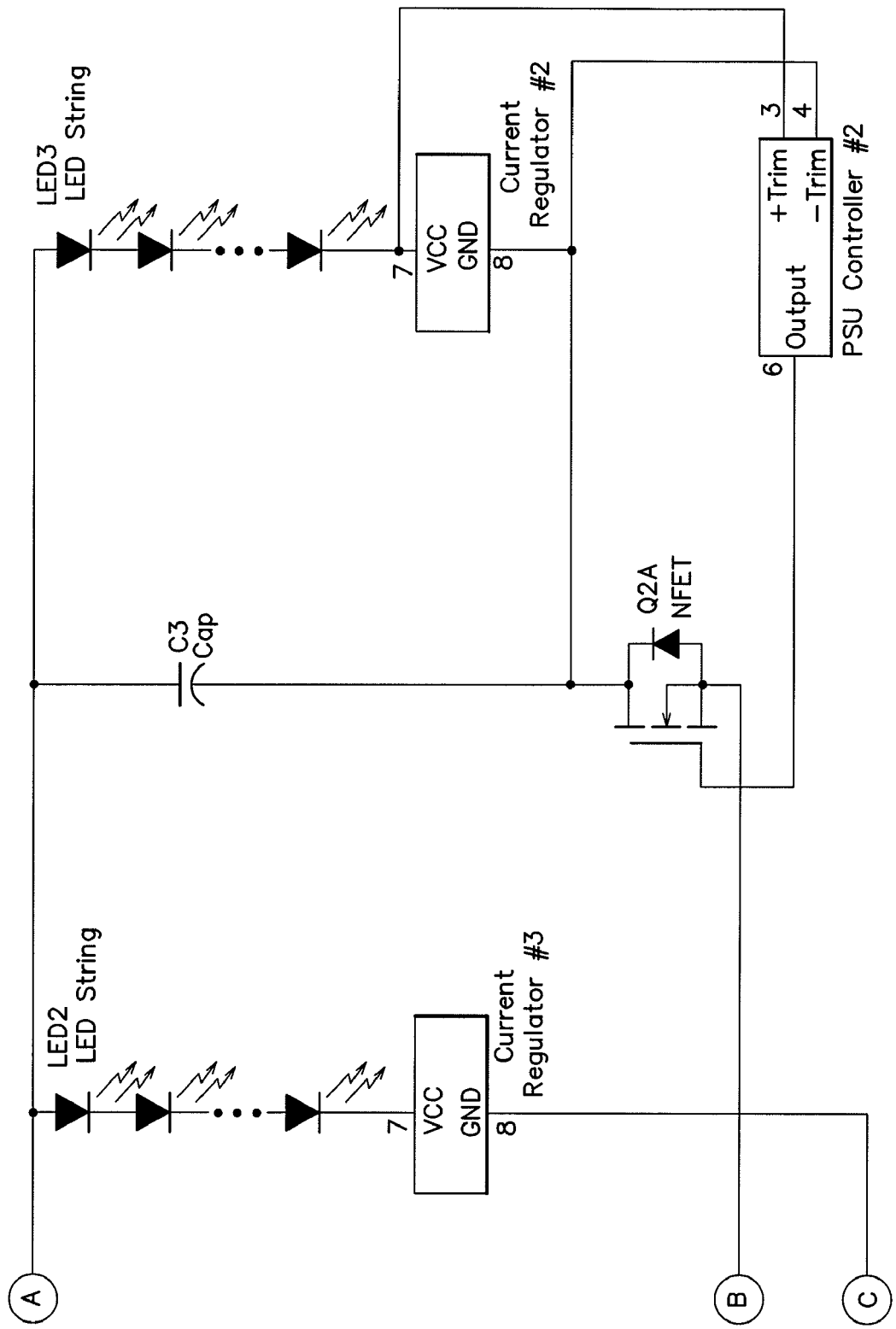

In the embodiment of FIG. 30, three or more LED strings are driven with a single inductor based on current regulator voltage feedback, wherein the string LED1 runs at a higher voltage than the other loads. Similarly, in the embodiment of FIG. 31, three LED strings are driven with a single inductor based on current regulator voltage feedback, wherein the strings LED1 and LED2 run at a higher voltage than the string LED3.

Figure 32:
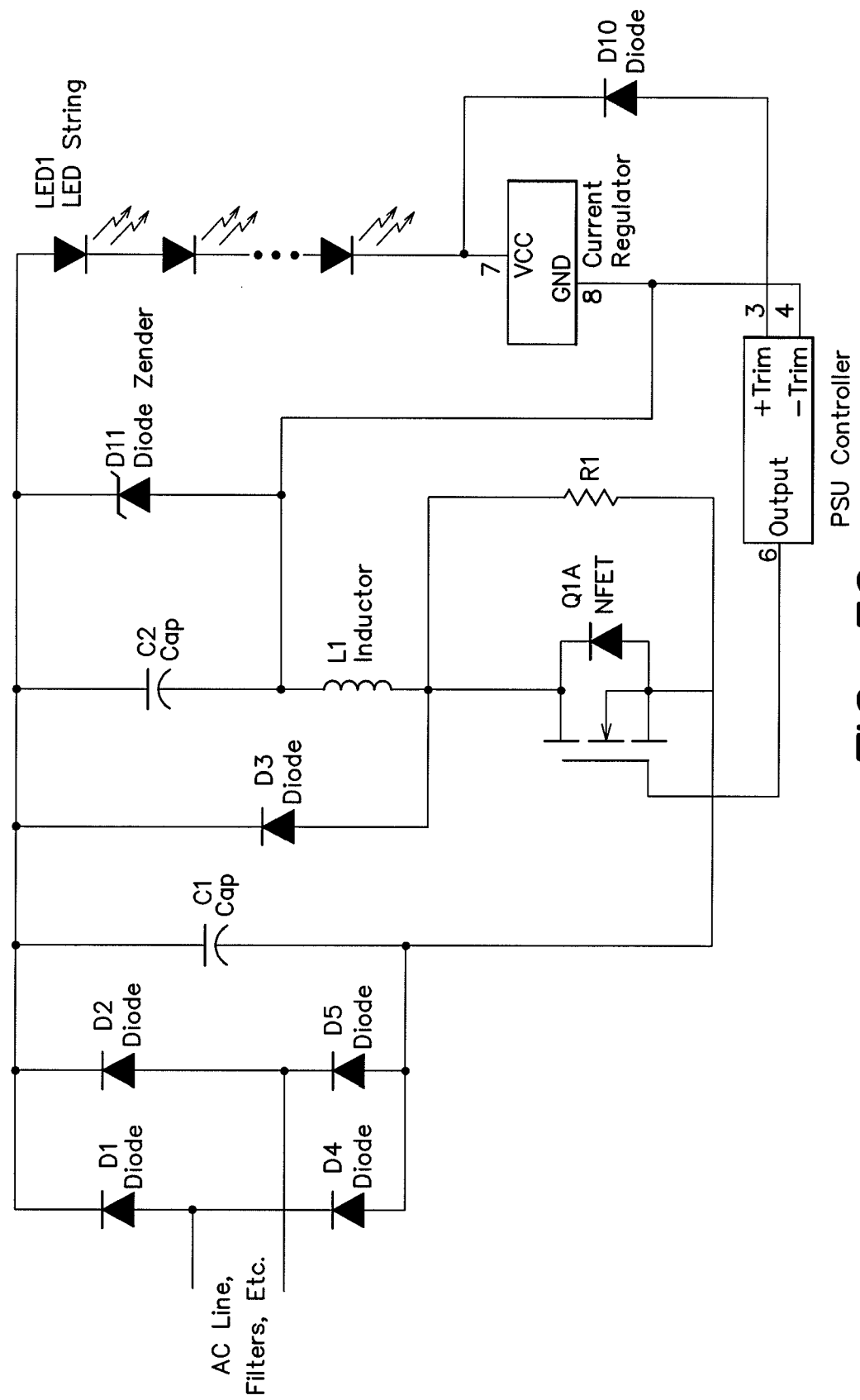

In the embodiment of FIG. 32, one LED string is driving with a single inductor based on current regulator voltage feedback, and incorporates modifications for a minimum regulating, PWM compatible current regulator. In this embodiment, R1 supplies a little excess current which prevents reduction of voltage across C2 when operated at zero duty cycle. R1's lower terminal may optionally be connected so as to allow derivation of a supply voltage for the PSU controller.

Figures 33, 33A:
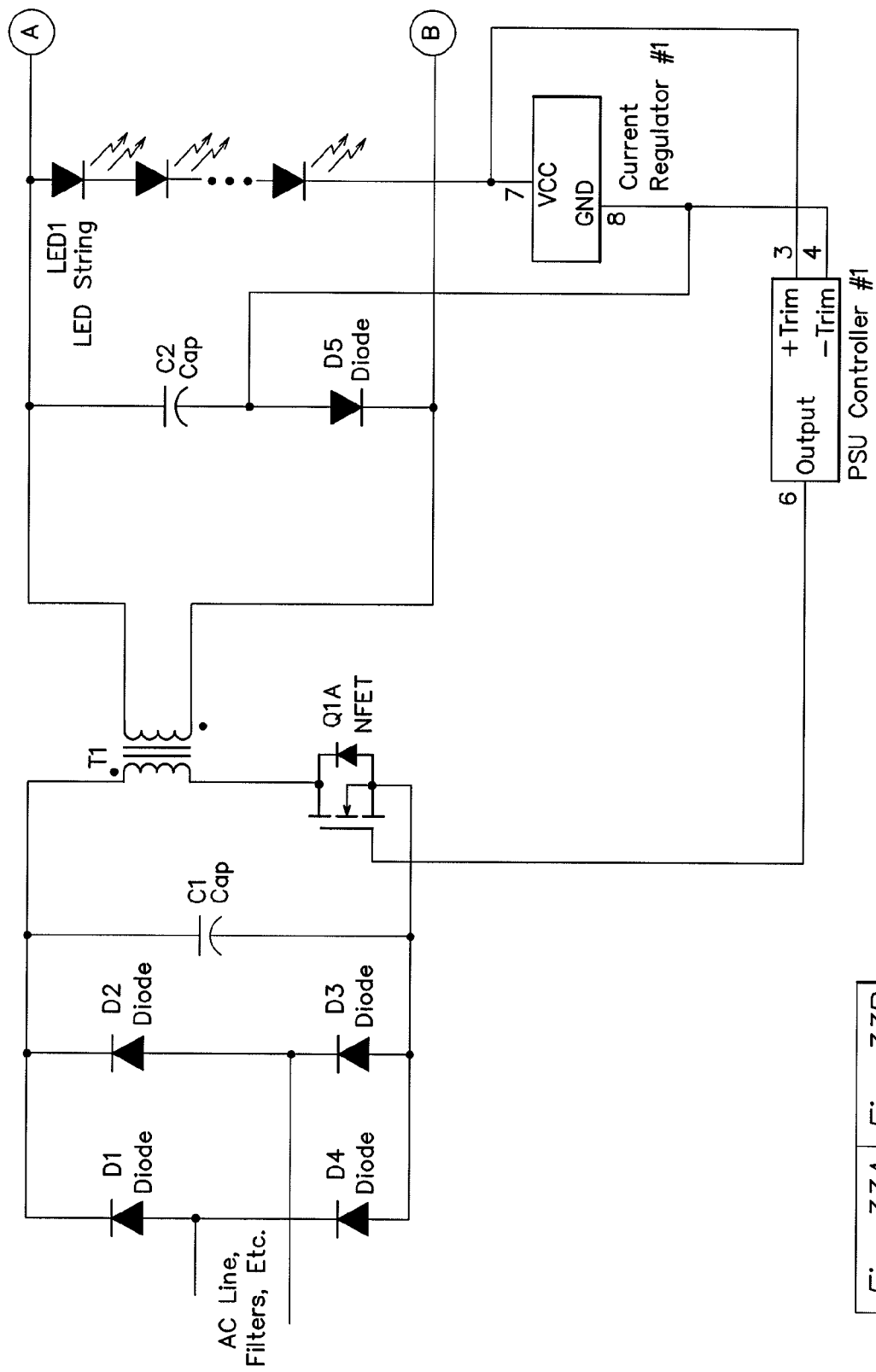
Figure 33B:
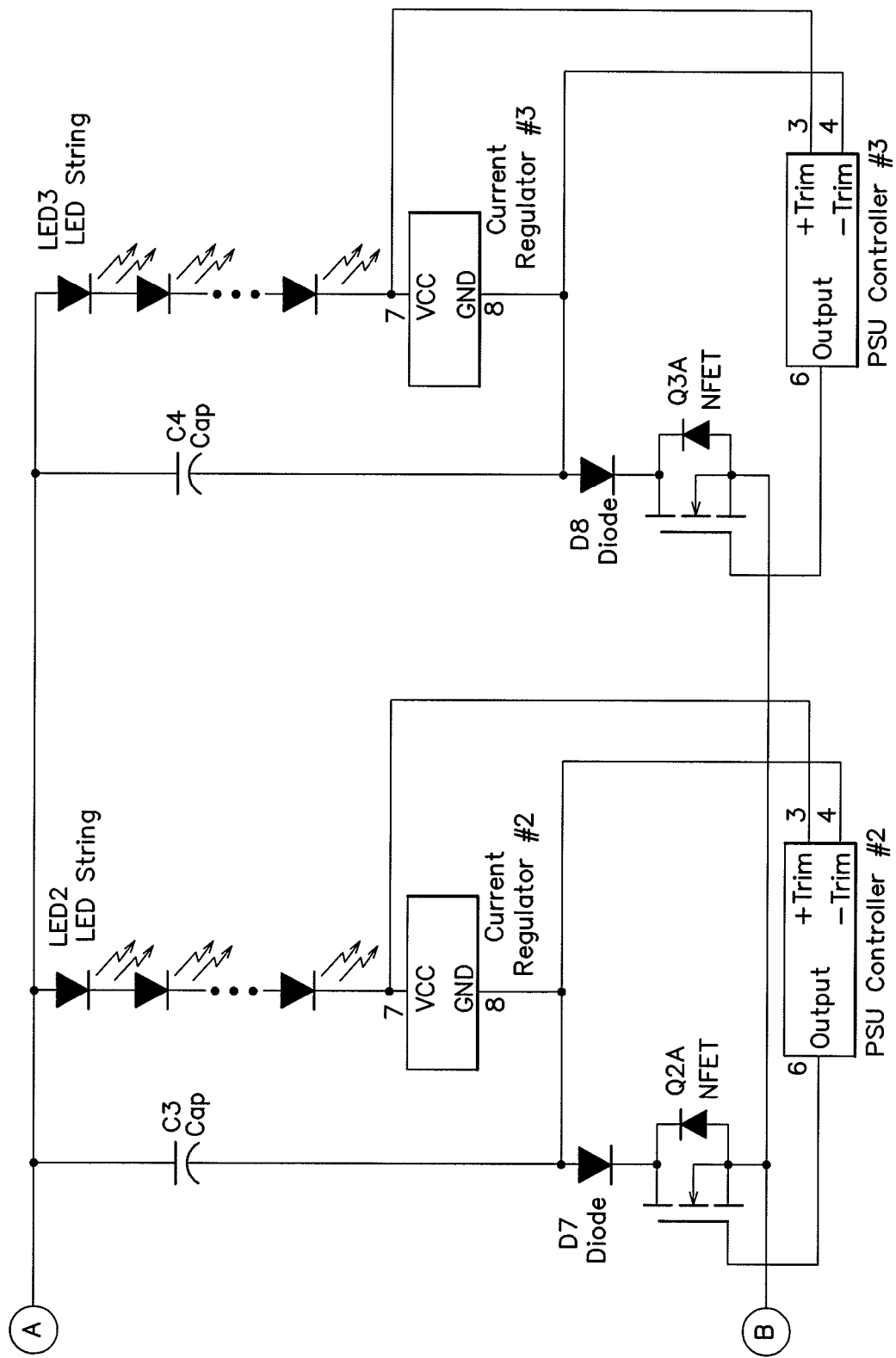
Figure 34A:
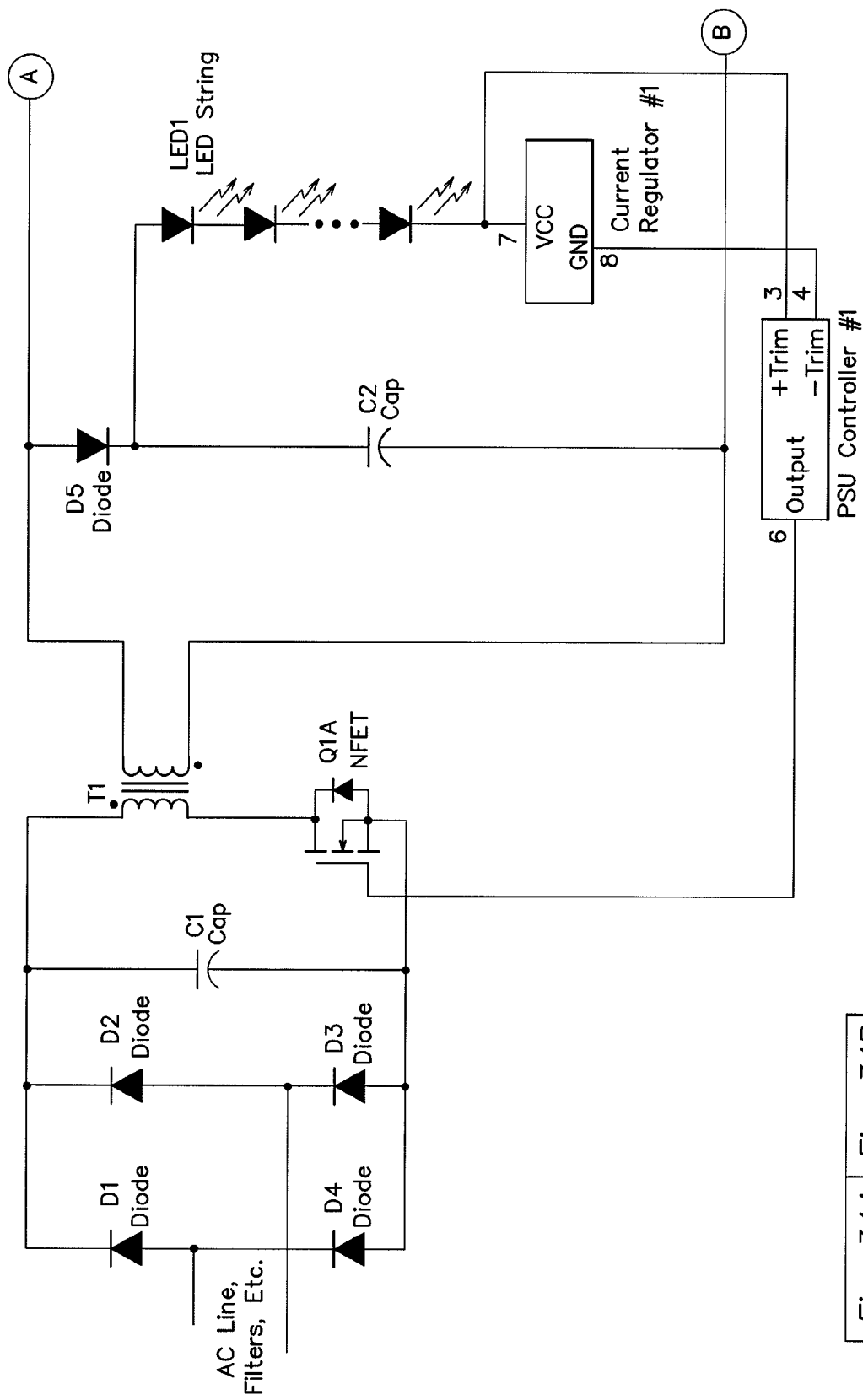
Figure 34B:
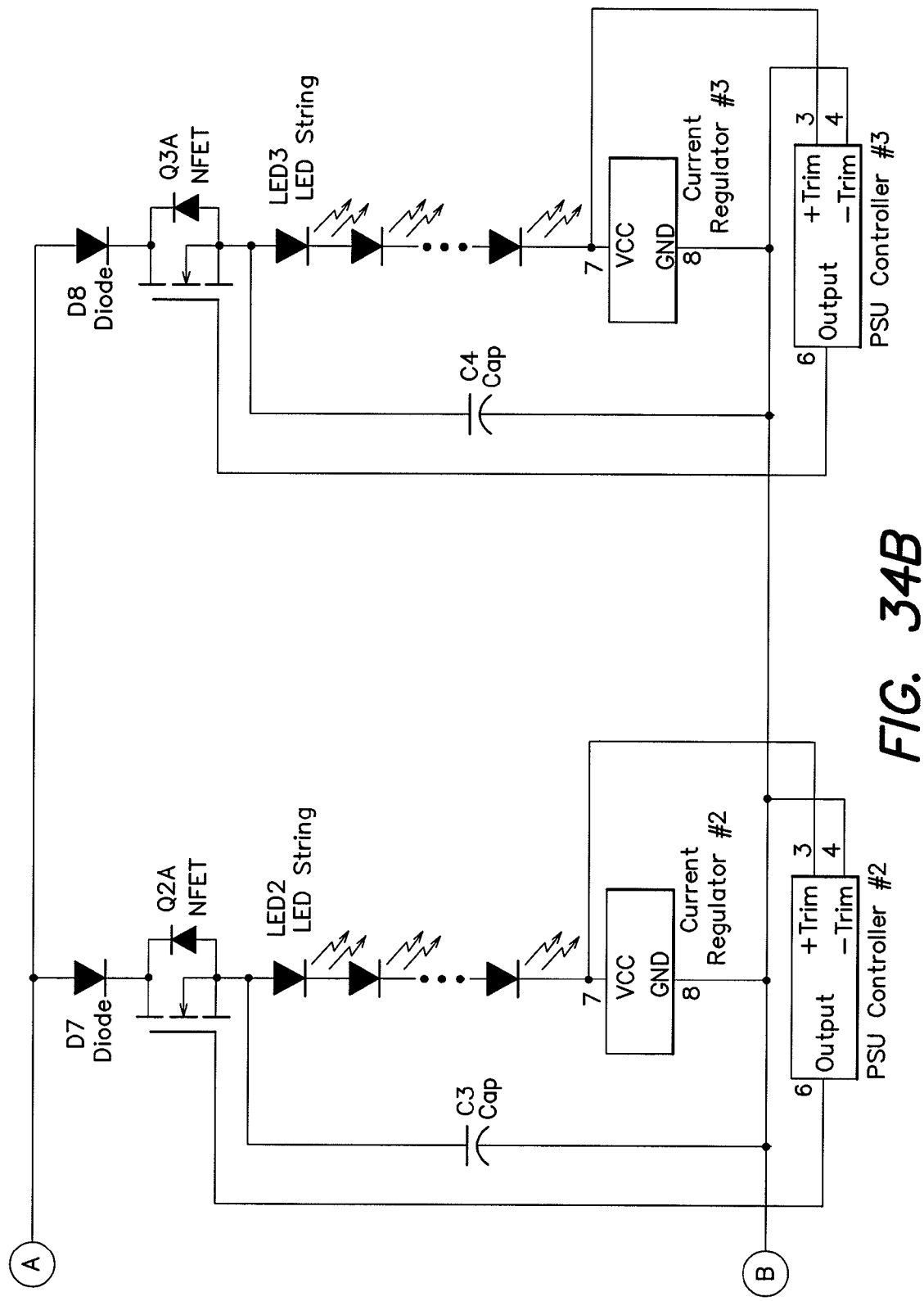

In the embodiment of FIG. 33, two or three LED strings are driven with a single transformer, based on current regulator voltage feedback, wherein LED string one runs at a higher voltage than the other two LED strings. In FIG. 34, the order of the load, diode and transistor in each string is rearranged to illustrate an alternative implementation of the embodiment of FIG. 33.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways, based on the general teachings of the present disclosure, to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

What is claimed is:

1. An apparatus comprising:
    at least one first white LED configured to generate first radiation having a first spectrum that includes perceivably white light; and
    a first feed-forward driver coupled to the at least one first white LED and configured to controllably vary a first intensity of the first radiation without monitoring or regulating a first voltage or a first current provided to the at least one first white LED,
    wherein the first feed-forward driver comprises an energy transfer arrangement including:
        at least one energy transfer element to store input energy derived from a power source and to provide output energy to the at least one first white LED;
        at least one switch coupled to the at least one energy transfer element to control at least the input energy stored to the at least one energy transfer element; and
        at least one diode,
            wherein the energy transfer arrangement is configured as one of a buck converter, a boost converter, a buck-boost converter, a CUK converter, a flyback converter and a forward converter.

2. The apparatus of claim 1, wherein the energy transfer element includes one of a tapped inductor and a transformer having a non-unity turns ratio.

3. The apparatus of claim 1, further comprising at least one controller configured to receive at least one control signal that includes information representing the first intensity, the at least one controller further configured to output at least a first driver signal to control the at least one switch of the first feed-forward driver.

4. The apparatus of claim 3, wherein the at least one controller is configured to control at least one of a frequency and a duty cycle of the first driver signal so as to controllably vary the first intensity without using any feedback information relating to the at least one first white LED.

5. The apparatus of claim 4, wherein the at least one controller is configured to control at least one of the frequency and the duty cycle of the first driver signal based on a voltage output by the power source and the at least one control signal that includes the information representing the first and second intensities.

6. The apparatus of claim 4, wherein the at least one controller is configured to control the frequency of the first driver signal by controllably varying an effective frequency of the first driver signal using a pulse number modulation technique.

7. The apparatus of claim 6, wherein the at least one controller is configured to controllably vary the effective frequency of the first driver signal while holding substantially constant the duty cycle of the first driver signal.

8. The apparatus of claim 4, wherein the at least one controller is configured to controllably vary the duty cycle of the first driver signal while holding substantially constant the frequency of the first driver signal.

9. The apparatus of claim 4, wherein the at least one controller is configured to controllably vary both the frequency and the duty cycle of the first driver signal.

10. The apparatus of claim 4, wherein the at least one controller is configured to control at least one of the frequency and the duty cycle of the first driver signal based on a relative range of a desired intensity for the first intensity, as indicated by the information included in the at least one control signal received by the at least one controller.

11. The apparatus of claim 10, wherein the desired intensity includes at least a first range and a second range, wherein the at least one controller is configured to control only one of the frequency and the duty cycle of the first driver signal in the first range, and wherein the at least one controller is configured to control both the frequency and the duty cycle of the first driver signal in the second range.

12. The apparatus of claim 10, wherein the desired intensity includes at least a first range, a second range, and a third range, and wherein the at least one controller is configured to control only the frequency of the first driver signal in the first range, only the duty cycle of the first driver signal in the second range, and both of the frequency and the duty cycle of the first driver signal in the third range.

13. The apparatus of claim 4, wherein the at least one controller is an addressable device so as to facilitate control of the apparatus via a network.

14. An apparatus comprising:
at least one first white LED configured to generate first radiation having a first spectrum that includes perceivably white light;
a first feed-forward driver coupled to the at least one first white LED and configured to controllably vary a first intensity of the first radiation without monitoring or regulating a first voltage or a first current provided to the at least one first white LED;
at least one second LED configured to generate second radiation having a second spectrum different from the first spectrum; and
a second feed-forward driver coupled to the at least one second LED and configured to controllably vary a second intensity of the second radiation without monitoring or regulating a second voltage or a second current provided to the at least one second LED.

15. The apparatus of claim 14, wherein the first and second feed-forward drivers are configured to respectively controllably vary the first and second intensities based on at least one control signal that includes information representing the first and second intensities.

16. The apparatus of claim 15, wherein the at least one second LED includes at least one non-white LED.

17. The apparatus of claim 15, wherein the at least one second LED includes at least one second white LED.

18. The apparatus of claim 15, wherein the first and second feed-forward drivers are configured to independently controllably vary the first and second intensities based on the at least one control signal that includes the information representing the first and second intensities.

19. The apparatus of claim 18, further comprising at least one processor coupled to the first and second feed-forward drivers, the at least one processor configured to receive the at least one control signal that includes the information representing the first and second intensities, the at least one processor further configured to output at least a first driver signal to control the at least one switch of the first feed-forward driver and a second driver signal to control the at least one switch of the second feed-forward driver based on the information representing the first and second intensities.

20. The apparatus of claim 19, wherein the at least one processor is configured to control at least one of a frequency and a duty cycle of each driver signal so as to respectively control the first and second intensities, without using any feedback information relating to the at least one first white LED and the at least one second LED.

21. The apparatus of claim 20, wherein the at least one processor is an addressable device so as to facilitate control of the apparatus via a network.

22. The apparatus of claim 20, further comprising:
a full wave rectifier to receive an A.C. line voltage and output a rectified voltage; and
a power factor correction apparatus, coupled to the full wave rectifier and to the first and second feed-forward drivers, to receive the rectified voltage and output a DC voltage serving as the power source for the first and second feed-forward drivers.

23. The apparatus of claim 22, wherein the at least one processor is configured to control the power factor correction apparatus based at least in part on the at least one control signal that includes the information representing the first and second intensities.

24. The apparatus of claim 22, wherein the at least one processor is configured to control at least one of the frequency and the duty cycle of each driver signal based on the DC voltage output by the power factor correction apparatus and the at least one control signal that includes the information representing the first and second intensities.

25. A method comprising acts of:
A) generating first radiation having a first spectrum that includes perceivably white light from at least one first white LED; and
B) controllably varying a first intensity of the first radiation without monitoring or regulating a first voltage or a first current provided to the at least one first white LED,
wherein the act B) comprises acts of:
storing input energy derived from a power source to at least one energy transfer element;

providing output energy from the at least one energy transfer element to the at least one first white LED; and controlling at least the input energy stored to the at least one energy transfer element via at least one switch coupled to the at least one energy transfer element, wherein the at least one energy transfer element and the at least one switch form part of an energy transfer arrangement that includes the at least one energy transfer element, the at least one switch, and at least one diode, and wherein the energy transfer arrangement is configured as one of a buck converter, a boost converter, a buck-boost converter, a CUK converter, a flyback converter and a forward converter.

26. The method of claim 25, wherein the energy transfer element includes one of a tapped inductor and a transformer having a non-unity turns ratio.

27. The method of claim 25, wherein the act B) comprises acts of:
receiving at least one control signal that includes information representing the first intensity;
generating at least a first driver signal to control the at least one switch; and
controlling at least one of a frequency and a duty cycle of the first driver signal so as to control the first intensity without using any feedback information relating to the at least one first white LED.

28. The method of claim 27, further comprising an act of:
receiving the at least one control signal that includes the information representing the first intensity as an addressed signal via a network.

29. A method comprising acts of:
A) generating first radiation having a first spectrum that includes perceivably white light from at least one first white LED;
B) controllably varying a first intensity of the first radiation without monitoring or regulating a first voltage or a first current provided to the at least one first white LED;
C) generating second radiation having a second spectrum, different from the first spectrum, from at least one second LED; and
D) controllably varying a second intensity of the second radiation without monitoring or regulating a second voltage or a second current provided to the at least one second LED.

30. The method of claim 29, further comprising an act of:
E) independently performing the acts B) and D) based on at least one control signal that includes information representing the first and second intensities.

31. The method of claim 30, wherein the at least one second LED includes at least one non-white LED.

32. The method of claim 30, wherein the at least one second LED include at least one second white LED.

33. The method of claim 30, wherein the act E) comprises an act of:
E1) generating at least a first driver signal to control the at least one first white LED and a second driver signal to control the at least one second LED, based on the at least one control signal that includes the information representing the first and second intensities.

34. The method of claim 33, wherein the act E1) comprises an act of:
E1a) controlling at least one of a frequency and a duty cycle of each driver signal so as to respectively control the first and second intensities, without using any feedback information relating to the at least one first white LED and the at least one second LED.

35. The method of claim 34, further comprising an act of:
receiving the at least one control signal that includes the information representing the first and second intensities as an addressed signal via a network.

36. The method of claim 34, further comprising acts of:
rectifying an A.C. line voltage to provide a rectified voltage;
controlling a current drawn from the rectified voltage to provide power factor correction; and
generating a DC voltage based on the rectified voltage, the DC voltage serving as the power source from which the input energy is derived.

37. The method of claim 36, wherein the act of controlling a current drawn from the rectified voltage comprises an act of controlling the current drawn from the rectified voltage based at least in part on the at least one control signal that includes the information representing the first and second intensities.

* * * * *